United States Patent
Rogers

(10) Patent No.: US 9,442,285 B2
(45) Date of Patent: Sep. 13, 2016

(54) OPTICAL COMPONENT ARRAY HAVING ADJUSTABLE CURVATURE

(75) Inventor: John A. Rogers, Champaign, IL (US)

(73) Assignee: The Board of Trustees of the University of Illinois, Urbana, IL (US)

(*) Notice: Subject to any disclaimer, the term of this patent is extended or adjusted under 35 U.S.C. 154(b) by 459 days.

(21) Appl. No.: 13/349,336

(22) Filed: Jan. 12, 2012

(65) Prior Publication Data

US 2012/0261551 A1 Oct. 18, 2012

Related U.S. Application Data

(60) Provisional application No. 61/433,099, filed on Jan. 14, 2011.

(51) Int. Cl.
*H01L 27/00* (2006.01)
*G02B 26/08* (2006.01)
*G02B 3/14* (2006.01)
*G02B 27/28* (2006.01)

(52) U.S. Cl.
CPC ............ *G02B 26/0825* (2013.01); *G02B 3/14* (2013.01); *G02B 26/0875* (2013.01); *G02B 27/28* (2013.01)

(58) Field of Classification Search
CPC ........................ H04N 5/2253; H04N 5/23296
USPC ..................................................... 250/208.1
See application file for complete search history.

(56) References Cited

U.S. PATENT DOCUMENTS

| | | |
|---|---|---|
| 4,058,418 A | 11/1977 | Lindmayer |
| 4,392,451 A | 7/1983 | Mickelsen et al. |
| 4,471,003 A | 9/1984 | Cann |
| 4,487,162 A | 12/1984 | Cann |
| 4,663,828 A | 5/1987 | Hanak |
| 4,761,335 A | 8/1988 | Aurichio et al. |

(Continued)

FOREIGN PATENT DOCUMENTS

| | | |
|---|---|---|
| CN | 1222758 | 7/1999 |
| CN | 1454045 | 11/2003 |

(Continued)

OTHER PUBLICATIONS

Abbaschian et al. (Dec. 2005) "High Pressure-High Temperature Growth of Diamond Crystals Using Split Sphere Apparatus," *Diamond Relat. Mater.* 14(11-12):1916-1919.

(Continued)

*Primary Examiner* — Thanh Luu
(74) *Attorney, Agent, or Firm* — Lathrop & Gage LLP

(57) ABSTRACT

Provided are devices, and related methods, for controlling curvature of an array of optical components on, embedded, or partially embedded in, a deformable substrate. The array of optical components, in an aspect, comprises a deformable substrate having a contact surface and an array of mechanically interconnected optical components supported by the contact surface. An actuator is operably connected to the contact surface, wherein the actuator variably controls a curvature of said contact surface. The contact surface may have a curvature that spans concave to convex, which is tunable. In an aspect, the array of optical components is part of an optical device, such as a camera with a continuously adjustable zoom whose focus is maintained by adjusting a photodetector array curvature. In an aspect, the method is adjusting the curvature of a substrate that supports the array of optical components by applying a force to the substrate.

47 Claims, 35 Drawing Sheets

(56) References Cited

U.S. PATENT DOCUMENTS

| | | |
|---|---|---|
| 4,766,670 A | 8/1988 | Gazdik et al. |
| 4,784,720 A | 11/1988 | Douglas |
| 4,855,017 A | 8/1989 | Douglas |
| 5,204,144 A | 4/1993 | Cann et al. |
| 5,313,094 A | 5/1994 | Beyer et al. |
| 5,434,751 A | 7/1995 | Cole, Jr. et al. |
| 5,501,893 A | 3/1996 | Laermer et al. |
| 5,525,815 A | 6/1996 | Einset |
| 5,545,291 A | 8/1996 | Smith et al. |
| 5,648,148 A | 7/1997 | Simpson |
| 5,691,245 A | 11/1997 | Bakhit |
| 5,753,529 A | 5/1998 | Chang et al. |
| 5,757,081 A | 5/1998 | Chang et al. |
| 5,767,578 A | 6/1998 | Chang et al. |
| 5,772,905 A | 6/1998 | Chou |
| 5,783,856 A | 7/1998 | Smith et al. |
| 5,817,242 A | 10/1998 | Biebuyck et al. |
| 5,824,186 A | 10/1998 | Smith et al. |
| 5,904,545 A | 5/1999 | Smith et al. |
| 5,907,189 A | 5/1999 | Mertol |
| 5,915,180 A | 6/1999 | Hara et al. |
| 5,928,001 A | 7/1999 | Gillette et al. |
| 5,955,781 A | 9/1999 | Joshi et al. |
| 5,976,683 A | 11/1999 | Liehrr et al. |
| 5,998,291 A | 12/1999 | Bakhit et al. |
| 6,080,608 A | 6/2000 | Nowak |
| 6,225,149 B1 | 5/2001 | Gan et al. |
| 6,265,326 B1 | 7/2001 | Ueno |
| 6,274,508 B1 | 8/2001 | Jacobsen et al. |
| 6,277,712 B1 | 8/2001 | Kang et al. |
| 6,281,038 B1 | 8/2001 | Jacobsen et al. |
| 6,285,400 B1 * | 9/2001 | Hokari ............. 348/374 |
| 6,291,896 B1 | 9/2001 | Smith |
| 6,316,278 B1 | 11/2001 | Jacobsen et al. |
| 6,316,283 B1 | 11/2001 | Saurer |
| 6,317,175 B1 | 11/2001 | Salerno et al. |
| 6,334,960 B1 | 1/2002 | Willson et al. |
| 6,380,729 B1 | 4/2002 | Smith |
| 6,403,397 B1 | 6/2002 | Katz |
| 6,413,790 B1 | 7/2002 | Duthaler et al. |
| 6,417,025 B1 | 7/2002 | Gengel |
| 6,420,266 B1 | 7/2002 | Smith et al. |
| 6,459,418 B1 | 10/2002 | Comiskey et al. |
| 6,468,638 B2 | 10/2002 | Jacobsen et al. |
| 6,479,395 B1 | 11/2002 | Smith et al. |
| 6,527,964 B1 | 3/2003 | Smith et al. |
| 6,555,408 B1 | 4/2003 | Jacobsen et al. |
| 6,566,744 B2 | 5/2003 | Gengel |
| 6,580,151 B2 | 6/2003 | Vandeputte et al. |
| 6,586,338 B2 | 7/2003 | Smith et al. |
| 6,590,346 B1 | 7/2003 | Hadley et al. |
| 6,606,079 B1 | 8/2003 | Smith |
| 6,606,247 B2 | 8/2003 | Credelle et al. |
| 6,608,370 B1 | 8/2003 | Chen et al. |
| 6,623,579 B1 | 9/2003 | Smith et al. |
| 6,639,578 B1 | 10/2003 | Comiskey et al. |
| 6,655,286 B2 | 12/2003 | Rogers |
| 6,657,289 B1 | 12/2003 | Craig et al. |
| 6,661,037 B2 | 12/2003 | Pan et al. |
| 6,665,044 B1 | 12/2003 | Jacobsen et al. |
| 6,683,663 B1 | 1/2004 | Hadley et al. |
| 6,693,384 B1 | 2/2004 | Vicentini et al. |
| 6,721,104 B2 | 4/2004 | Schachar et al. |
| 6,723,576 B2 | 4/2004 | Nozawa et al. |
| 6,730,990 B2 | 5/2004 | Kondo et al. |
| 6,731,353 B1 | 5/2004 | Credelle et al. |
| 6,743,982 B2 | 6/2004 | Biegelsen et al. |
| 6,780,696 B1 | 8/2004 | Schatz |
| 6,784,450 B2 | 8/2004 | Pan et al. |
| 6,787,052 B1 | 9/2004 | Vaganov |
| 6,791,072 B1 * | 9/2004 | Prabhu ............. 250/208.1 |
| 6,814,898 B1 | 11/2004 | Deeman et al. |
| 6,816,380 B2 | 11/2004 | Credelle et al. |
| 6,844,673 B1 | 1/2005 | Bernkopf |
| 6,848,162 B2 | 2/2005 | Arneson et al. |
| 6,850,312 B2 | 2/2005 | Jacobsen et al. |
| 6,863,219 B1 | 3/2005 | Jacobsen et al. |
| 6,864,435 B2 | 3/2005 | Hermanns et al. |
| 6,864,570 B2 | 3/2005 | Smith |
| 6,872,645 B2 | 3/2005 | Duan et al. |
| 6,878,871 B2 | 4/2005 | Scher et al. |
| 6,887,450 B2 | 5/2005 | Chen et al. |
| 6,900,094 B2 | 5/2005 | Hammond et al. |
| 6,917,061 B2 | 7/2005 | Pan et al. |
| 6,949,199 B1 | 9/2005 | Gauzner et al. |
| 6,949,206 B2 | 9/2005 | Whiteford |
| 6,950,220 B2 | 9/2005 | Abramson et al. |
| 6,984,934 B2 | 1/2006 | Moller et al. |
| 6,989,285 B2 | 1/2006 | Ball |
| 7,029,951 B2 | 4/2006 | Chen et al. |
| 7,033,961 B1 | 4/2006 | Smart et al. |
| 7,067,903 B2 | 6/2006 | Tachibana et al. |
| 7,116,318 B2 | 10/2006 | Amundson et al. |
| 7,132,313 B2 | 11/2006 | O'Connor et al. |
| 7,148,512 B2 | 12/2006 | Leu et al. |
| 7,169,546 B2 | 1/2007 | Suzuki et al. |
| 7,169,669 B2 | 1/2007 | Blakers et al. |
| 7,170,164 B2 | 1/2007 | Chen et al. |
| 7,186,624 B2 | 3/2007 | Welser et al. |
| 7,195,733 B2 | 3/2007 | Rogers et al. |
| 7,253,442 B2 | 8/2007 | Huang et al. |
| 7,255,919 B2 | 8/2007 | Sakata et al. |
| 7,374,968 B2 | 5/2008 | Kornlivich et al. |
| 7,425,523 B2 | 9/2008 | Ikemizu et al. |
| 7,453,646 B2 | 11/2008 | Lo |
| 7,521,292 B2 | 4/2009 | Rogers et al. |
| 7,522,507 B2 | 4/2009 | Hendriks |
| 7,557,367 B2 | 7/2009 | Rogers et al. |
| 7,622,367 B1 | 11/2009 | Nuzzo et al. |
| 7,626,621 B2 * | 12/2009 | Ito et al. ............. 348/294 |
| 7,675,686 B2 | 3/2010 | Lo et al. |
| 7,700,402 B2 | 4/2010 | Wild et al. |
| 7,701,643 B2 | 4/2010 | Batchko et al. |
| 7,704,684 B2 | 4/2010 | Rogers et al. |
| 7,705,280 B2 | 4/2010 | Nuzzo et al. |
| 7,768,373 B2 | 8/2010 | Shudarek |
| 7,799,699 B2 | 9/2010 | Nuzzo et al. |
| 7,826,145 B2 | 11/2010 | Justis et al. |
| 7,932,123 B2 | 4/2011 | Rogers et al. |
| 7,943,491 B2 | 5/2011 | Nuzzo et al. |
| 7,972,875 B2 | 7/2011 | Rogers et al. |
| 7,982,296 B2 | 7/2011 | Nuzzo et al. |
| 7,986,465 B1 | 7/2011 | Lo et al. |
| 8,018,658 B2 | 9/2011 | Lo |
| 8,039,847 B2 | 10/2011 | Nuzzo et al. |
| 8,198,621 B2 | 6/2012 | Rogers et al. |
| 8,217,381 B2 | 7/2012 | Rogers et al. |
| 8,367,035 B2 | 2/2013 | Rogers et al. |
| 8,394,706 B2 | 3/2013 | Nuzzo et al. |
| 8,440,546 B2 | 5/2013 | Rogers et al. |
| 8,470,701 B2 | 6/2013 | Rogers et al. |
| 8,552,299 B2 | 10/2013 | Rogers et al. |
| 8,562,095 B2 | 10/2013 | Alleyne et al. |
| 2003/0006527 A1 | 1/2003 | Rabolt et al. |
| 2003/0082889 A1 | 5/2003 | Maruyama et al. |
| 2003/0178316 A1 | 9/2003 | Jacobs et al. |
| 2003/0227116 A1 | 12/2003 | Halik et al. |
| 2004/0005723 A1 | 1/2004 | Empedocles et al. |
| 2004/0026684 A1 | 2/2004 | Empedocles et al. |
| 2004/0079464 A1 | 4/2004 | Kumakura |
| 2004/0095658 A1 | 5/2004 | Buretea et al. |
| 2004/0112964 A1 | 6/2004 | Empedocles et al. |
| 2004/0136866 A1 | 7/2004 | Pontis et al. |
| 2004/0146560 A1 | 7/2004 | Whiteford et al. |
| 2004/0178390 A1 | 9/2004 | Whiteford |
| 2004/0192082 A1 | 9/2004 | Wagner et al. |
| 2004/0206448 A1 | 10/2004 | Dubrow |
| 2004/0211458 A1 | 10/2004 | Gui et al. |
| 2004/0211459 A1 | 10/2004 | Suenaga et al. |
| 2004/0250950 A1 | 12/2004 | Dubrow |
| 2005/0020094 A1 | 1/2005 | Forbes et al. |
| 2005/0038498 A1 | 2/2005 | Dubrow et al. |
| 2005/0214962 A1 | 9/2005 | Daniels et al. |
| 2005/0227389 A1 | 10/2005 | Bhattacharya et al. |

(56) References Cited

U.S. PATENT DOCUMENTS

| | | | |
|---|---|---|---|
| 2005/0233546 A1 | 10/2005 | Oohata et al. | |
| 2005/0238967 A1 | 10/2005 | Rogers et al. | |
| 2005/0255686 A1 | 11/2005 | Yamano et al. | |
| 2006/0038182 A1 | 2/2006 | Rogers et al. | |
| 2006/0049485 A1 | 3/2006 | Pan et al. | |
| 2006/0127817 A1 | 6/2006 | Ramanujan et al. | |
| 2006/0132025 A1 | 6/2006 | Gao et al. | |
| 2006/0134893 A1 | 6/2006 | Savage et al. | |
| 2006/0169989 A1 | 8/2006 | Bhattacharya et al. | |
| 2006/0244105 A1 | 11/2006 | Forbes et al. | |
| 2006/0279191 A1 | 12/2006 | Gehegan et al. | |
| 2006/0286488 A1 | 12/2006 | Rogers et al. | |
| 2006/0286785 A1 | 12/2006 | Rogers et al. | |
| 2007/0032089 A1 | 2/2007 | Nuzzo et al. | |
| 2007/0035793 A1 | 2/2007 | Hendriks | |
| 2007/0227586 A1 | 10/2007 | Zapalac | |
| 2008/0000871 A1 | 1/2008 | Suh et al. | |
| 2008/0055581 A1 | 3/2008 | Rogers et al. | |
| 2008/0108171 A1 | 5/2008 | Rogers et al. | |
| 2008/0157235 A1 | 7/2008 | Rogers et al. | |
| 2008/0212102 A1 | 9/2008 | Nuzzo et al. | |
| 2008/0237443 A1 | 10/2008 | Oliver et al. | |
| 2008/0316610 A1 | 12/2008 | Dobrusskin | |
| 2009/0115875 A1* | 5/2009 | Choi et al. | 348/294 |
| 2009/0199960 A1 | 8/2009 | Nuzzo et al. | |
| 2009/0289246 A1 | 11/2009 | Schneider et al. | |
| 2009/0294803 A1 | 12/2009 | Nuzzo et al. | |
| 2010/0002402 A1* | 1/2010 | Rogers et al. | 361/749 |
| 2010/0052112 A1 | 3/2010 | Rogers et al. | |
| 2010/0059863 A1 | 3/2010 | Rogers et al. | |
| 2010/0072577 A1 | 3/2010 | Nuzzo et al. | |
| 2010/0178722 A1 | 7/2010 | De Graff et al. | |
| 2010/0283069 A1 | 11/2010 | Rogers et al. | |
| 2010/0289124 A1 | 11/2010 | Nuzzo et al. | |
| 2010/0290104 A1 | 11/2010 | Imai et al. | |
| 2010/0317132 A1 | 12/2010 | Rogers et al. | |
| 2011/0147715 A1 | 6/2011 | Rogers et al. | |
| 2011/0170225 A1 | 7/2011 | Rogers et al. | |
| 2011/0171813 A1 | 7/2011 | Rogers et al. | |
| 2011/0187798 A1 | 8/2011 | Rogers et al. | |
| 2011/0220890 A1 | 9/2011 | Nuzzo et al. | |
| 2011/0230747 A1 | 9/2011 | Rogers et al. | |
| 2011/0261178 A1 | 10/2011 | Lo et al. | |
| 2011/0266561 A1 | 11/2011 | Rogers et al. | |
| 2011/0277813 A1 | 11/2011 | Rogers et al. | |
| 2011/0316120 A1 | 12/2011 | Rogers et al. | |
| 2012/0083099 A1 | 4/2012 | Nuzzo et al. | |
| 2012/0105528 A1 | 5/2012 | Alleyne et al. | |
| 2012/0157804 A1 | 6/2012 | Rogers et al. | |
| 2012/0165759 A1 | 6/2012 | Rogers et al. | |
| 2012/0261551 A1 | 10/2012 | Rogers | |
| 2012/0320581 A1 | 12/2012 | Rogers et al. | |
| 2012/0321785 A1 | 12/2012 | Rogers et al. | |
| 2012/0327608 A1 | 12/2012 | Rogers et al. | |
| 2013/0036928 A1 | 2/2013 | Rogers et al. | |
| 2013/0041235 A1 | 2/2013 | Rogers et al. | |
| 2013/0072775 A1 | 3/2013 | Rogers et al. | |
| 2013/0100618 A1 | 4/2013 | Rogers et al. | |
| 2013/0140649 A1 | 6/2013 | Rogers et al. | |
| 2013/0320503 A1 | 12/2013 | Nuzzo et al. | |
| 2013/0333094 A1 | 12/2013 | Rogers et al. | |

FOREIGN PATENT DOCUMENTS

| | | |
|---|---|---|
| DE | 4241045 C1 | 5/1994 |
| EP | 0929097 | 7/1999 |
| EP | 1357773 | 10/2003 |
| JP | 06-118441 | 4/1994 |
| JP | 2001332383 | 11/2001 |
| JP | 2002092984 | 3/2002 |
| JP | 2003289136 | 10/2003 |
| TW | 367570 | 8/1999 |
| TW | 494257 | 7/2002 |
| TW | 200836353 | 9/2008 |
| WO | WO 00/46854 | 8/2000 |
| WO | WO 00/49421 | 8/2000 |
| WO | WO 00/49658 | 8/2000 |
| WO | WO 00/55915 | 9/2000 |
| WO | WO 00/55916 | 9/2000 |
| WO | WO 01/31082 | 5/2001 |
| WO | WO 01/33621 | 5/2001 |
| WO | WO 02/27701 | 4/2002 |
| WO | WO 02/43032 | 5/2002 |
| WO | WO 02/092778 | 11/2002 |
| WO | WO 02/097708 | 12/2002 |
| WO | WO 02/097724 | 12/2002 |
| WO | WO 02/099068 | 12/2002 |
| WO | WO 03/032240 | 4/2003 |
| WO | WO 03/049201 | 6/2003 |
| WO | WO 03/063211 | 7/2003 |
| WO | WO 03/085700 | 10/2003 |
| WO | WO 03/085701 | 10/2003 |
| WO | WO 03/092073 | 11/2003 |
| WO | WO 2004/003535 | 1/2004 |
| WO | WO 2004/022637 | 3/2004 |
| WO | WO 2004/022714 | 3/2004 |
| WO | WO 2004/023527 | 3/2004 |
| WO | WO 2004/024407 | 3/2004 |
| WO | WO 2004/027822 | 4/2004 |
| WO | WO 2004/032190 | 4/2004 |
| WO | WO 2004/032191 | 4/2004 |
| WO | WO 2004/032193 | 4/2004 |
| WO | WO 2004/034025 | 4/2004 |
| WO | WO 2004/086289 | 10/2004 |
| WO | WO 2004/094303 | 11/2004 |
| WO | WO 2004/100252 | 11/2004 |
| WO | WO 2004/105456 | 12/2004 |
| WO | WO 2005/005679 | 1/2005 |
| WO | WO 2005/015480 | 2/2005 |
| WO | WO 2005/017962 | 2/2005 |
| WO | WO 2005/022120 | 3/2005 |
| WO | WO 2005/029578 | 3/2005 |
| WO | WO 2005/033787 | 4/2005 |
| WO | WO 2005/054119 | 6/2005 |
| WO | WO 2005/099310 | 10/2005 |
| WO | WO 2005/104756 | 11/2005 |
| WO | WO 2005/122285 | 12/2005 |
| WO | WO 2006/130721 | 12/2006 |
| WO | WO 2007/000037 | 1/2007 |
| WO | WO 2007/126412 | 11/2007 |
| WO | WO 2008/030666 | 3/2008 |
| WO | WO 2008/030960 | 3/2008 |
| WO | WO 2008/036837 | 3/2008 |
| WO | WO 2008/055054 | 5/2008 |
| WO | WO 2008/143635 | 11/2008 |
| WO | WO 2009/011709 | 1/2009 |
| WO | WO 2009/111641 | 9/2009 |
| WO | WO 2010/005707 | 1/2010 |
| WO | WO 2010/036807 | 4/2010 |
| WO | WO 2010/132552 | 11/2010 |
| WO | WO 2011/084450 | 7/2011 |
| WO | WO 2011/115643 | 9/2011 |

OTHER PUBLICATIONS

Adachi et al (1982) "Chemical Etching of InGaAsP/InP DH Wafer," *J. Electrochem. Soc.* 129:1053-1062.

Adachi et al. (1983) "Chemical Etching Characteristics of (001)GaAs," *J. Electrochem. Soc.* 130:2427-2435.

Ago et al. (2005) "Aligned Growth of Isolated Single-Walled Carbon Nanotubes Programmed vby Atomic Arrangement of Substrate Surface," *Chem. Phys. Lett.* 408:433-438.

Ago et al. (2006) "Synthesis of Horizontally-Aligned Single-Walled Carbon Nanotubes with Controllable Density on Sapphire Surface and Polarized Raman Spectroscopy," *Chem. Phys. Lett.* 421:399-403.

Ahmed et al. (Web Release Oct. 11, 2005) "Extending the $3\omega$-Method to the MHz Range for Thermal Conductivity Measurements of Diamond Thin Films," *Diamond Relat. Mater.* 15(2-3):389-393.

Ahn et al. (2007) "Bendable Integrated Circuits on Plastic Substrates by Use of Printed Ribbons of Single-Crystalline Silicon," *Appl. Phys. Lett.* 90:213501.

(56) References Cited

OTHER PUBLICATIONS

Ahn et al. (Dec. 15, 2006) "Heterogeneous Three-Dimensional Electronics by Use of Printed Semiconductor Nanomaterials," *Science* 314:1754-1757.
Ahn et al. (Jun. 2006) "High-Speed Mechanically Flexible Single-Crystal Silicon Thin-Film Film Transistors on Plastic Substrates," *IEEE Electron Dev. Lett.* 27(6):460-462.
Alivisatos et al. (1996) "Semiconductor Clusters, Nanocrystals, and Quantum Dots," *Science* 271:933-937.
Alivisatos et al. (1998) "From Molecules to Materials: Current Trends and Future Directions," *Adv. Mater.* 10:1297-1336.
Allen et al. (Feb. 20, 2006) "Nanomaterial Transfer Using Hot Embossing for Flexible Electronic Devices," *Appl. Phys. Lett.* 88:083112.
Al-Sarawi et al. (Feb. 1998) "A Review of 3-D Packaging Technology," *IEEE Trans. Comp. Packag. Manufac. Technol. B* 21(1):2-14.
Amano et al. (Feb. 3, 1986) "Metalorganic Vapor Phase Epitaxial Growth of a High Quality GaN Film Using an AlN Buffer Layer," *Appl. Phys. Lett.* 48(5):353-355.
Ambrosy et al. (1996) "Silicon Motherboards for Multichannel Optical Modules," *IEEE Trans. Compon. Pack. A* 19:34-40.
Andersson et al. (Oct. 16, 2002) "Active Matrix Displays Based on All-Organic Electrochemical Smart Pixels Printed on Paper," *Adv. Mater.* 14:1460-1464.
Ando et al. (2004) "Self-Aligned Self-Assembly Process for Fabricating Organic Thin-Film Transistors," *Appl. Phys. Lett.* 85:1849-1851.
Angadi et al. (Web Release Jun. 1, 2006) "Thermal Transport and Grain Boundary Conductance in Ultrananocrystalline Diamond Thin Films," *J. Appl. Phys.* 99:114301.
Aoki et al. (2003) "Microassembly of Semiconductor Three Dimensional Photonic Crystals," *Nat. Mater.* 2:117-121.
Arnold et al. (2003) "Field-Effect Transistors Based on Single Semiconducting Oxide Nanobelts," *J. Phys. Chem. B* 107(3):659-663.
Ayón et al. (Jan. 1999) "Characterization of a Time Multiplexed Inductively Coupled Plasma Etcher," *J. Electrochem. Soc.* 146(1):339-349.
Baca et al. (2008) "Semiconductor Wires and Ribbons for High-Performance Flexible Electronics," *Angew. Chem. Int. Ed.* 47:5524-5542.
Bachtold et al. (Nov. 9, 2001) "Logic Circuits with Carbon Nanotube Transistors," *Science* 294:1317-1320.
Bae et al. (Jul. 1, 2002) "Single-Crystalline Gallium Nitride Nanobelts," *Appl. Phys. Lett.* 81(1):126-128.
Balmer et al. (2005) "Diffusion of Alkanethiols in PDMS and Its Implications on Microcontact Printing (μCP)," *Langmuir* 21(2):622-632.
Banerjee et al. (May 2001) "3-D ICs: A Novel Chip Design for Improving Deep-Submicrometerinterconnect Performance and Systems-on-Chip Integration," *Proc. IEEE* 89(5):602-633.
Bao et al. (1997) "High-Performance Plastic Transistors Fabricated by Printing Techniques," *Chem. Mater.* 9:1299-1301.
Bao et al. (1999) "Printable Organic and Polymeric Semiconducting Materials and Devices," *J. Mater. Chem.* 9:1895-1904.
Barquins, M. (1992) "Adherence, Friction and Wear of Rubber-Like Materials," *Wear* 158:87-117.
Bates, F.S. (1991) "Polymer-Polymer Phase Behavior," *Science* 251:898-905.
Battaglia et al. (2003) "Colloidal Two-Dimensional Systems: CdSe Quantum Shells and Wells," Angew. Chem. Int. Ed. 442:5035-5039.
Bauer et al. (2004) "Biological Applications of High Aspect Ratio Nanoparticles," *J. Mater. Chem.* 14:517-526.
Berg et al. (2003) "Tailored Micropatters Through Weak Polyelectrolyte Stamping," Langmuir 19:2231-2237.
Bernard et al. (1998) "Printing Patterns of Proteins," *Langmuir* 14(9):2225-2229.
Bett et al. (Aug. 1999) "III-V Compounds for Solar Cell Applications," *Appl. Phys. A. Mater. Sci.* 69(2):119-129.

Bhunia et al. (2004) "Free-Standing and Vertically Aligned InP Nanowires Grown by Metalorganic Vapor Phase Epitaxy," *Physica E* 21:583-587.
Bhushan et al. (Nov. 2004) "Multiwalled Carbon Nanotube AFM Probes for Surface Characterization of Micro/Nanostructures," *Microsyst. Technol.* 10(8-9):633-639.
Bietsch et al. (Oct. 1, 2000) "Conformal Contact and Pattern Stability of Stamps Used for Soft Lithography," *J. Appl. Phys.* 88(7):4310-4318.
Bishay et al. (2000) "Temperature Coefficient of the Surface Resistivity of Two-Dimensional Island Gold Films," *J. Phys. D. Appl. Phys.* 33(18):2218-2222.
Blanchet et al. (2003) "Large Area, High Resolution, Dry Printing of Conducting Polymers for Organic Electronics," *Appl. Phys. Lett.* 82:463-465.
Blanchet et al. (2003) "Printing Techniques for Plastic Electronics," *J. Imag. Sci. Tech.* 47(4):296-303.
Blazdell et al. (Nov. 1999) "Preparation of Ceramic Inks for Solid Freeforming Using a Continuous Jet Printer," *J. Mat. Syn. Process.* 7(6):349-356.
Boltau et al. (1998) "Surface-Induced Structure Formation of Polymer Blends on Patterned Substrates," *Nature* 391:877-879.
Boncheva et al. (Mar. 15, 2005) "Magnetic Self-Assembly of Three-Dimensional Surfaces from Planar Sheets," *Proc. Natl. Acad. Sci. USA* 102(11):3924-3929.
Boncheva et al. (Mar. 8, 2005) "Templated Self-Assembly: Formation of Folded Structures by Relaxation of Pre-Stressed, Planar Tapes. The Path to Ubiquitous and Low-cost Organic Electronic Appliances on Plastic," *Adv. Mater.* 17(5):553-557.
Bowden et al. (1997) "Self Assembly of Mesoscale Objects into Ordered Two-Dimensional Dimensional Arrays," *Science* 276:233-235.
Bowden et al. (1998) "Spontaneous Formation of Ordered Structures in Thin Films of Metals Supported on an Elastomeric Polymer," *Nature* 393:146-149.
Bowden et al. (2001) "Molecule-Mimetic Chemistry and Mesoscale Self-Assembly," *Acc. Chem. Res.* 34:231-238.
Bracher et al. (2009) "Shaped Films of Ionotropic Hydrogels Fabricated Using Templates of Patterns Paper," *Adv. Mater.* 21:445-450.
Bradley et al. (2003) "Flexible Nanotube Electronics," *Nano Lett.*, vol. 3, No. 10, pp. 1353-1355.
Braun et al. (1999) "Electrochemically Grown Photonic Crystals," *Nature* 402:603-604.
Britton et al. (Web Release Oct. 25, 2005) "Microstructural Defect Characterization of a Si:H Deposited by Low Temperature HW-CVD on Paper Substrates," *Thin Solid Films* 501(1-2):79-83.
Brown et al. (Dec. 19, 2001) "Heterogeneous Materials Integration: Compliant Substrates to Active Device and Materials Packaging," *Mater. Sci. Eng. B* 87(3):317-322.
Brown, H.R. (1991) "The Adhesion Between Polymers," *Ann. Rev. Mater. Sci.* 21:463-489.
Bruschi et al. (2001) "Micromachined Silicon Suspended Wires With Submicrometric Dimensions," *Microelectron. Eng.* 57-58:959-965.
Buma et al. (2001) "High-Frequency Ultrasound Array Element Using Thermoelastic Expansion in an Elastomeric Film," *Appl. Phys. Lett.* 79:548-550.
Burdinski et al. (2005) "Single Etch Patterning of Stacked Silver and Molybdenum Alloy Layers on Glass Using Microcontat Wave Printing," *J. Am. Chem. Soc.* 127(31):10786-10787.
Burdinski, D. (non-dated) "Soft Lithography and Microcontact Wave Printing," http://www.research.philips.com/technologies/light_dev_microsys/softlitho/index.html, Downloaded May 23, 2007.
Burgin et al. (2000) "Large Area Submicrometer Contact Printing Using a Contact Aligner," *Langmuir* 16:5371-5375.
Burns et al. (2003) "Printing of Polymer Thin-Film Transistors for Active-Matrix-Display Display Applications," *J. Soc. Inf. Display* 11:599-604.
Campbell et al. (2000) "Fabrication of Photonic Crystals for the Visible Spectrum by Holographic Lithography," *Nature* 404:53-56.

(56) References Cited

OTHER PUBLICATIONS

Cao et al. (2006) "Highly Bendable,Transparent Thin-Film Transistors That Use Carbon-Nanotube-Based Conductors and Semiconductors with Elastomeric Delectrics," *Adv. Mater.* 18(3):304-309.

Cao et al. (2006) "Transparent flexible organic thin-film transistors that use printed single-walled carbon nanotube electrodes," *Applied Physics Letters* 88:113511.

Cao et al. (Jul. 24, 2008) "Medium-Scale Carbon Nanotube Thin-Film Integrated Circuits on Flexible Plastic Substrates," *Nature* 454:495-500.

Carr et al. (1998) "Measurement of Nanomechanical Resonant Structures in Single-Crystal Crystal Silicon," *J. Vac. Sci. Technol. B* 16:3821-3824.

Chang et al. (1994) "Process Techniques," "Lithography," and "Device-Related Physics and Principles," in; *GaAs High-Speed Devices: Physics, Technology and Circuit Application*, John Wiley and Sons, New York, pp. 115-278.

Chaudhury et al. (1991) "Direct Measurement of Interfacial Interactions Between Semispherical Lenses and Flat Sheets of Poly(dimethylsiloxane) and their Chemical Derivatives," *Langmuir* 7:1013-1025.

Chen et al. (2003) "Characterization of Pd—GaAs Schottly Diodes Prepared by the Electrodes Plating Technique," *Semiconductor. Sci. Technol.* 18:620-626.

Chen et al. (2003) "Electronic Paper: Flexible Active-Matrix Electronics Ink Display," *Nature* 423:136.

Chen et al. (2005) "InGaN Nanorings and Nanodots by Selective Area Epitaxy," *Appl. Phys. Lett.* 87:143111.

Chen et al. (2005) "The Role of Metal-Nanotube Caontact in the Performance of Carbon Nanotube Field-Effect Transistors," *Nano Lett.* 5(7):1497-1502.

Chen et al. (Feb. 27, 2006) "Complementary Carbon Nanotube-Gated Carbon Nanotube Thin-Fim Transistor," *Appl. Phys. Lett.* 88:093502.

Chen et al. (Jun. 2002) Effect of Process Parameters on the Surface Morphology and Mechanical Performance of Silicon Structures After Deep Reactive Ion Etching (DRIE) *J. Microelectromech. Syst.* 11(3):264-275.

Chen et al. (Mar. 2004) "A Family of Herringbone Patterns in Thin Films," *Scr. Mater.* 50(6):797-801.

Chen et al. (Mar. 24, 2006) "An Integrated Logic Crcuit Assembled on a Single Carbon Nanotube," *Science* 311:1735.

Chen et al. (Sep. 2004) "Herringbone Buckling Patterns of Compressed Thin Films on Compliant Substrates," *J. Appl. Mech.* 71:597-603.

Cheng et al. (2005) "Ink-Jet Printing, Self-Assembled Polyelectrolytes, and Electroless Plating: Low Cost Fabrication of Circuits on a Flexible Substrate at Room Temperature," *Macromol. Rapid Commun.* 26:247-264.

Childs et al. (2002) "Decal Transfer Microlithography: A New Soft-Lithographic Patterning Method," *J. Am. Chem. Soc.* 124:13583-13596.

Childs et al. (2005) "Masterless Soft-Lithography: Patterning UV/Ozone-Induced Adhesion on Poly(dimethylsiloxane) Surfaces," *Langmuir* 21:10096-10105.

Childs et al. (Aug. 14, 2004) "Patterning of Thin-Film Microstructures on Non-Planar Substrate Surfaces Using Decal Transfer Lithography," *Adv. Mater.* 16(15):1323-1327.

Choi et al. (2007) "Biaxially Stretchable 'Wavy' Silicon Nanomembranes," *Nano Lett.* 7(6):1655-1663.

Choi et al. (Web Release Jan. 25, 2005) "Simple Detachment Patterning of Organic Layers and Its Applications to Organic Light-Emitting Diodes," *Adv. Mater.* 17(2):166-171.

Chou et al. (2004) "An Orientation-Controlled Pentacene Film Aligned by Photoaligned Polyimide for Organic Thin-Film Transistor Applications," *Adv. Func. Mater.* 14:811-815.

Chou et al. (Jun. 8, 1999) "Micromachining on (111)-Oriented Silicon," *Sens. Actuators A* 75(3):271-277.

Chu et al. (2005) "High-Performance Organic Thin-Film Transistors with Metal Oxide/Metal Bilayer Electrode," *Appl. Phys. Lett.* 87:193508.

Chung et al. (2000) Silicon Nanowire Devices *Appl. Phys. Lett.* 76(15):2068-2070.

Chung et al. (Jul. 1, 2003) "A Study on Formation of Al and $Al_2O_3$ on the Porous Paper by DC Magnetron Sputtering," *Surf. Coat. Technol.* 171(1-3):65-70.

Collins et al. (Apr. 27, 2001) "Engineering Carbon Nanotubes and Nanotube Circuits Using Electrical Breakdown," *Science* 292:706-709.

Creagh et al. (2003) "Design and Performance of Inkjet Print Heads for Non-Graphic-Arts Applications," *MRS Bull.* 28:807-811.

Crone et al. (Feb. 3, 2000) "Large-Scale Complementary Integrated Circuits Based on Organic Transistors," *Nature* 403:521-523.

Crowder et al. (1998) "Low-Temperature Single-Crystal Si TFTs Fabricated on Si Films Processed via Sequential Lateral Solidification," *IEEE Electron. Dev. Lett.* 19:306-308.

Cui et al. (2001) "Nanowire Nanosensors for Highly Sensitive and Selective Detection of Biological and Chemical Species," *Science* 293:1289-1292.

Dai et al. (2002) "Gallium Oxide Nanoribbons and Nanosheets," *J. Phys. Chem. 8* 106(5):902-904.

Dai et al. (2003) "Novel Nanostructures of Functional Oxides Synthesized by Thermal Evaporation," *Adv. Funct. Mater.* 13:9-24.

Davidson et al. (2004) "Supercritical Fluid-Liquid-Solid Synthesis of Gallium Arsenide Nanowires Seeded by Alkanethiol-Stabilized Gold Nanocrystals," *Adv. Mater.* 16:646-649.

de Gans (2004) "Inkjet Printing of Polymers: State of the Art and Future Developments," *Adv. Mater.* 16(3):203-213.

De Sio et al. (Web Release May 18, 2005) "Electro-Optical Response of a Single-Crystal Diamond Ultraviolet Photoconductor in Transverse Configuration," *Appl. Phys. Lett.* 86:213504.

DeBoer et al. (2004) "Organic Single-Crystal Field-Effect Transistors," *Phys. Stat. Sol.* 201:1302-1331.

Decision of Refusal corresponding to Japanese Patent Application No. P2007-515549, Dispatched Sep. 4, 2012—English translation only.

Decision of Rejection corresponding to Korean Patent Application No. 10-2007-7000216, Issued Sep. 19, 2012—includes English Translation.

Deen et al. (2004) "Electrical Characterization of Polymer-Based FETs Fabricated by Spin-Coating Poly(3-alkylthiophene)s," *IEEE Trans. Electron Devices* 51:1892-1901.

Delmerche et al. (1997) "Stability of Molded Polydimethylsiloxane Microstructures," *Adv. Mat.* 9:741-746.

Deruelle et al. (1995) "Adhesion at the Solid-Elastomer Interface: Influence of Interfacial Chains," *Macromol.* 28:7419-7428.

Derycke et al. (Sep. 2001) "Carbon Nanotube Inter- and Intramolecular Logic Gates," *Nano Lett.* 1(9):453-456.

Desai et al. (Feb. 1999) "Nanopore Technology for Biomedical Applications," *Biomed. Microdevices* 2(1):11-40.

Dick et al. (Jun. 2004) "Synthesis of Branched 'Nanotrees' by Controlled Seeding of Multiples Branching Events," *Nat. Mater.* 3:380-384.

Dimroth et al. (Mar. 2007) "High Efficiency Multijunction Solar Cells," *MRS Bull.* 32:230-235.

Ding et al. (Oct. 4, 2004) "Self Catalysis and Phase Transformation in the Formation of CdSe Nanosaws," *Adv. Mater.* 16(19):1740-1743.

Dinsmore et al. (2002) "Colloidosomes: Selectively Permeable Capsules Composed of Colloidal Particles," *Science* 298:1006-1009.

Dinyari et al. (2008) "Curving Monolithic Silicon for Nonplanar Focal Plane Array Applications," *Appl. Phys. Lett.* 92:091114.

Divliansky et al. (2003) "Fabrication of Three-Dimensional Polymer Photonic Crystal Structures Using Single Diffraction Element Interference Lithography," *Appl. Phys. Lett.* 82(11):1667-1669.

Dodabalapur A. (Apr. 2006) "Organic and Polymer Transistors for Electronics," *Mater Today* 9(4):24-30.

Dodabalapur et al. (1995) "Organic Transistors: Two-Dimensional Transport and Improved Electrical Characteristics," *Science* 268:270-271.

(56) References Cited

OTHER PUBLICATIONS

Dong et al. (2006) "Adaptive Liquid Microlenses Activated by Stimuli-Responsive Hydrogels," Nature. 442:551-554.
Dong et al. (2007) "Variable Focus Liquid Microlenses and Microlens Arrays Actuated by Thermoresponsive Hydrogels," Adv. Mater. 19:401-405.
Duan et al. (2000) "General Synthesis of Compound Semiconductor Nanowires," Adv. Mater. 12:298-302.
Duan et al. (2003) "High-performance Thin-Film Transistors Using Semiconductor Nanowires and Nanoribbons," Nature 425:274-278.
Duan X, (2003) "Semiconductor Nanowires: From Nanoelectronics to Macroelectronics," Abstract from a presentation given at the 11$^{th}$ Foresight Conference on Molecular Nanotechnology, Oct. 10-20, Burlingame, CA.
Duboz et al. (1998) "Transistors and Detectors Based on GaN-Related Materials," In; *Group III Nitride Semiconductor Compounds*, Gill, B. ed., Clarendon, Oxford, pp. 343-387.
Duesberg et al. (2000) "Polarized Raman Spectroscopy on Isolated Single-Wall Carbon Nanotubes," Phys. Rev. Lett., vol. 85, No. 25, pp. 5436-5439.
Duffy et al. (1998) "Rapid Prototyping of Microfluidic Systems in Poly(dimethylsiloxane)," Anal. Chem. 70:4974-4984.
Durkop et al. (2004) "Extraordinary Mobility in Semiconducting Carbon Nanotube," Nano Lett. 4(1):35-39.
Eder et al. (Apr. 5, 2004) "Organic Electronics on Paper," Appl. Phys. Lett. 84(14):2673-2675.
Edrington et al. (2001) "Polymer-Based Photonic Crystals," Adv. Mater. 13:421-425.
Efimenko et al. (Oct. 15, 2002) "Surface Modification of Sylgard-184 Poly(dimethyl Siloxane) Networks by Ultraviolet and Ultraviolet/Ozone Treatment," J. Colloid Interface Sci. 254(2):306-315.
Eftekhari, G. (1993) "Variation in the Effective Richardson Constant of Metal-GaAs and Metal-InP Contacta Due to the Effect of Processing Parameters," Phys. Status Solid A—Appl. Res. 140:189-194.
Ensell, G. (1995) "Free Standing Single-Crystal Silicon Microstructures," J. Micromech. Microeng. 5:1-4.
Examination Report and Response, Corresponding to Malaysian Patent Application No. PI 20062672, Mailed Aug. 28, 2009.
Examination Report, Corresponding to European Application No. EP 05 756 327.2, Dated Jan. 20, 2010.
Examination Report, Corresponding to Malaysian Patent Application No. PI 20092343, Mailed Jun. 15, 2010.
Examination Report, Corresponding to Malaysian Patent Publication No. PI 20052553, Mailed Mar. 13, 2009.
Examination Report, Corresponding to Singapore Patent Application No. 200608359-6, Completed on Aug. 27, 2008.
Examination Report, Response and Search Report, Corresponding to Malaysian Patent Application No. PI 20062537, Nov. 20, 2009.
Examination Report, Corresponding to Singapore Patent Application No. 2007/18082-1, mailed Jan. 15, 2009.
Faez et al. (1999) "An Elastomeric Conductor Based on Poluaniline Prepared by Mechanical Mixing," Polymer 40:5497-5503.
Felgner et al. (1996) "Flexural Rigidity of Microtubules Measured with the Use of Optical Tweezers," J. Cell Sci. 109:509-516.
Fink et al. (1999) "Block Copolymers as Photonic Bandgap Materials," J. Lightwave Tech. 17:1963-1969.
Flewitt et al. (2005) "Low-Temperature Deposition of Hydrogenated Amorphous Silicon in an Electron Cyclotron Resonance Reactor for Flexible Displays," Proc. IEEE 93:1364-1373.
Folch et al. (1999) "Wafer-Level In-Registry Microstamping," J. Microelectromech. Syst. 8:85-89.
Forment et al. (2004) "Influence of Hydrogen Treatment and Annealing Processes Upon the Schottky Barrier Height of Au/n-GaAs and Ti/n-GaAs Diodes," Semicond. Sci. Technol. 19:1391-1396.
Forrest et al. (2004) "The Path to Ubiquitous and Low-Cost Organic Electronic Appliances on Plastic," Nature 428:911-918.
Fortunato et al. (2005) "Flexible a-Si: H Position-Sensitive Detectors," Proc. IEEE 93:1281-1286.
Fortunato et al. (Sep. 2008) "High-Performance Flexible Hybrid Field-Effect Transistors Based on Cellulose Fiber Paper," IEEE Electron. Dev. Lett. 29(9):988-990.
Freire et al. (1999) "Thermal Stability of Polyethylene Terephthalate (PET): Oligomer Distribution and Formation of Volatiles," Packag. Technol. Sci. 12:29-36.
Freund, L.B. (2000) "The Mechanics of Electronic Materials," Int. J. Solids Struct. 37:185-196.
Friedman et al. (2005) "High-Speed Integrated Nanowire Circuits," Nature 434:1085.
Fu et al. (Jan. 10, 2003) "Patterning of Diamond Microstructures on Si Substrate by Bulk and Surface Micromachining," J. Mater. Process. Technol. 132(1-3):73-81.
Furneaux et al. (1989) "The Formation of Controlled-Porosity Membranes from Anodically Oxidized Aluminum," Nature 337:147-149.
Gan et al. (2002) "Preparation of Thin-Film Transostros With Chemical Bath Deposited CdSe and CdS Thin Films," IEEE Trans. Electron. Dev. 49:15-18.
Gao et al. (Sep. 9, 2005) "Conversion of Zinc Oxide Nanobelts into Superlattice-Structures Structures Nanohelices," Science 309:1700-1704.
Garcia et al. (2004) "Etchant Anisotropy Controls the Step Bunching Instability in KOH Etching of Silicon," Phys. Rev. Lett. 93(16):166102.
Garnier et al. (1994) "All-Polymer Field-Effect Transistor Realized by Printing Techniques," Science 265:1684-1686.
Geim et al. (Mar. 2007) "The Rise of Graphene," Nature Mater. 6:183-191.
Geissler et al. (2003) "Fabrication of Metal Nanowires Using Microcontact Printing," Langmuir 19(15):6301-6311.
Geissler et al. (Jun. 2003) "Selective Wet-Etching of Microcontact-Printed Cu Substrates with Control Over the Etch Profile," Microelec. Eng. 67-68:326-332.
Gelinck et al. (2000) "High-Performance All-Polymer Integrated Circuits," Appl. Phys. Lett. 77:1487-1489.
Gelinck et al. (2004) "Fleible Active-Matrix Displays and Shift Registers Based on Solution-Processed Organic Transistors," Nat. Mater. 3:106-110.
Georgakilas et al. (2002) "Wafer-Scale Integration of GaAs Optoelectronic Devices with Standard Si Integrated Circuits Using a Low-Temperature Bonding Procedure," Appl. Phys. Lett. 81:5099-5101.
Givargizov, E.I. (1991) "Applications," In; *Oriented Crystallization on Amorphous.Substrates*, Plenum Press, New York, pp. 341-363.
Goetting et al. (1999) "Microcontact Printing of Alkanephosphonic Acids on Aluminum: Pattern Transfer by Wet Chemical Etching," Langmuir 15:1182-1191.
Goldman et al. (1996) "Correlation of Buffer Strain Relaxation Modes with Transport Properties of Two-Dimensional Electron Gases," J. Apple. Phys. 80:6849-6854.
Goldmann et al. (2004) "Hole Mobility in Organic Single Crystals Measured by a "Flip-Crystal" Field-Effect Technique," J. Appl. Phys. 96:2080-2086.
Goldsmith, T.H. (Sep. 1990) "Optimization, Constraint, and History in the Evolution of Eyes," Quart. Rev. Biol. 65(3):281-322.
Gratz et al. (1991) "Atomic Force Microscopy of Atomic-Scale Ledges and Etch Pits Formed During Dissolution of Quartz," Science, 251:1343-1346.
Gray et al. (Dec. 2001) "Screen Printed Organic Thin Film Transistors (OTFTs) on a Flexible Substrate," Proc. SPIE 4466:89-94.
Gray et al. (Mar. 5, 2004) "High-Conductivity Elastomeric Electronics," Adv. Mater. 16(5):393-397.
Grayson, T. (2002) "Curved Focal Plane Wide Field of View Telescope Design," Proc. SPIE 4849:269-274.
Gruen et al. (Mar. 21, 1994) "Fullerenes as Precursors for Diamond Film Growth Without Hydrogen or Oxygen Additions," Appl. Phys. Lett. 65(12):1502-1504.
Gudiksen et al. (Web Release Apr. 18, 2001) "Synthetic Control of the Diameter and Length of Single Crystal Semiconductor Nanowires," J. Phys. Chem. B 105:4062-4064.
Guo et al. (Aug. 19, 2002) "Metal-Insulator-Semiconductor Electrostatics of Carbon Nanotubes," Appl. Phys. Lett. 81(8):1486-1488.

(56) References Cited

OTHER PUBLICATIONS

Gur et al. (2005) "Air-Stable All-Inorganic Nanocrystal Solar Cells Processed from Solution," *Science* 310:462-465.
Gurbuz et al. (Jul. 2005) "Diamond Semiconductor Technology for RF Device Applications." *Solid State Electron.* 49(7):1055-1070.
Haisma et al. (2002) "Contact Bonding, Including Direct-Bonding in a Historical and Recent Context of Materials Science and Technology, Physics and Chemistry," *Mater. Sci Eng.* 37:1-60.
Halik et al. (2004) "Low-Voltage Organic Transistors with an Amorphous Molecular Gate Dielectric," *Nature* 431:963-966.
Hamedi et al. (May 2007) "Towards Woven Logic from Organic Electronic Fibres," *Nat. Mater.* 6:357-362.
Hamilton et al. (2004) "Field-Effect Mobility of Organic Polymer Thin-Film Transistors," *Chem. Mater.* 16:4699-4704.
Han et al. (2005) "Template-Free Directional Growth of Single-Walled Carbon Nanotues on a- and r-Plane Sapphire," *J. Am. Chem. Soc.* 127:5294-5295.
Harada et al. (2001) "Catalytic Amplification of the Soft Lithographic Patterning of Si. Nonelectrochemical Orthogonal Fabrication of Photoluminescent Porous Si Pixel Arrays," *J. Am. Chem. Soc.* 123:8709-8717.
Harkonen et al. (Jun. 8, 2006) "4 W Single-Transverse Mode VECSEL Utilizing Intra-Cavity Diamond Heat Spreader," *Electron Lett.* 42(12):693-694.
He et al. (2005) "Si Nanowire Bridges in Microtrenches: Integration of Growth into Device Fabrication," *Adv. Mater.* 17:2098-2102.
Heffelfinger et al. (1997) "Steps and the structure of the (0001) α-alumina surface," *Surf. Sci.*, 370:L168-L172.
Hillbrog et al. (Web Release Dec. 30, 2003) "Nanoscale Hydrophobic Recovery: A Chemical Force Microscopy Study of UV/Ozone-Treated Cross-Linker Poly(dimethylsiloxane)," *Langmuir* 20(3):785-794.
Hines et al. (2005) "Nanotransfer Printing of Organic and Carbon Nanotube Thin-Film Transistors on Plastic Substrates," *Appl. Phys. Lett.* 86:163101.
Holmes et al. (Feb. 25, 2000) "Control of Thickness and Orientation of Solution-Grown Silicon Nanowires," *Science* 287:1471-1473.
Horn et al. (1992) "Contact Electrification and Adhesion Between Dissimilar Materials," *Science* 256:362-364.
Hoskins (1990) "Metamorphosis of the Amphibian Eye," *J. Neurobiol.* 21:970-989.
Hoyer, P. (1996) "Semiconductor Nanotube Formation by a Two-Step Template Process," *Adv. Mater.* 8:857-859.
Hsia et al. (2005) "Collapse of Stamps for Soft Lithography Due to Interfacial Adhesion," *Appl. Phys. Lett.* 86:154106.
Hsu et al. (2002) "Amorphous Si TFTs on Plastically Deformed Spherical Domes," *J. Non-Crystalline Solids* 299-302:1355-1359.
Hsu et al. (2003) "Nature of Electrical Contacts in a Metal-Molecule-Semiconductor System," *J. Vac. Sci. Technol. B* 21(4):1928-1935.
Hsu et al. (Jan. 15, 2004) "Spherical Deformation of Compliant Substrates with Semiconductor Device Islands," *J. Appl. Phys.* 95(2):705-712.
Hsu et al. (Mar. 2004) "Effects of Mechanical Strain on TFT's on Spherical Domes," *IEEE Trans. Electron Dev.* 51(3):371-377.
Hu et al. (1997) "Using Soft Lithography to Fabricate GaAs/AlGaAs Heterostructure Field Effect Transistors," *Appl. Phys. Lett.* 71:2020-2022.
Hu et al. (1999) Chemistry and Physics in One Dimension: Synthesis and Properties of Nanowires and Nanotubes, *Acc. Chem. Res.* 32:435-445.
Hu et al. (2004) "Percolation in Transparent and Conducting Carbon Nanotube Networks," *Nano Lett.*, vol. 4, No. 12, pp. 2513-2517.
Huang et al. (2001) "Directed Assembly of One-Dimensional Nanostructures into Functional Networks," *Science* 291:630-633.
Huang et al. (2001) "Room-Temperature Ultraviolet Nanowire Nanolasers," *Science* 292:1897-1899.
Huang et al. (2003) "Growth of Millimeter-Long and Horizontally Aligned Single-Walled Walled Carbon Nanotubes on Flat Substrates," *J. Am. Chem. Soc.*, 125:5636-5637.
Huang et al. (2004) "Long and Oriented Single-Walled Carbon Nanotubes Grown by Ethanol Chemical Vapor Deposition," *J. Phys. Chem. B.* 108:16451-16456.
Huang et al. (2004) "Self-Organizing High-Density Single-Walled Carbon Nanotube Arrays from Surfactant Suspensions," *Nanotechnol.* 15:1450-1454.
Huang et al. (2005) "Nanomechanical Architecture of Strained Bilayer Thin Films: From Design Principles to Experimental Fabrication," *Adv. Mater.* 17(23):2860-2864.
Huang et al. (2005) "Nanowires for Integrated Multicolor Nanophotonics," *Small* 1(1):142-147.
Huang et al. (2005) "Nonlinear Analyses of Wrinkles in a Film Bonded to a Compliant Substrate," *J. Mech. Phys. Solids* 53:2101-2118.
Huang et al. (2005) "Stamp Collapse in Soft Lithography," *Langmuir* 21:8058-8068.
Huang et al. (Jan. 16, 2001) "Catalytic Growth of Zinc Oxide Nanowires by Vapor Transport," *Adv. Mater.* 13(2):113-116.
Huck et al. (2000) "Ordering of Spontaneously Formed Buckles on Planar Surfaces," *Langmuir* 16:3497-3501.
Huie, J.C. (2003) "Guided Molecular Self Assembly: A review of Recent Efforts," *Smart Mater. Struct.* 12:264-271.
Huitema et al. (2001) "Plastic Transistors in Active-Matrix Displays," *Nature* 414:599.
Hung et al. (2004) "Microfabricated Suspensions for Electrical Connections on the Tunable Elastomer Membrane," *Appl. Phys. Lett.* 85:6051-6053.
Hur et al. (2005) "Printed thin-film transistors and complementary logic gates that use polymer-coated single-walled carbon nanotube networks," *J. Appl. Phys.*, 98, 114302.
Hur et al. (2005) "Organic Nanodielectrics for Low Voltage Carbon Nanotube Thin Film Transistors and Complementary Logc Gates," *J. Am. Chem. Soc.* 127:13808-13809.
Hur et al. (Dec. 2004) "Nanotransfer Printing by Use of Noncovalent Surface Forces: Applications to Thin-Film Transistors that Use Single-Walled Carbon Nanotube Networks and Semiconducting Polymers," *Appl. Phys. Lett.* 85(23):5730-5732.
Hur etal. (Jun. 13, 2005) "Extreme Bendability of Single Walled Carbon Nanotube Networks Transferred From High-Temperature Growth Substrates to Plastic and Their Use in Thin-Film Transistors," *Appl. Phys. Lett.* 243502.
Hutchinson et al. (1992) "Mixed Mode Cracking in Layered Materials," *Adv. Appl. Mech.* 29:63-191.
Imparato et al. (2005) "Excimer Laser Induced Crystallization of Amorphous Silicon on Flexible Polymer Substrates," *Thin Solid Films* 487:58-62.
International Search Report and Written Opinion corresponding to International Application No. PCT/US2012/021092, mailed May 23, 2012.
International Search Report and Written Opinion, Corresponding to International Application No. PCT/2005/014449, Mailed Jul. 3, 2008.
International Search Report and Written Opinion, Corresponding to International Application No. PCT/US2006/032125, Mailed Mar. 21, 2008.
International Search Report and Written Opinion, Corresponding to International Application No. PCT/US2009/036192, Mailed Jul. 6, 2009.
International Search Report and Written Opinion, Corresponding to International Application No. PCT/US2009/058231, Mailed Nov. 17, 2009.
International Search Report and Written Opinion, Corresponding to International PCT Application No. PCT/US05/19354, Dated Apr. 18, 2007.
International Search Report and Written Opinion, Corresponding to International PCT Application No. PCT/US2006/021161, Mailed Feb. 28, 2008.
International Search Report and Written Opinion, Corresponding to International PCT Application No. PCT/US2007/022959, Mailed Oct. 14, 2008.
International Search Report and Written Opinion, Corresponding to International PCT Application No. PCT/US2007/077759, Mailed Apr. 11, 2008.

(56) References Cited

OTHER PUBLICATIONS

International Search Report and Written Opinion, Corresponding to International PCT Application No. PCT/US2007/079070, Mailed Apr. 23, 2008.
Isberg et al. (Sep. 6, 2002) "High Carrier Mobility in Single-Crystal Plasma-Deposited Diamond," *Science* 297:1670-1672.
Islam et al. (Jan. 16, 2003) "High Weight Fraction Surfactant Solubilization of Single-Wall Carbon Nanotubes in Water," *Nano Lett.* 3(2):269-273.
Ismach et al. (2004) "Atomic-Step-Templated Formation of Single Wall Carbon Nanotube Patters," *Angew. Chem. Int. Ed.* 43:6140-6143.
Itoh et al. (1991) "Cathodoluminescence Properties of Undoped and Zn-Doped $Al_xGa_{1-x}N$ Grown by Metaloganic Vapor Phase Epitaxy," *Jap. J. Appl. Phys.* 30:1604-1608.
Jabbour et al. (2001) "Screen Printing for the Fabrication of Organic Light-Emitting Devices," *IEEE J. Select. Top. Quantum. Electron.* 7:769-773.
Jackman et al. (Aug. 4, 1995) "Fabrication of Submicrometer Features on Curved Substrates by Microcontact Printing," *Science* 269:664-666.
Jacobs et al. (2002) "Fabrication of a Cylindrical Display by Patterned Assembly," *Science* 296:323-325.
Jain et al. (2000) "III-Nitrides: Growth, Characterization, and Properties," *J. Appl. Phys.* 87:965-1006.
Jain et al. (2005) "Flexible Electronics and Displays: High-Resolution, Roll-to-Roll, Projection Lithography and Photoblation processing Technologies for Hiogh-Throughput Production," *Proc. IEEE* 93:1500-1510.
James et al. (1998) "Patterned Protein Layers on Solid Substrates by This Stamp Microcontact Printing," *Langmuir* 14:742-744.
Jang et al. (2003) "Lateral Growth of Aligned Multiwalled Carbon Nanotubes Under Electric Fiels," *Solid State Commun.* 126:305-308.
Jang et al. (2006) "Low-Voltage and High-Field-Effect Mobility Organic Transistors with a Polymer Insulator," *Appl. Phys. Lett.* 88:072101.
Javey et al. (2002) "High-κ Dielectrics for Advanced Carbon-Nanotube Transistors and Logic Gates," *Nature Mater.* 1:241-246.
Javey et al. (2005) "High Performance n-Type Carbon Nanotube Field-Effect Transistors with Chemically Doped Contacts," *Nano Lett.*, vol. 5, No. 2, pp. 345-348.
Javey et al. (Aug. 7, 2003) "Ballistic Carbon Nanotube Field-Effect Transistors," *Nature* 424:654-657.
Jenkins et al. (1994) "Gallium Arsenide Transistors: Realization Through a Molecularly Designs Insulator," *Science* 263:1751-1753.
Jeon et al. (1995) "Patterning of Dielectric Oxide Thin Layers by Microcontact . Printing of Self-Assembled Monolayers," *J. Mater. Res.* 10:2996-2999.
Jeon et al. (2004) "Fabricating Complex Three-Dimensional Nanostructures with High Resolution Conformable Phase Masks," *Proc. Natl. Acad. Sci. USA* 101:12428-12433.
Jeon et al. (Aug. 4, 2004) "Three Dimensional Nanofabrication with Rubber Stamps and Conformable Photomasks," *Adv. Mater.* 16(15):1369-1375.
Jiang et a. (Oct. 2, 2007) "Finite Deformation Mechanics in Buckled Thin Films on Compliant Supports," *Proc. Natl. Acad. Sci. USA* 104(40):15607-15612.
Jiang et al. (1999) "Preparation of Macroporous Metal Films from Colloidal Crystals," *J. Am. Chem. Soc.* 121:7957-7958.
Jiang et al. (2002) "Polymer-on-Polymer Stamping: Universal Approaches to Chemically Patterned Surfaces," *Langmuir* 18:2607-2615.
Jin et al. (2004) "Scalable Interconnection and Integration of Nanowire Devices Without Registration," *Nano Lett.* 4:915-919.
Jin et al. (2004) "Soft Lithographic Fabrication of an Image Sensor Array on a Curved Substrate," *J. Vac. Sci. Technol. B* 22(5):2548-2551.
Joachim et al. (Nov. 30, 2000) "Electronics Using Hybrid-Molecular and Mono-Molecular Molecular Devices," *Nature* 408:541-548.

Johnson et al. (1999) "Ordered Mesoporous Polymers of Tunable Pore Size from Colloidal Silica Templates," *Science* 283:963-965.
Jones et al. (Jul./Aug. 2004) "Stretchable Wavy Metal Interconnects," *J. Vac. Sci. Technol. A* 22(4):1723-1725.
Joo et al. (2006) "Low-Temperature Solution-Phase Synthesis of Quantum Well Structures CdSe Nanoribbons," *J. Am. Chem. Soc.* 128(17):5632-5633.
Jortner et al. (2002) "Nanostructured Advanced Materials Perspectives and Directions," *Pure Appl. Chem.* 74(9):1491-1506.
Joselevich (2002) "Vectorial Growth of Metallic and Semiconducting Single-Wall Carbon Nanotubes," *Nano Lett.*, vol. 2, No. 10, pp. 1137-1141.
Jung et al. (2010) "Paraboloid Electronic Eye Cameras Using Deformable Arrays of Photodetectors in Hexagonal Mesh Layouts," *Appl. Phys. Lett.* 96:021110.
Jung et al. (2011) "Dynamically Tunable Hemispherical Electronic Eye Camera System with Adjustable Zoom Capability," *Proc. Natl. Acad. Sci. USA*.108(5):1788-1793.
Kagan (1999) "Organic-Inorganic Hybrid Materials as Semiconducting Channels in Thin-Film Field-Effect Transistors," *Science* 286:945-947.
Kagan et al. (2001) "Patterning Organic-Inorganic Thin-Film Transistors Using Microcontact Printed Templates," *Appl. Phys Lett.* 79(21):3536-3538.
Kagan et al. (2003) *Thin Film Transistors*, Dekker, New York, pp. 1-34.
Kane et al. (2000) "Analog and Digital Circuits Using Organic Thin-Film Transistors on Polyester Substrates," *IEEE Electron. Dev. Lett.* 21:534-536.
Kang et al. (Apr. 2007) "High-Performance Electronics Using Dnese, Perfectly aligned Arrays of Single-Walled Carbon Nanotubes," *Nat. Nanotechnol.* 2(4):230-236.
Kar et al. (2005) "Controlled Synthesis and Photoluminescence Properties of ZnS Nanowires and Nanoribbons," *J. Phys. Chem. B* 109(8):3298-3302.
Kar et al. (2005) "Synthesis and Optical Properties of CdS Nanoribbons," *J. Phys. Chem B*. 109(41):19134-19138.
Kar et al. (2006) "Shape Selective Growth of CdS One-Dimensional Nanostructures by a Thermal Evaporation Process," *J. Phys. Chem. B.* 110(10):4542-4547.
Karnik et al. (2003) "Lateral Polysilicon $p^+$-p-$n^+$ and $p^+$-n-$n^+$ Diodes," *Solid-State Electronics* 47:653-659.
Karnik et al. (2003) "Multiple Lateral Polysilicon Diodes as Temperature Sensors for Chemical Microreaction Systems," *Jpn. J. Appl. Phys.* 42:1200-1205.
Kato et al. (2004) The Characteristic Improvement of Si(111) Metal-OxideSemiconductor Field-Effect Transistor by Long-Time Hydrogen Annealing, *Jpn. J. Appl. Phys.* 43(10):6848-6853.
Katz et al. (2001) "Synthetic Chemistry for Ultrapure, Processable, and High-Mobility Organic Transistor Semiconductors," *Acc. Chem. Res.* 34:359-369.
Katz, H.E. (2004) "Recent Advances in Semiconductor Performance and Printing Processes for Organic Transistor-Based Electronics," *Chem. Mater.* 16:4748-4756.
Kawata et al. (2001) "Finer Features for Functional Microdevices," *Nature* 412:697-698.
Kendall, D.L. (1979) "Vertical Etching of Silicon at Very High Apect Ratios," *Ann. Rev. Mater. Sci.* 9:373-403.
Khakani et al. (2006) "Lateral Growth of Single Wall Carbon Nanotubes on Various Substrates by Means of an 'All-Laser' Synthesis Approach," *Diamond Relat. Mater.* 15:1064-1069.
Khan et al. (1993) "High Electron Mobility Transistor Based on a GaN—$Al_xGa_{1-x}N$ Heterojunction," *Appl. Phys. Lett.* 63:1214-1215.
Khang et al. (2006) "A Stretchable Form of Single-Crystal Silicon for High-Performance Electronics on Rubber Substraights," *Science* 311:208-212.
Kilby, J.S. (1976) "Invention of the Integrated Circuit," *IEEE Trans. Electron. Dev.* 23:648-654.
Kim et al. (2000) "Field Emission from Carbon Nanotubes for Displays," *Diamond and Related Mater.* 9(3-6):1184-1189.
Kim et al. (2002) "Nanolithography Based on Patterned Metal Transfer and Its Application to Organic Electronic Devices," *Appl. Phys. Lett.* 80:4051-4053.

(56) References Cited

OTHER PUBLICATIONS

Kim et al. (2003) "Epitaxial Self-Assembly of Block Copolymers on Lithographically Defined Nanopatterned Substrates," *Nature* 424:411-414.
Kim et al. (2009) "Optimized Structural Designs for Stretchable Silicon Integrated Circuits," *Small* 5(24):2841-2847.
Kim et al. (Apr. 25, 2008) "Stretchable and Foldable Silicon Integrated Circuits," *Science* 320:507-511.
Kim et al. (Dec. 2, 2008) "Materials and Noncoplanar Mesh Designs for Integrated Circuits with Linear Elastic Responses to Extreme Mechanical Deformations," *Proc. Natl. Acad. Sci. USA* 105(48):18675-18680.
Kim et al. (Jan. 2008) "Complementary Logic Gates and Ring Oscillators Plastic Substrates by Use of Printed Ribbons Single-Crystalline Silicon," *IEEE Electron. Dev. Lett.* 29(1):73-76.
Kim et al. (Nov. 15, 1999) "Direct Observation of Electron Emission Site on Boron-Doped Polycrystalline Diamond Thin Films Using an Ultra-High-Vacuum Scanning Tunneling Microscope," *Appl. Phys. Lett.* 75(20):3219-3221.
Kim et al. (Oct. 2004) "Organic TFT Array on a Paper Substrate," *IEEE Electron. Dev. Lett.* 25(10):702-704.
Kim et al. (Web Release Feb. 29, 2008) "Highly Emissive Self-Assembled Organic Nanoparticles Having Dual Color Capacity for Targeted Immunofluorescence Labeling," *Adv. Mater.* 20(6):1117-1121.
Kim et al. (Web Release Jul. 6, 2009) "Ultrathin Silicon Circuits with Strain-Isolation Layers and Mesh Layouts for High-Performance Electronics on Fabric, Vinyl, Leather and Paper," *Adv. Mater.* 21(36):3703-3707.
Kim, Y.S. (Web Release Aug. 9, 2005) "Microheater-Integrated Single Gas Sensor Array Chip Fabricated on Flexible Polyimide Substrate," *Sens. Actuators B* 114(1):410-417.
Klauk et al. (2002) "High-Mobility Polymer Gate Dielectric Pentacene Thin Film Transistors," *J. Appl. Phys.* 92:5259-5263.
Klein-Wiele et al. (2003) "Fabrication of Periodic Nanostructures by Phase-Controlled Controlled Multiple-Beam Interference," *Appl. Phys. Lett.* 83(23):4707-4709.
Knipp et al. (2003) "Pentacene Thin Film Transistors on Inorganic Dielectrics: Morphology, Structural Properties, and Electronic Transport," *Appl. Phys. Lett.* 93:347-355.
Ko et al. (2006) "Bulk Quantities of Single-Crystal Silicon Micro-/Nanoribbons Generated from Bulk Wafers," *Nano Lett.* 6(10):2318-2324.
Ko et al. (Aug. 7, 2008) "A Hemispherical Electronic Eye Camera Based on Compressible Silicon Optoelectronics," *Nature* 454:748-753.
Ko et al. (Web Release Oct. 28, 2009) "Curvilinear Electronics Formed Using Silicon Membrane Circuits and Elastomeric Transfer Elements," *Small* 5(23):2703-2709.
Kocabas et al. (2004) "Aligned Arrays of Single-Walled Carbon Nanotubes Generated from Random Networks by Orientationally Selective Laser Ablation," *Nano Lett.*, vol. 4, No. 12, pp. 2421-2426.
Kocabas et al. (2005) "Guided Growth of Large-Scale, Horizontally Aligned Arrays of Single-Walled Carbon Nanotubes and Their Use in Thin-Film Transstors," *Small* 1(11):1110-1116.
Kocabas et al. (2006) "Large Area Aligned Arrays of SWNTs for High Performance Thin Film Transistors," American Physical Society, APS March Meeting, Mar. 13-17, Abstract # W31.004.
Kocabas et al. (2006) "Spatially Selective Guided Growth of High-Coverage Arrays and Random Networks of Single-Walled Carbon Nanotbes and Thir Integration into Electronic Devices," *J. Am. Chem. Soc.* 128:4540-4541.
Kocabas et al. (Feb. 5, 2008) "Radio Frequency Analog Electronics Based on Carbon Nanotube Transistors," *Proc. Natl. Acad. Sci. USA* 105(5):1405-1409.
Kodambaka et al. (2006) "Control of Si Nanowire Growth by Oxygen," *Nano Lett.* 6(6):1292-1296.
Koide et al. (2000) "Patterned Luminescence of Organic Light-Emitting Diodes by Hot Microcontact Printing (HCP) of Self-Assembled Monolayers," *J. Am. Chem. Soc.* 122:11266-11267.
Konagai et al. (1978) "High Efficiency GaAs Thin Film Solar Cells by Peeled Film Technology," *J. Cryst. Growth* 45:277-280.
Kong et al. (2004) "Single-Crystal Nanorings Formed by Epitaxial Self-Coating of Polar Nanobelts," *Science* 303:1348-1351.
Kong et al. (Jan. 28, 2000) "Nanotube Molecular Wires as Chemical Sensors," *Science* 287:622-625.
Kong et al. (Oct. 2003) "Structure of Indium Oxide Nanobelts," *Solid State Commun.* 128(1):1-4.
Kong et al. (Oct. 29, 1998) "Synthesis of Individual Single-Walled Carbon Nonotubes on Patterned Silicon Wafers," *Nature* 395:878-881.
Kudo et al. (Web Release Jun. 13, 2006) "A Flexible and Wearable Glucose Sensor Based on Functional Polymers with Soft-MEMS Techniques," *Biosens. Bioelectron.* 22:558-562.
Kulkarni et al. (2002) "Mesoscale Organization of Metal Nanocrystals," *Pure Appl. Chem* 74(9):1581-1591.
Kumar et al. (1993) "Features of Gold Having Micrometer to Centimeter Dimensions can be Formed Through a Combination of Stamping with an Elastomeric Stamp and an Alkanethiol "Ink" Followed by Chemical Etching," *Appl. Phys. Lett.* 63(4):2002-2004.
Kumar et al. (1994) "Patterning Self-Assembled Monolayers: Applications in Materials Science," *Langmuir* 10:1498-1511.
Kumar et al. (2002) "Thermally-Stable Low-Resistance Ti/Al/Mo/Au Multilayer Ohmic Contacts on n-GaN," *J. Appl. Phys.* 92:1712-1714.
Kumar et al. (2005) "Percolating in Finite Nanotube Networks," *Phys. Rev. Lett.*, 95, 066802.
Kuo et al. (1985) "Effect of Mismatch Strain on Band Gap in III-V Semiconductors," *J. Appl. Phys.* 57:5428-5432.
Kuykendall et al. (Aug. 2004) "Crystallographic Alignment of High Density Gallium Nitride Nanowire Arrays," *Nat. Mater.* 3:524-528.
Lacour et al. (2005) "Stretchable Interconnects for Elastic Electronic Surfaces," *Proc. IEEE* 93:1459-1467.
Lacour et al. (Apr. 14, 2003) "Stretchable Gold Conductors on Elastomeric Substrates," *Appl. Phys. Lett.* 82(15):2404.
Lacour et al. (Apr. 2004) "Design and Performance of Thin Metal Film Interconnects for Skin-Like Electronic Circuits," *IEEE Electron. Dev. Lett.* 25(4):179-181.
Lacour et al. (Dec. 2004) "An Elastically Stretchable TFT Circuit," *IEEE Electron Dev. Lett.* 25(12):792-794.
Lacour et al. (Web Release Jul. 14, 2006) "Stiff Subcircuit Islands of Diamondlike Carbon for Stretchable Electronics," *J. Appl. Phys.* 100:014913.
Lacour et al. (Web Release May 16, 2006) "Mechanisms of Reversible Stretchability of Thin Metal Films on Elastomeric Substrates," *Appl. Phys. Lett.* 88:204103.
Laimer et al. (Mar. 1997) "Diamond Growth in a Direct-Current Low-Pressure Supersonic Plasmajet," *Diamond Relat. Mater.* 6:406-410.
Lambacher et al. (2004) "Electrical Imaging of Neuronal Activity by Multi-Transistor-Array (MTA) Recording at 7.8 μm Resolution," *Appl. Phys. A* 79:1607-1611.
Landes et al. (2002) "Some Properties of Spherical and Rod-Shaped Semiconductor and Metal Nanocrystals," *Pure Appl. Chem.* 74(9):1675-1692.
Law et al. (2004) "Semiconductor Nanowires and Nanotubes," *Ann. Rev. Mater. Res.* 34:83-122.
Law et al. (Aug. 27, 2004) "Nanoribbon Waveguides for Subwavelength Photonics Integration," *Science* 305:1269-1273.
Lay et al. (2004) "Simple Route to Large-Scale Ordered Arrays of Liquid-Deposited Carbon Nanotubes," *Nano Lett.*, vol. 4, No. 4, pp. 603-606.
Leclercq et al. (1998) "III-V Micromachined Devices for Microsystems," *Microelectronics J.* 29:613-619.
Lecomte et al. (Apr. 2006) "Degradation Mechanism of Diethylene Glycol Units in a Terephthalate Polymer," *Polym. Degrade. Stab.* 91(4):681-689.
Lee et al. (2000) "Thin Film Transistors for Displays on Plastic Substrates," *Solid State Electron.* 44:1431-1434.

(56) References Cited

OTHER PUBLICATIONS

Lee et al. (2003) "High-Performance Poly-Si TFTs on Plastic Substrates Using a Nano-Structured Separation Layer Approach," *IEEE Elec. Dev. Lett.* 24:19-21.
Lee et al. (2004)"Organic Light-Emitting Diodes Formed by Soft Contact Lamination," *Proc. Natl. Acad. Sci. USA* 101(2):429-433.
Lee et al. (2005) "A Printable Form of Single-Crystalline Gallium Nitride for Flexable Optoelectronic Systems," *Small* 1:1164-1168.
Lee et al. (2005) "Large-Area, Selective Transfer of Microstructured Silicon (μs-Si): A Printing-Based Approach to High-Performance Thin0Film Transistors Supported on Flexible Substraights," *Adv. Mater.* 17:2332-2336.
Lee et al. (2006) "Micron and Submicron Patterning of Polydimethylsiloxane Resists on Electronic Materials by Decal Transfer Lithography and Reactive Ion-Beam Etching: Application to the Fabrication of High-Mobility, Thin-Film Transistors," *Appl. Phys. Lett.* 100:084907/1-7.
Lee et al. (Apr. 2005) "Fabrication of Stable Metallic Patterns Embedded in Poly(dimethylsiloxane) and Model Applications in Non-Planar Electronic and Lab-on-a-Chip Device Patterning," *Adv. Funct. Mater.* 15(4):557-566.
Lee et al. (Dec. 1999) "The Surface/Bulk Micromachining (SBM) Process: A New Method for Fabricating Released MEMS in Single Crystal Silicon," *J. Microelectromech. Syst.* 8(4):409-416.
Lee et al. (Feb. 2001) "Application of Carbon Nanotubes to Field Emission Displays," *Diamond and Related Mater.* 10(2):265-270.
Lee et al. (Feb. 2005) "Weave Patterned Organic Transistors on Fiber for E-Textiles," *IEEE Trans. Electron. Dev.* 52(2):269-275.
Letant et al. (Jun. 2003) "Functionalized Silicon Membranes for Selective Bio-Organisms Organisms Capture," *Nat. Mater.* 2:391-395.
Li et al. (2002) "High-Resolution Contact Printing with Dendrimers," *Nano Lett.* 2(4):347-349.
Li et al. (2003) "Ultrathin Single-Crystalline-Silicon Cantilever Resonators: Fabrication Technology and Significant Specimen Size effect on Young's Modulus," *Appl. Phys. Lett.* 83:3081-3083.
Li et al. (2004) "Electrospinning of Nanofibers: Reinventing the Wheel," *Adv. Mater.* 16(14):1151-1170.
Li et al. (2006) "Catalyst-Assisted Formation of Nanocantilever Arrays on ZnS Nanoribbons by Post-Annealing Treatment," *J. Phys. Chem. B* 110(13):6759-6762.
Li et al. (Dec. 2005) "Compliant Thin Film Patterns of Stiff Materials as Platforms for Stretchable Electronics," *J. Mater. Res.* 20(12):3274-3277.
Li et al. (Jul. 1, 2002) "ZnO Nanobelts Grown on Si Substrate," *Appl. Phys. Lett.* 81:144-146.
Lieber, C. (2001) "The Incredible Shrinking Circuit," *Sci. Am.* 285(3):58-64.
Lieber, C.M. (2003) "Nanoscale Science and Technology: Building a Bog Future from Small Things," *MRS. Bull.* 28:486-491.
Lim et al. (2005) "Flexible Membrane Pressure Sensor," *Sens. Act. A* 119:332-335.
Lima et al. (2007) "Creating Micro- and Nanostructures on Tubular and Spherical Surfaces," *J. Vac. Sci. Technol. B2* 5(6):2412-2418.
Lin et al. (Sep. 2005) "High-Performance Carbon Nanotube Field-Effect Transistor With Tunable Polarities," *IEEE Trans. Nano* 4(5):481-489.
Linder et al. (1994) "Fabrication Technology for Wafer Through-Hole Interconnections and Three-Dimensional Stacks of Chips and Wafers," *Proc. IEEE Micro. Electro Mech. Syst.* 349-354.
Ling et al. (2004) "Thin Film Deposition, Patterning, and Printing in Organic Thin Film Transistors," *Chem. Mater.* 16:4824-4840.
Liu et al. (1999) "Controlled deposition of individual single-walled carbon nanotubes on chemically functionalized templates," *Chem. Phys. Lett.*, 303:125-129.
Long et al. (1990) "Heterostructure FETs and Bipolar Transistors," In; *Gallium Arsenide Digital Integrated Circuit Design*, McGraw-Hill, New York, pp. 58-69.

Loo et al. (2002) "Additive, Nanoscale Patterning of Metal Films with a Stamp and a Surface Chemistry Mediated Transfer Process: Applications in Plastic Electronics," *Appl. Phys. Lett.* 81:562-564.
Loo et al. (2002) "High-Resolution Transfer Printing on GaAs Surfaces Using Alkane Dithiol Monolayers," *J. Vac. Sci. Technol. B* 20(6):2853-2856.
Loo et al. (2002) "Interfacial Chemistries for Nanoscale Transfer Printing," *J. Am. Chem. Soc.* 124:7654-7655.
Loo et al. (2002) "Soft, Conformable Electrical Contacts for Organic Semiconductors: High-Resolution Plastic Circuits by Lamination," *Proc. Natl. Acad. Sci. USA* 99(16):10252-10256.
Loo et al. (2003) "Electrical Contacts to Molecular Layers by Nanotransfer Printing," *Nano Lett.* 3(7):913-917.
Lopes et al. (Sep. 2004) "Thermal Conductivity of PET/(LDPE/AI) Composites Determined by MDSC," *Polym. Test.*23(6):637-643.
Lu et al. (Dec. 2006) "Electronic Materials-Buckling Down for Flexible Electronics," *Nat. Nanotechnol.* 1:163-164.
Lu et al. (Jul. 19, 2005) "One Dimensional Hole Gas in Germanium/Silicon Nanowire Heterostructures," *Proc. Nat. Acad. Sci. USA* 102(29):10046-10051.
Lu et al. (Nov. 2008) "Nanowire Transistor Performance Limits and Applications," *IEEE Trans Electron Dev.* 55(11):2859-2876.
Luan et al. (1992) "An Experimental Study of the Source/Drain Parasitic Resistance Effects in Amorphous Silicon Thin Film Transistors," *J. Appl. Phys.* 72:766-772.
Ma et al. (2004) "Single-Crystal CdSe Nanosaws," *J. Am. Chem. Soc.* 126(3):708-709.
Mack et al. (2006) "Mechanically Flexible Thin-Film Transistors that Use Ultrathin Ribbons of Silicon Derived from Bulk Wafers," *Appl. Phys. Lett.* 88:213101.
Madou, M. (1997) "Etch-Stop Techniques," In; *Fundamentals of Microfabrication*, CRC Press, New York, pp. 193-199.
Maikap et al. (2004) "Mechanically Strained-Si NMOSFETs," *IEEE Electron. Dev. Lett.* 25:40-42.
Maldovan et al. (2004) "Diamond-Structured Photonic Crystals," *Nature Materials* 3:593-600.
Malyarchuk et al. (2010) "Experimental and Modeling Studies of Imaging with Curvilinear Electronic Eye Cameras," *Optics Express.* 18:27346-27358.
Mandlik et al. (Aug. 2006) "Fully Elastic Interconnects on Nanopatterned Elastomeric Substrates," *IEEE Electron Dev. Lett.* 27(8):650-652.
Manna et al. (Web Release May 25, 2003) "Controlled Growth of Tetrapod-Branched Inorganic Nanocrystals," *Nat. Mater.* 2:382-385.
Markovich et al. (1999) "Architectonic Quantum Dot Solids," *Acc. Chem. Res.* 32:415-423.
Marquette et al. (2004) "Conducting Elastomer Surface Texturing: A Path to Electrode Spotting Application to the Biochip Production," *Biosens. Bioelectron.* 20:197-203.
Martensson et al. (2004) "Nanowire Arrays Defined by Nanoimprint Lithography," *Nano Lett.* 4:699-702.
Martin, C.R. (1995) "Template Synthesis of Electronically Conductive Polymer Nanostructures," *Acc. Chem. Res.* 28:61-68.
Mas-Torrent et al. (2006) "Large Photoresponsivity in High-Mobility Single-Crystal Organic Field-Effect Phototransistors," *ChemPhysChem* 7:86-88.
Masuda et al. (2000) "Fabrication of Ordered Diamonds/Metal Nanocomposite Structures," *Chem. Lett.* 10:1112-1113.
Matsunaga et al. (2003) "An Improved GaAs Device Model for the Simulation of Analog Integrated Circuit," *IEEE Trans. Elect. Dev.* 50:1194-1199.
McAlpine et al. (2003) "High-Performance Nanowire Electronics and Photonics on Glass and Plastic Substrates," *Nano Lett.* 3:1531-1535.
McAlpine et al. (2005) "High-Performance Nanowire Electronics and Photonics and Nanoscale Patterning on Flexible Plastic Substrates," *Proc. IEEE* 93:1357-1363.
McCaldin et al. (1971) "Diffusivity and Solubility of Si in the Al Metallization of Integrated Circuits," *Appl. Phys. Lett.* 19:524-517.

(56) References Cited

OTHER PUBLICATIONS

Meisel et al. (2004) "Three-Dimensional Photonic Crystals by Holographic Lithography Using the Umbrella Configuration: Symmetries and Complete Photonic Band Gaps," *Phys. Rev. B.* 70:165101:1-10.
Meitl et al. (2004) "Solution Casting and Transfer Printing Single-Walled Carbon Nanotube Films," *Nano Lett.* 4:1643-1947.
Meitl et al. (2006) "Transfer Printing by Kinetic Control of Adhesion to an Elastomeric Stamp," *Nat. Mater.* 5:33-38.
Meitl et al. (Web Release Feb. 22, 2007) "Stress Focusing for Controlled Fracture in Microelectromechanical Systems," *Appl. Phys. Lett.* 90:083110.
Melosh et al. (2003) "Ultrahigh-Density Nanowire Lattices and Circuits," *Science* 300:112-115.
Menard et al. (2004) "A Printable Form of Silicon for High Performance Thin Film Transistors on Plastic Substrates," *Appl. Phys. Lett.* 84:5398-5400.
Menard et al. (2004) "Improved Surface Chemistries, Thin Film Deposition Techniques, and Stamp Designs for Nanotransfer Printing," *Langmuir* 20:6871-6878.
Menard et al. (2004) "High-Performance n- and p-Type Single-Crystal Organic Transistors with Free-Space Gate Dielectrics," *Adv. Mat.* 16:2097-2101.
Menard et al. (2005) "Bendable Single Crystal Silicon Thin Film Transistors Formed by Printing on Plastic Substrates," *Appl. Phys. Lett.* 86(093507):1-3.
Miao et al. (2003) "Micromachining of Three-Dimensional GaAs Membrane Structures Using High-Energy Nitrogen Implantation," *J. Micromech. Microeng.* 13:35-39.
Michel et al. (2001) Printing Meets Lithography: Soft Approaches to High-Resolution Patterning, *IBM J. Res. Dev.* 45:697-719.
Miller et al. (2002) "Direct Printing of Polymer Microstructures on Flat and Spherical Surfaces Using a Letterpress Technique," *J. Vac. Sci. Technol. B* 20(6):2320-2327.
Milliron et al. (2004) "Colloidal Nanocrystal Heterostructures with Linear and Branched Topology," *Nature* 430:190-195.
Min, G. (Apr. 4, 2003) "Plastic Electronics and Their Packaging Technologies," *Syn. Metals*. 135:141-143.
Mirkin et al. (2001) "Emerging Methods for Micro- and Nanofabrication," *MRS Bulletin* 26(7):506-507.
Misewich et al. (May 2, 2003) "Electronically Induced Optical Emission from a Carbon Nanotube FET," *Science* 300:783-786.
Mishra et al. (2002) "AlGaN/GaN HEMTs—an Overview of Device Operation and Applications," *Proc. IEEE* 90:1022-1031.
Mitzi et al. (2004) "High-Mobility Ulltrathin Semiconducting Films Prepared by Spin Coating," *Nature* 428:299-303.
Moon et al. (2002) "Ink-Jet Printing of Binders for Ceramic Components," *J. Am. Ceram. Soc.* 85:755-762.
Moore et al. (Sep. 9, 2003) "Individually Suspended Single-Walled Carbon Nanotubes in Various Surfactants," *Nano Lett.* 3(10):1379-1382.
Morales et al. (Jan. 9, 1998) "A Laser Ablation Method for the Synthesis of Crystalline Semiconductor Nanowires," *Science* 279:208-211.
Morent et al. (2007) "Adhesion Enhancement by a Dielectric Barrier Discharge of PDMS used for Flexible and Stretchable Electronics," *J. Phys. D. Appl. Phys.* 40:7392-7401.
Mori et al. (1978) "A New Etching Solution System, $H_3PO_4$—$H_2O_2$—$H_2O$, for GaAs and Its Kinetics," *J. Electrochem. Soc.* 125:1510-1514.
Morkoc et al. (1995) "High-Luminosity Blue and Blue-Green Gallium Nitride Light-Emitting Diodes," *Science* 267:51-55.
Morkved et al. (1994) "Mesoscopic Self-Assembly of Gold Islands on Diblock-Copolymer Films," *Appl. Phys. Lett.* 64:422-424.
Morra et al. (1990) "On the Aging of Oxygen Plasma-Treated Polydimthylsiloxane Surfaces," *J. Colloid Interface Sci.* 137:11-24.
Murakami et al. (2005) "Polarization Dependence of the Optical Absorption of Single-Walled Carbon Nanotubes," *Phys. Rev. Lett.*, 94, 087402.
Namazu et al. (2000) "Evaluation of Size Effect on Mechanical Properties of Single Crystal Silicon by Nanoscale Bending Test Using AFM," *J. MEMS* 9:450-459.
Nath et al. (2002) "Nanotubes of the Disulfides of Groups 4 and 5 Metals," *Pure Appl. Chem.* 74(9):1545-1552.
Nathan et al. (2000) "Amorphous Silicon Detector and Thin Film Transistor Technology for Large-Area Imaging of X-Rays,." *Microelectron J.* 31:883-891.
Nathan et al. (2002) "Amorphous Silicon Technology for Large Area Digital X-Ray and Optical Imaging," *Microelectronics Reliability* 42:735-746.
Newman et al. (2004) "Introduction to Organic Thin Film Transistors and Design of n-Channel Organic Semiconductors," *Chem. Mater.* 16:4436-4451.
Nirmal et al. (1999) "Luminescence Photophysics in Semiconductor Nanocrystals," *Acc. Chem. Res.* 32:407-414.
Noda et al. (1996) "New Realization Method for Three-Dimensional Photonic Crystal in Optical Wavelength Region," *Jpn. J. Appl. Phys.* 35:L909-L912.
Nomura et al. (2004) "Room-Temperature Fabrication of Transparent Flexible Thin-Film Transistors Using Oxide Semiconductors," *Nature* 432:488-492.
Notice of Non-Final Rejection corresponding to Korean Patent Application No. 10-2009-7017067, dated Aug. 30, 2013—Includes English Translation.
Notice of Reasons for Rejection corresponding to Japanese Patent Application No. P2006-165159, Dispatched Apr. 24, 2012—includes English translation.
Notice of Reasons for Rejection corresponding to Japanese Patent Application No. P2008-514820, Dispatched May 8, 2012—includes English translation.
Notice of Reasons for Rejection corresponding to Japanese Patent Application No. P2009-546361, Dispatched Jul. 3, 2012—includes English translation.
Notice of Reasons for Rejection corresponding to Japanese Patent Application No. P2009-546361, Dispatched Sep. 17, 2013—includes English translation.
Novoselov et al. (Oct. 22, 2004) "Electric Field Effect in Atomically Thin Carbon Films," *Science* 306:666-669.
O'Connell et al. (Jul. 26, 2002) "Bang Gap Fluorescence from Individual Single-Walled Caarbon Nanotubes," *Science* 297:593-596.
O'Riordan et al. (2004) "Field Configured Assembly: Programmed Manipulation and Self-Assembly at the Mesoscale," *Nano Lett.* 4:761-765.
Odom et al. (2002) "Improved Pattern Transfer in Soft Lithography Using Composite Stamps," *Langmuir* 18(13):5314-5320.
Office Action and Response, Corresponding to Malaysian Patent Publication No. PI 20052553, Mailed Mar. 13, 2009 and Dec. 8, 2009.
Office Action corresponding to U.S. Appl. No. 11/423,287, Mailed Feb. 13, 2008.
Office Action and Response, Corresponding to U.S. Appl. No. 11/421,654, Mailed Sep. 29, 2009.
Office Action Corresponding to Chinese Patent Application No. 200780049982.1, Issued May 12, 2010—Includes English Translation.
Office Actions Corresponding to U.S. Appl. No. 11/851,182, Mailed beginning Apr. 1, 2010.
Office Action Corresponding to U.S. Appl. No. 12/398,811, Mailed Nov. 26, 2012.
Office Action, Corresponding to Chinese Patent Application No. 200580013574.1, Issued May 11, 2010—Includes English Translation.
Office Action, Corresponding to Taiwan Patent Application No. 095121212, Issued May 7, 2010—Includes English Translation.
Office Action, Corresponding to U.S. Appl. No. 11/981,380, Mailed Jan. 28, 2011.
Office Action, Corresponding to U.S. Appl. No. 11/981,380, Mailed Sep. 23, 2010.
Office Action, Corresponding to U.S. Appl. No. 13/100,774, Mailed Jul. 18, 2013.

(56) References Cited

OTHER PUBLICATIONS

Office Action, Corresponding to U.S. Appl. No. 11/145,542, Mailed Apr. 5, 2007.
Office Action, Corresponding to U.S. Appl. No. 11/145,542, Mailed Jan. 3, 2008.
Office Action, Corresponding to U.S. Appl. No. 11/145,542, Mailed Jun. 25, 2008.
Office Actions, Corresponding to Chinese Patent Application No. 200580018159.5, Issued Jan. 23, 2009 and Feb. 12, 2010—English Translation Only.
Ohzono et al. (2004) "Ordering of Microwrinkle Patterns by Compressive Strain," *Phys. Rev. B* 69(13):132202.
Ohzono et al. (Web Release Jul. 7, 2005) "Geometry-Dependent Stripe Rearrangement Processes Induced by Strain on Preordered Microwrinkle Patterns," *Langmuir* 21(16):7230-7237.
Ong et al. (2004) "High-Performance Semiconducting Poolythiophenes for Organic Thin-Film Transistors," *J. Am. Chem. Soc.* 126:3378-3379.
Ong et al. (2005) "Design of High-Performance Regioreular Polythiophenes for Organic Thin-Film Transistors," *Proc. IEEE* 93:1412-1419.
Origin Energy (May 2004) "Fact Sheet—Sliver Cells," www.orginenergy.com.au/sliver.
Ouyang et al. (2002) "High-Performance, Flexible Polymer Light-Emitting Diodes Fabricated by a Continuous Polymer Coating Process," *Adv. Mat.* 14:915-918.
Ouyang et al. (2008) "High Frequency Properties of Electro-Textiles for Wearable Antenna Applications," *IEEE Trans. Antennas Propag.* 56(2):381-389.
Ouyang et al. (Web Release Mar. 20, 2000) "Conversion of Some Siloxane Polymers to Silicon Oxide by UV/Ozone Photochemical Processes," *Chem. Mater.* 12(6):1591-1596.
Pan et al. (2001) "Nanobelts of Semiconducting Oxides," *Science* 291:1947-1949.
Panev et al. (2003) "Sharp Excitation from Single InAs Quantum Dots in GaAs Nanowires," *Appl. Phys. Lett.* 83:2238-2240.
Pardo et al. (2000) "Application of Screen Printing in the Fabrication of Organic Ligh-Emitting Devices," *Adv. Mater.* 12(17):1249-1252.
Park et al. (1997) "Block Copolymer Lithography: Periodic Arrays of ~$10^{11}$ Holes in 1 Square Centimeter," *Science* 276:1401-1404.
Park et al. (1998) "Fabrication of Three-Dimensional Macroporous Membranes with Assemblies of Microspheres as templates," *Chem. Mater.* 10:1745-1747.
Patton et al. (Mar. 1998) "Effect of Diamond like Carbon Coating and Surface Topography on the Performance of Metal Evaporated Magnetic Tapes," *IEEE Trans Magn.* 34(2):575-587.
Paul et al. (Apr. 2003) "Patterning Spherical Surfaces at the Two Hundred Nanometer Scale Using Soft Lithography," *Adv. Func. Mater.* 13(4):259-263.
Pearton et al. (1999) "GaN: Processing, Defects, and Devices," *J. Appl. Phys.* 86:1-78.
Peng et al. (Mar. 2, 2000) "Shape Control of CdSe Nanocrystals," *Nature* 404:59-61.
Piazza et al. (2005) "Protective Diamond-Like Carbon Coatings for Future Optical Storage Disks," *Diamond Relat. Mater.* 14:994-999.
Podzorov et al. (2005) "Hall Effect in the Accumulation Layers on the Surface of Orgaic Semiconductors," *Phys. Rev. lett.* 95:226601.
Pushpa et al. (2002) "Stars and Stripes. Nanoscale Misfit Dislocation Patterns on Surfaces," *Pure Appl. Chem.* 74(9):1663-1671.
Quake et al (2000) "From Micro- to Nanofabrication with Soft Materials," *Science* 290:1536-1540.
Radtke et al. (Feb. 5, 2007) "Laser-Lithography on Non-Planar Surfaces," *Opt. Exp.* 15(3):1167-1174.
Raman et al. (1989) "Study of Mesa Undercuts Produced in GaAs with $H_3PO_4$-Based Etchants," *J. Electrochem. Soc.* 136:2405-2410.
Rao et al. (2003) "Large-scale assembly of carbon nanotubes," *Nature*, 425:36-37.
Razeghi et al. (1994) "High-Power Laser Diode Based on in GaAsP Alloys," *Nature* 369:631-633.

Razouk et al. (Sep. 1979) "Dependence of Interface State Density on Silicon Thermal Oxidation Process Variables," *J. Electrochem. Soc.* 126(9):1573-1581.
Reuss et al. (Jul. 2005) "Macroelectronics: Perspectives on Technology and Applications," *Proc. IEEE* 93(7):1239-1256.
Reuss et al. (Jun. 2006) "Macroelectronics," *MRS Bull.* 31:447-454.
Ribas et al. (1998) "Bulk Micromachining Characterization of 1.2 μm HEMT MMIC Technology for GaAs MEMS Design," *Mater. Sci. Eng. B* 51:267-273.
Ridley et al. (1999) "All-Inorganic Field Effect Transistors Fabricated by Printing," *Science* 286:746-749.
Rim et al. (2008) "The Optical Advantages of Curved Focal Plane Arrays," *Opt. Express.* 16:4965-4971.
Roberts et al. (1979) "Looking at Rubber Adhesion," *Rubber Chem. Technol.* 52:23-42.
Roberts et al. (Mar. 2006) "Elastically Relaxed Free-Standing Strained-Silicon Nanomembranes," *Nat. Mater.* 5:388-393.
Robinson et al. (1983) "GaAs Readied for High-Speed Microcircuits," *Science* 219:275-277.
Roelkens et al. (Dec. 2005) "Integration of InP/InGaAsP Photodetectors onto Silicon-on-Insulator Waveguide Circuits," *Optics Express* 13(25):10102-10108.
Rogers et al. (1997) "Using an Elastomeric Phase Mask for Sub-100 nm Photolithography in the Optical Near Field," *Appl. Phys. Lett.* 70:2658-2660.
Rogers et al. (1998) "Generating ~90 Nanometer Features Using Near Field Contact Mode Photolithography with an Elastomeric Phase Mask," *J. Vac. Sci. Technol.* 16(1):59-68.
Rogers et al. (1998) "Quantifying Distortions in Soft Lithography," *J. Vac. Sci. Technol.* 16:88-97.
Rogers et al. (1998) "Using Printing and Molding Techniques to Produce Distributed Feedback and Bragg Reflector Resonators for Plastic Lasers," *Appl. Phys. Lett.* 73:1766-1768.
Rogers et al. (1999) "Printing Process Sutable for Reel-to-Reel Production of High-Performance Organic Transistors and Circuits, *Adv. Mater.* 11(9):741-745.
Rogers et al. (2002) "Paper-Like Electronic Displays: Large-Area Rubber-Stamped Plastic Sheets of Electronics and Microencazpsulated Electrophoretic Inks," *Proc. Nat. Acad. Sci. USA* 98:4835-4840.
Rogers et al. (2002) "Printed Plastic Electronics and Paperlike Displays," *J. Polym. Sci. Part A. Polym. Chem.* 40:3327-3334.
Rogers et al. (Mar. 2000) "Organic Smart Pixels and Complementary Inverter Circuits Formed on Plastic Substrates by Casting and Rubber Stamping," *IEEE Electron Dev. Lett.* 21(3):100-103.
Rogers, J.A. (2001) "Rubber Stamping for Plastic Electronics and Fiber Optics," *MRS Bulletin* 26(7):530-534.
Rogers, J.A. (2001) "Toward Paperlike Displays," *Science* 291:1502-1503.
Rosenblatt et al. (2002) "High Performance Electrolyte Gated Carbon Nanotube Transistors," *Nano Lett.* 2(8):869-872.
Rotkin et al. (2003) "Universal Description of Channel Conductivity for Nanotube and Nanowire Transistors," *Appl. Phys. Lett.* 83:1623-1625.
Roundy et al. (2003) "Photonic Crystal Structure with Square Symetry within Each Layer and a Three-Dimensional Band Gap," *Appl. Phys Lett.* 82:3835-3837.
Ruchehoeft et al. (2000) "Optimal Strategy for Controlling Linewidth on Spherical Focal Surface Arrays," *J. Vac. Sci. Technol. B* 18(6):3185-3189.
Samuelson et al. (2004) "Semiconductor Nanowires for Novel One-Dimensional Devices," *Physica E* 21:560-567.
Sangwal et al. (1997) "Nature of multilayer steps on the {100} cleavage planes of MgO single crystals," *Surf. Sci.*, 383:78-87.
Sanyal et al. (2002) "Morphology of Nanostructures Materials," *Pure Appl. Chem.* 74(9):1553-1570.
Sazonov et al. (2005) "Low-Temperature Materials and Thin-Film Transistors for Flexible Electronics," *Proc. IEEE* 93:1420-1428.
Schermer et al. (Web Release Apr. 28, 2005) "Thin-Film GaAs Epitaxial Lift-Off Solar Cells for Space Applications," *Prog. Photovoltaics: Res. Applic.* 13:587-596.

(56) References Cited

OTHER PUBLICATIONS

Schermer et al. (Web Release Jan. 19, 2006) "Photon Confinement in High-Efficiency, Thin-Film III-V Solar Cells Obtained by Epitaxial Lift-Off," *Thin Solid Films* 511-512:645-653.

Schlegel et al. (2002) "Structures of quartz (1010)- and (1011)-water interfaces determined by X-ray reflectivity and atomic force microscopy of natural growth surfaces," *Geochim. Cosmochim. Acta*, vol. 66, No. 17, pp. 3037-3054.

Schmid et al. (2003) "Preparation of metallic Films on Elastomeric Stamps and Their Application on Contact Processing and Contact Printing," *Adv. Funct. Mater.* 13:145-153.

Schmid et al. (Mar. 25, 2000) "Siloxane Polymers for High-Resolution, High-Accuracy Accuracy Soft Lithography," *Macromolecules* 33(8):3042-3049.

Schmidt et al. (Mar. 8, 2001) "Thin Solid Films Roll up into Nanotubes," *Nature* 410:168.

Schnable et al. (1969) "Aluminum Metallization; Advantages and Limitations for Integrated Circuit Applications," *IEEE* 57:1570-1580.

Schneider et al. (2008) "Mechanical Properties of Silicones for MEMS," *J. Micromech. Microeng.* 18:065008.

Schon et al. (1995) "Ambipolar Pentacene Field-Effect Transistors and Inverters," *Science* 287:1022-1023.

Schrieber et al. (1998) "The Effectiveness of Silane Adhesion Promotors in the Performance of Polyurethane Adhesives," *J. Adhesion* 68:31-44.

Scorzoni et al. (Oct. 4, 2004) "On the Relationship Between the Temperature coefficient of Resistance and the Thermal Conductance of Integrated Metal Resistors," *Sens Actuators A* 116(1):137-144.

Search and Examination Report, Corresponding to Singapore Application No. 200904208-6, Mailed Dec. 17, 2010.

Search Report and Examination Report Corresponding to Singapore Patent Application No. 200901178-4, Completed Mar. 13, 2010.

Search Report Corresponding to Singapore Patent Application No. SG 200607372-0, Mailer Oct. 17, 2007.

Search Report Corresponding to Taiwanese Patent Application No. 095121212, Completed Oct. 8, 2010—Includes English Translation.

Search Report, Corresponding to Republic of China (Taiwan) Patent Application No. 094118507, Dated Feb. 24, 2007—English Translation Only.

Second Office Action corresponding to Chinese Patent Application No. 201110076041.5, Issued Nov. 5, 2012—includes English Translation.

Seidel et al. (2004) "High-Current Nanotube Transistors," *Nano Lett.*, vol. 4, No. 5, pp. 831-834.

Sekitani et al. (2005) "Bending Experiment on Pentacene Fiield-Effect Transistors on Plastic Films," *Appl. Phys. Lett.* 86:073511.

Sekitani et al. (Sep. 12, 2008) "A Rubberlike Stretchable Active Matrix Using Elastic Conductors," *Science* 321:1468-1472.

Sen et al. (2002) "Nonequilibrium Processes for Generating Silicon Nanostructures in Single-Crystalline Silicon," *Pure Appl. Chem.* 74(9):1631-1641.

Serikawa et al. (May 1, 2000) "High-Mobility Poly-Si Thin Film Transistors Fabricated on Stainless-Steel Foils by Low-Temperature Processes Using Sputter-Depositions," *Jpn. J. Appl. Phys.* 39:L393-L395.

Servanti et al. (2005) "Functional Pixel Circuits for Elastic AMOLED displays," *Proc. IEEE* 93:1257-1264.

Service, R.F. (Aug. 15, 2003) "Electronic Textiles Charge Ahead," *Science* 301:909-911.

Shan et al. (2004) "From Si Source Gas Directly to Positioned, Electrically Contained Si Nanowires: The Self-Assembling 'Grow-in-Place' Approach," *Nano Lett.* 4(11):2085-2089.

Sharp et al. (2003) "Holographic Photonic Crystals with Diamond Symmetry," *Phys. Rev. B* 68:205102/1-205102/6.

Shaw et al. (2010) "A Study of the Sensor Shape of a Hemispherical Electronic Eye Variable Focus Camera Lens," *Optical Review.* 17(6):541-548.

Sheraw et al. (2002) "Organic Thin-Film Transistor-Driven Polymer-Dispersed Liquid Crystal Displays on Flexible Polymeric Substrates," *Appl. Phys. Lett.* 80:1088-1090.

Shetty et al. (2005) "Formation and Characterization of Silicon Films on Flexible Polymer Substrates," *Mater. Lett.* 59:872-875.

Shi et al. (2001) "Free-Standing Single Crystal Silicon Nanoribbons," *J. Am. Chem. Soc.* 123(44):11095-11096.

Shi et al. (Sep. 2000) "Synthesis of Large Areas of Highly Oriented, Very Long Silicon Nanowires," *Adv. Mater.* 12(18):1343-1345.

Shin et al. (2010) "Micromechanics and Advanced Designs for Curved Photodetector Arrays in Hemispherical Electronic-Eye Cameras," Small. 6:851-856.

Shtein et al. (Oct. 15, 2004) "Direct Mask-Free Patterning of Molecular Organic Semiconductors Using Organic Vapor Jet Printing," *J. Appl. Phys.* 96(8):4500-4507.

Shull et al. (1998) "Axisymmetric Adhesion Tests of Soft Materials," *Macromol. Chem. Phys.* 199:489-511.

Siegel et al. (Web Release Feb. 7, 2007) "Microsolidics: Fabrication of Three-Dimensional Metallic Microstructures in Poly(dimethylsiloxane)," *Adv. Mater.* 19(5):727-733.

Sim et al. (1993) "An Analytical Back-Gate Bias Effect Model for Ultrathin SOI CMOS Devices," *IEEE Trans. Elec. Dev.* 40:755-765.

Sirringhaus et al. (2003) "Inkjet Printing of Functional Materials," *MRS Bull.* 28:802-806.

Sirringhaus et al. (Dec. 15, 2000) "High-Resolution Inkjet Printing of All-Polymer Transistor Circuits," *Science* 290:2123-2126.

Sirringhaus, H. (2005) "Device Physics of Solution-Processed Organic Field-Effect Transistors," *Adv. Mater.* 17:2411-2425.

Smay et al. (2002) "Colloidal Inks for Directed Assembly of 3-D Periodic Structures," *Langmuir* 18:5429-5437.

Smith et al. (2000) "Electric-Field Assisted Assembly and Alignment of Metallic Nanowires," *Appl. Phys. Lett.* 77(9):1399-1401.

Snow et al. (2003) "Random networks of carbon nanotubes as an electronic material," *Appl. Phys. Lett.*, vol. 82, No. 13, pp. 2145-2147.

Snow et al. (2005) "High-mobility carbon-nanotube transistors on a polymeric substrate," *Appl. Phys. Lett.*, 86, 033105.

Someya et al. (2005) "Conformable, Flexible, Large-Area Networks of Pressure and Thermal Sensors with Organic Transistor Active Matrixes," *Proc. Nat. Acad. Sci. USA* 102:12321-12325.

Someya et al. (2005) "Integration of Organic FETs with Organic Photodiodes for a Large Area, Flexible, and Lightweight Sheet Image Scanners," *IEEE Trans. Electron Devices* 52:2502-2511.

Someya et al. (Jul. 6, 2004) "A Large-Area, Flexible, Pressure Sensor Matric with Organic Field-Effect Transistors for Artificial Skin Applications," *Proc. Nat. Acad. Sci. USA* 101(27):9966-9970.

Song et al. (2009) "Mechanics of Noncoplanar Mesh Designs for Stretchable Electronic Circuits," *J. Appl. Phys.* 105:123516.

Soole et al. (Mar. 1991) "InGaAs Metal-Semiconductor-Metal Photodetectors for Long Wavelength Optical Communications," *IEEE J. Quantum Electron.* 27(3):737-752.

Srinivasan et al. (Web Release Mar. 26, 2007) "Piezoelectric/Ultrananocrystalline Diamond Heterostructures for High-Performance Multifunctional Micro/Nanoelectromechanical Systems," *Appl. Phys. Lett.* 90:134101.

Stafford et al. (Aug. 2004) "A Buckling-Based Metrology for Measureing the Elastic Moduli of Polymeric Thin Films," *Nature Mater.* 3:545-550.

Star et al. (2004) "Nanotube Optoelectric Memory Devices," *Nano Lett.*, vol. 4, No. 9, pp. 1587-1591.

Storm et al. (Aug. 2003) "Fabrication of Solid-State Nanopores with Single-Nanometre Precision," *Nat. Mater.* 2:537-540.

Streetman et al. (2000) "Intrinsic Material," In; *Solid State Electronic Devices*, 5th Ed., Prentice Hall; Upper Saddle River, NJ; pp. 74-75.

Strukov et al. (2005) "CMOL FPGA: A Reconfigurable Architecture for Hybrid Digital Circuits with Two-Terminal Nanodevices," *Nanotechnology* 16:888-900.

Su et al. (2000) "Lattice-Oriented Growth of Single-Walled Carbon Nanotubes," *J. Phys. Chem. B* 104(28):6505-6508.

Substantive Examination Report corresponding to Malaysian Patent Application No. PI 20092671, mailed Aug. 15, 2012.

(56) References Cited

OTHER PUBLICATIONS

Sumant et al. (Apr. 2005) "Toward the Ultimate Tribological Interface: Surface Chemistry and Nanotribology of Ultrananocrystalline Diamond," *Adv. Mater.* 17(8):1039-1045.
Sun et al. (2004) "Fabricating Semiconductor Nano/Microwires and Transfer Printing Ordered Arrays of Them onto Plastic Substrates," *Nano Lett.* 4:1953-1959.
Sun et al. (2005) "Advances in Organic Field-Effect Transistors," *J. Mater. Chem.* 15:53-65.
Sun et al. (2005) "Bendable GaAs Metal-Semiconductor Field-Effect Transistors Formed with a Printed GaAs Wire Arrays on Plastic Substrates," *Appl. Phys. Lett.* 87:083501.
Sun et al. (2005) "Photolithographic Route to the Fabrication of Micro/Nanowires of III-V Semiconductors," *Adv. Fuct. Mater.* 15:30-40.
Sun et al. (2007) "Controlled Buckling of Semiconductor Nanoribbons for Stretchable Electronics," *Nat. Nanotechnol.* 1:201-207.
Sun et al. (2007) "Inorganic Semiconductors for Flexible Electronics," *Adv. Mater.* 19:1897-1916.
Sun et al. (2007) "Structural Forms of Single Crystal Semiconductor Nanoribbons for High-Performance Stretchable Electronics," *J. Mater Chem.* 17:832-840.
Sun et al. (Nov. 2006) "Buckled and Wavy Ribbons of GaAs for High-Performance Electronics on Elastomeric Substrates," *Adv. Mater.* 18(21):2857-2862.
Sundar et al. (2004) "Elastomeric Transistor Stamps: Reversible Probing of CHaarge Transport in Organic Crystals," *Science* 303:1644-1646.
Suo et al. (Feb. 22, 1999) "Mechanics of Rollable and Foldable Film-on-Foil Electronics," *Appl. Phys. Lett.* 74(8):1177-1179.
Supplementary European Search Report, Corresponding to European Application No. 05 75 6327, Completed Sep. 25, 2009.
Swain et al. (2004) "Curved CCD Detector Devices and Arrays for Multi-Spectral Astrophysical Application and Terrestrial Stereo Panoramic Cameras," *Proc. SPIE* 5499:281-301.
Sze et al. (1985) *Semiconductor Devices*, Physics and Technology, $2^{nd}$ ed., Wiley, New York, pp. 190-192.
Sze, S. (1985) *Semiconductor Devices: Physics and Technology*, New York: Wiley, pp. 428-467.
Sze, S. (1988) *VLSI Technology*, Mcgraw-Hill, 327-374, 566-611.
Sze, S. (1994) *Semiconductor Sensors*, John Wiley and Sons: New York, pp. 17-95.
Takamoto et al. (Jan. 20, 1997) "Over 30% Efficient InGaP/GaAs Tandem Solar Cells," *Appl. Phys. Lett.* 70(3):381-383.
Talapin et al. (Oct. 7, 2005) "PbSe Nanocrystal Solids for n- and p-Channel Thin Film Field-Effect Transistors," *Science* 310:86-89.
Tan et al. (Apr. 12, 2004) "Performance Enhancement of InGaN Light Emitting Diodes by Laser-Lift-off and Transfer from Sapphire to Copper Substrate," *Appl. Phys. Lett.* 84(15):2757-2759.
Tanase et al. (2002) "Magnetic Trapping and Self-Assembly of Multicomponent Nanowires," *J. Appl. Phys.* 91:8549-8551.
Tang et al. (2005) "One-Dimensional Assemblies of Nanoparticles: Preparation, Properties, and Promise," *Adv. Mater.* 17:951-962.
Tang et al. (2008) "Dynamically Reconfigurable Liquid-Core Liquid-Cladding Lens in a Microfluidic Channel," *Lab on a Chip.* 8:395-401.
Tao et al. (2003) "Langmuir-Blodgett Silver Nanowire Monolayers for Molecular Sensing Using Surface-Enhanced Raman Spectroscopy," *Nano Lett.* 3:1229-1233.
Tate et al. (2000) "Anodization and Microcontact Printing on Electroless Silver: Solution-Based Fabrication Procedures for Low-Voltage Electronic Systems with Organic Active Components," *Langmuir* 16:6054-6060.
Teshima et al. (2001) "Room-Temperature Deposition of High-Purity Silicon Oxide Films by RF Plasma-Enhanced CVD," *Surf. Coat. Technol.* 146-147:451-456.
Theiss et al. (1998) "PolySilicon Thin Film Transistors Fabricated at 100° C. on a Flexible Plastic Substrate," *IEDM* 98:257-260.
Third Office Action corresponding to Chinese Patent Application No. 201110076041.5, Issued May 17, 2013—includes English Translation.
Toader et al. (2004) "Photonic Band Gap Architectures for Holographic Lithography," *Phy. Rev. Lett.* 043905/1-043905/4.
Toader et al. (2004) "Photonic Band Gaps Based on Tetragonal Lattices of Slanted Pores," *Phys. Rev. Lett.* 90:233901/1-233901/4.
Tong (1999) *Semiconductor Wafer Bonding: Science and Technology*, John Wiley; New York, pp. 187-221.
Trau et al. (1997) "Microscopic Patterning of Orientated Mesoscopic Silica Through Guided Growth," *Nature* 390:674-676.
Trentler et al. (1995) "Solution-Liquid-Solid Growth of Crytalline III-V Semiconductors: An Analogy to Vapor-Liquid-Solid Growth," *Science* 270:1791-1794.
Tsai et al. (2008) "Miniaturized Universal Imaging Device Using Fluidic Lens," *Optics Letters.* 33(3):291-293.
Tsai et al. (2010) "Fluidic Lens Laparoscopic Zoom Camera for Minimally Invasive Surgery," Journal of Biomedical Optics Letters. 15(3):030504.
Tseng et al. (Web Release Dec. 19, 2003) "Monolithic Integration of Carbon Nanotube Devices with Silicon MOS Technology" *Nano Lett.* 4(1):123-127.
Ucjikoga, S. (2002) "Low-Temperature Polycrystalline Silicon Thin-Film Transistor Technologies ofr System-on-Glass Displays," *MRS Bull.* 27:881.
Urruchi et al. (2000) "Etching of DLC Films Using a Low Intensity Oxygen Plasma Jet," *Diamond Relat. Mater.* 9:685-688.
Vanhollenbeke et al. (2000) "Compliant Substrate Technology: Integration of Mismatched Materials for Opto-Electronic Applications," *Prog. Cryst. Growth Charact. Mater.* 41(1-4):1-55.
Velev et al. (1997) "Porous silica via colloidal crystallization," *Nature* 389:447-448.
Vilan et al. (2000) "Molecular Control Over Au/GaAs Diodes," *Nature* 404:166-168.
Vlasov et al. (2001) "On-Chip Natural Assembly of Silicon Photonic Bandgap Crystals," *Nature* 414:289-293.
Voss, D. (2000) "Cheap and Cheerful Circuits," *Nature* 407:442-444.
Wagner et al. (2003) "Silicon for Thin-Film Transistors," *Thin Solid Films* 430:15-19.
Wagner et al. (2004) "Electronic Skin: Architecture and Components," *Physica E* 25:326-334.
Wagner et al. (Mar. 1, 1964) "Vapor-Liquid-Solid Mechanism of Single Crystal Growth," *Appl. Phys. Lett.* 4(5):89-90.
Wang et al. (2003) "A Solution-Phase, Precursor Route to Polycrystalline $SnO_2$ Nanowores that can be Used for Gas Sensing under Ambient Conditions," *J. Am. Chem. Soc.* 125:16176-16177.
Wang et al. (2005) "Electronically Selective Chemical Functionalization of Carbon Nanotubes: Correlation between Raman Spectral and Electrical Responses," *J. Am. Chem. Soc.*, 127:11460-11468.
Wang et al. (2005) "Oxidation Resistant Germanium Nanowires: Bulk Synthesis, Long Chain Alkanethiol Functionalization, and Langmuir-Blodgett Assembly," *J. Am. Chem. Soc.* 127(33):11871-11875.
Wang et al. (2006) "Direct Synthesis and Characterization of CdS Nanobelts," *Appl. Phys. Lett.* 89:033102.
Wang et al. (2009) "Mechanics of Hemispherical Electronics," Appl. Phys. Lett. 95:181912.
Weber et al. (Jan. 2004) "A Novel Low-Cost, High Efficiency Micromachined Silicon Solar Cell," *IEEE Electron Device Lett.* 25(1):37-39.
Wen et al. (Web Release Dec. 4, 2004) "Controlled Growth of Large-Area, Uniform, Vertically Aligned Arrays of $\alpha$-$Fe_2O_2$ Nanobelts and Nanowires," *J. Phys. Chem. B* 109(1):215-220.
Whang et al. (2003) "Large-Scale Hierarchical Organization of Nanowire Arrays for Integrated Nanosystems," *Nano Lett.* 3(9):1255-1259.
Williams et al. (Oct. 2006) "Growth and Properties of Nanocrystalline Diamond Films," *Phys. Stat. Sol. A* 203(13):3375-3386.
Williams et al. (Web Release Jan. 23, 2006) "Comparison of the Growth and Properties of Ultranocrystalline Diamond and Nanocrystalline Diamond," *Diamond Relat. Mater.* 15:654-658.

(56) References Cited

OTHER PUBLICATIONS

Willner et al. (2002) "Functional Nanoparticle Architectures for Senoric, Optoelectronic, and Bioelectronic Applications," *Pure Appl. Chem.* 74(9):1773-1783.

Wind et al. (May 20, 2002) "Vertical Scaling of Carbon Nanotube-Field-Effect Transitors Using Top Gate Electrodes," *Appl. Phys. Lett.* 80(20):3871-3819.

Won et al. (2004) "Effect of Mechanical and Electrical Stresses on the Performance of an a-Si:H TFT on Plastic Substrate," *J. Electrochem. Soc.* 151:G167-G170.

Wu et al. (2001) "Amorphous Silicon Crystallization and Polysilicon Thin Film Transistors on SiO2 Passivated Steel Foil Substrates," *Apple. Surf. Sci* 175-176:753-758.

Wu et al. (2001) "Direct Observation of Vapor-Liquid-Solid Nanowire Growth," *J. Am. Chem. Soc.* 123(13):3165-3166.

Wu et al. (2001) "Thermal Oxide of Polycrystalline Silicon on Steel Foil as a Thin-Film Transitor Gate Dielectric," *Appl. Phys. Lett.* 78:3729-2731.

Wu et al. (2002) "Block-by-Block Growth of Single-Crystalline Si/SiGe Superlattice Nanowires," *Nano Lett.* 2(2):83-86.

Wu et al. (2002) "Growth of Au-Catalyzed Ordered GaAs Nanowire Arrays by Molecular-Beam Epitaxy," *Appl. Phys. Lett.* 81:5177-5179.

Wu et al. (2002) "Inorganic Semiconductor Nanowires: Rational Growth, Assembly, and Novel Properties," *Chem. Eur. J.* 8(6):1261-1268.

Wu et al. (2003) "Growth, Branching, and Kinking of Molecular-Beam Epitaxial (110) GaAs Nanowires," *Appl. Phys. Lett.* 83:3368-3370.

Wu et al. (Jul. 1, 2004) "Single-Crystal Metallic Nanowires and Metal/Semiconductor Nanowire Heterostructures," *Nature* 430:61-65.

Wu et al. (Nov. 2002) "Complementary Metal-Oxide-Semiconductor Thin-Film Transistor Circuits from a High-Temperature Polycrystalline Silicon Process on Steel Foil Substrates," *IEEE Trans. Electr. Dev.* 49(11):1993-2000.

Xia (1998) "Soft Lithography" *Angew. Chem. Int. Ed.* 37:551-575.

Xia et al. (1996) "Shadowed Sputtering of Gold on V-Shaped Microtrenches Etched in Silicon and Applications in Microfabrication," *Adv. Mater.* 8(9):765-768.

Xia et al. (1998) "Soft Lithography," *Annu. Rev. Mater. Sci.* 28:153-184.

Xia et al. (1999) "Unconventional Methods for Fabricating and Patterning Nanostructures," *Chem. Rev.* 99:1823-1848.

Xia et al. (2003) "One-Dimensional Nanostructures: Synthesis, Characterization and Applications," *Adv. Mater.* 15:353-389.

Xia et al. (Jul. 19, 1996) "Complex Optical Surfaces Formed by Replica Molding Against Elastomeric Masters," *Science* 273:347-349.

Xiang et al. (Mar. 25, 2006) "Ge/Si Nanowire Heterostructures as High-Performance Field-Effect Transistors," *Nature* 441:489-493.

Xiao et al. (2003) "High-mobility thin-film transistors based on aligned carbon nanotubes," *Appl. Phys. Lett.*, vol. 83, No. 1, pp. 150-152.

Xie et al. (May 2003) "Polymer-Controlled Growth of $Sb_2Se_3$ Nanoribbons via a Hydrothermal Process," *J. Cryst. Growth* 252(4):570-574.

Xin et al. (Jun. 2005) "Evaluation of Polydimethylsiloxane Scaffolds with Physiologically-Relevant Elastic Moduli: Interplay of Substrate Mechanics and Surface Chemistry Effects on Vascular Smooth Muscle Cell Response," *Biomaterials* 26(16):3123-3129.

Xu et al. (2008) "Direct Transfer Patterning on Three Dimensionally Deformed Surfaces at Micrometer Resolutions and its Application to Hemispherical Focal Plane Detector Arrays," *Org. Electron.* 9:1122-1127.

Yang et al. (1997) "Mesoporous Silica with Micrometer-Scale Desgns," *Adv. Mater.* 9:811-814.

Yang et al. (2000) "Stability of Low-Temperature Amorphous Silicon Thin Film Transistors Formed on Glass and Transparent Plastic Substrates," *J. Vac. Sci. Technol. B* 18:683-689.

Yang et al. (2002) "Creating Periodic Three-Dimensional Structures by Multibeam Interface of Visible Laser," *Chem. Mater.* 14:2831-2833.

Yang et al. (Dec. 2007) "RFID Tag and RF Structures on a Paper Substrate Using Inkjet-Printing Technology," *IEEE Trans. Microw. Theory Tech.* 55(12):2894-2901.

Yang, P. (2005) "The Chemistry and Physics of Semiconductor Nanowires," *MRS Bull.* 30:85.

Yanina et al. (2002) "Terraces and ledges on (001) spinel surfaces," *Surf. Sci.*, 513:L402-L412.

Yao et al. (Mar. 2000) "High-Field Effect Electrical Transport in Single-Walled Carbon Nanotubes," *Phys. Rev. Lett.* 84(13):2941-2944.

Yeh et al. (1994) "Fluidic Self-Assembly for the Integration of GaAs Light Emitting Diodes on Si Substrates," *IEEE Photon. Techn. Lett.* 6:706-708.

Yeoh (1993) "Some Forms of the Strain Energy Function for Rubber," *Rubber Chemistry and Technology.* 66:754-771.

Yin et al. (2000) "A Soft Lithography Approach to the Fabrication of Nanostructures of Single Crystalline Silicon with Well-Defined Dimensions and Shapes," *Adv. Mater.* 12:1426-1430.

Yin et al. (2005) "Colloidal Nanocrystal Synthesis and the Organic-Inorganic Interface," *Nature* 437:664-670.

Yoon et al. (2005) "Low-Voltage Organic Field-Effect Transistors and Inverters Enabled by Ultrathin Cross-Linked Polymers as Gate Dielectrics," *J. Am. Chem. Soc.* 127:10388-10395.

Yu et al. (2000) "Silicon Nanowires: Preparation, Device Fabrication, and Transport Properties," *J. Phys. Chem. B* 104(50):11864-11870.

Yu et al. (2003) "Solution-Liquid-Solid Growth of Soluble GaAs Nanowires," *Adv. Mater.* 15:416-419.

Yu et al. (2003) "Two-Versus Three-Dimensional Quantum Confinement in Indium Phosphide Wires and Dots," *Nat. Mater.* 2:517-520.

Yu et al. (2010) "Tunable Liquid-Filled Lens Integrated with Aspherical Surface for Spherical Aberration Compensation," *Opt. Express.* 18:9945-9954.

Yuan et al. (2006) "High-Speed Strained-Single-Crystal-Silicon Thin-Film Transistors on Flexible Polymers," *J. Appl. Phys.* 100:013708.

Yurelki et al. (Jul. 24, 2004) "Small-Angle Neutron Scattering from Surfactant-Assisted Aqueous Dispersions of Carbon Nanotubes," *J. Am. Chem. Soc.* 126(32):9902-9903.

Zakhidov et al. (1998) "Carbon Structure with Three-Dimensional Periodicity at Optical Wavelengths," *Science* 282:897-901.

Zaumseil et al. (2003) "Nanoscale Organic Transistors that use Source/Drain Electrodes Supported by High Resolution Rubber Stamps," *Appl. Phys. Lett.* 82(5):793-795.

Zaumseil et al. (2003) "Three-Dimensional and Multilayer Nanostructures Formed by Nanotransfer Printing," *Nano Lett.* 3(9):1223-1227.

Zhang et al. (2001) "Electric-field-directed growth of aligned single-walled carbon nanotubes," *Appl. Phys. Lett.*, vol. 79, No. 19. pp. 3155-3157.

Zhang et al. (2003) "Fluidic Adaptive Lens with High Focal Length Tunability," *Appl. Phys. Lett.* 82:3171-3172.

Zhang et al. (2005) "Low-Temperature Growth and Photoluminescence Property of ZnS Nanoribbons," *J. Phys. Chem. B* 109(39):18352-18355.

Zhang et al. (2006) "Anomalous Coiling of SiGe/Si and SiGe/Si/Cr Helical Nanobelts," *Nano Lett.* 6(7):1311-1317.

Zhang et al. (Apr. 2003) "Oxide-Assisted Growth of Semiconducting Nanowires," *Adv. Mater.* 15(7-8):635-640.

Zhang et al. (Apr. 5, 2004) "Structure and Photoiluminescence of ZnSe Nanoribbons Grown by Metal Organic Chemical Vapor Deposition," *Appl. Phys. Lett.* 84(14):2641-2643.

Zhang et al. (Feb. 9, 2006) "Electronic Transport in Nanometre-Scale Silicon-on-Insulator Membranes," *Nature* 439:703-706.

Zhao et al. (Mar. 2007) "Improved Field Emission Properties from Metal-Coated Diamond Films," *Diamond Relat Mater.* 16(3):650-653.

(56) References Cited

OTHER PUBLICATIONS

Zheng et al. (2004) "Shape-and Solder-Directed Self-Assembly to Package Semiconductor Device Segments," *Appl. Phys. Lett.* 85:3635-3637.

Zheng et al. (Aug. 31, 2004) "Sequential Shape-and-Solder-Directed Self Assembly of Functional Microsystems," *Proc. Natl. Acad. Sci. USA* 101(35):12814-12817.

Zhou et al. (2002) "An Efficient Two-Photon-Generated Photoacid Applied to Positive-Tone 3D Microfabrication," *Science* 296:1106-1109.

Zhou et al. (2004) "p-Channel, n-Channel Thin Film Transistors and p-n Diodes Based on Single Wall Carbon Nanotube Networks," *Nano Lett.* 4:2031-2035.

Zhou et al. (2005) "Band Structure, Phonon Scattering, and the Performance Limit of Single-Walled Carbon Nanotube Transistors," *Phys. Rev. Lett.* 95:146805.

Zhou et al. (2005) "Mechanism for Stamp Collapse in Soft Lithography," *Appl. Phys. Lett.* 87:251925.

Zhu et al. (2005) "Spin on Dopants for High-Performance Single Crystal Silicon Transistors on Flexible Plastic Substrates," *Appl. Phys. Lett.* 86(133507)1-3.

Zhu et al. (2010) "Tunable-Focus Microlens Arrays on Curved Surfaces," Appl. Phys. Lett. 96:081111.

U.S. Appl. No. 11/465,317, filed Aug. 17, 2006.
U.S. Appl. No. 12/372,605, filed Feb. 17, 2009.
U.S. Appl. No. 13/095,502, filed Apr. 27, 2011.
U.S. Appl. No. 13/835,284, filed Mar. 15, 2013.

* cited by examiner

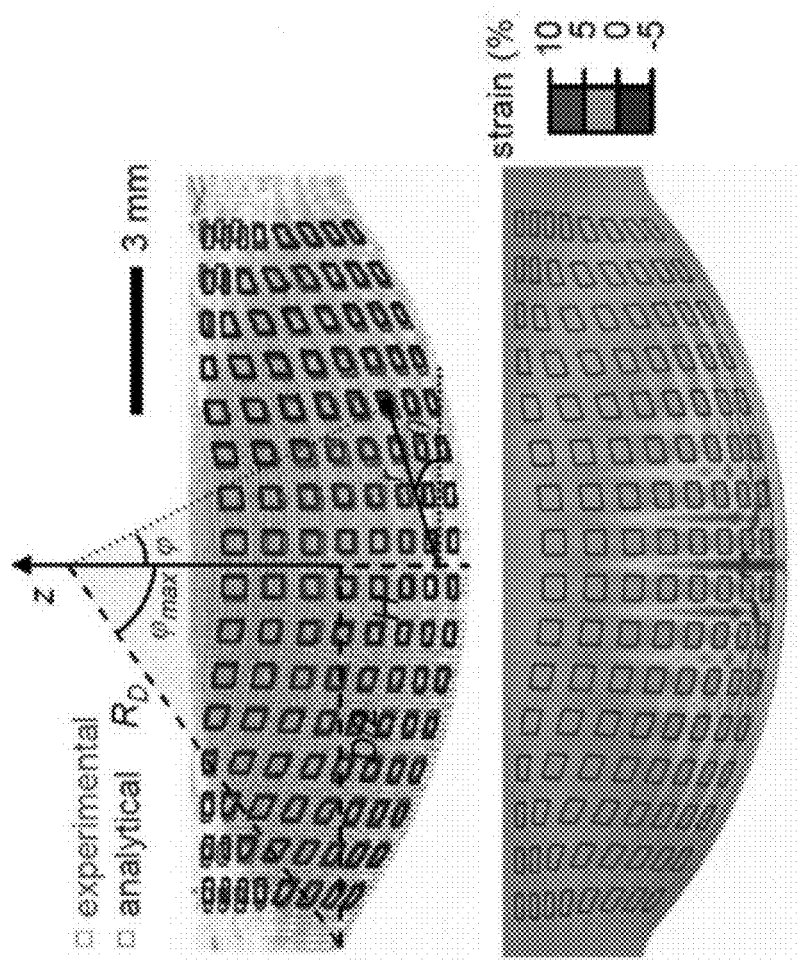
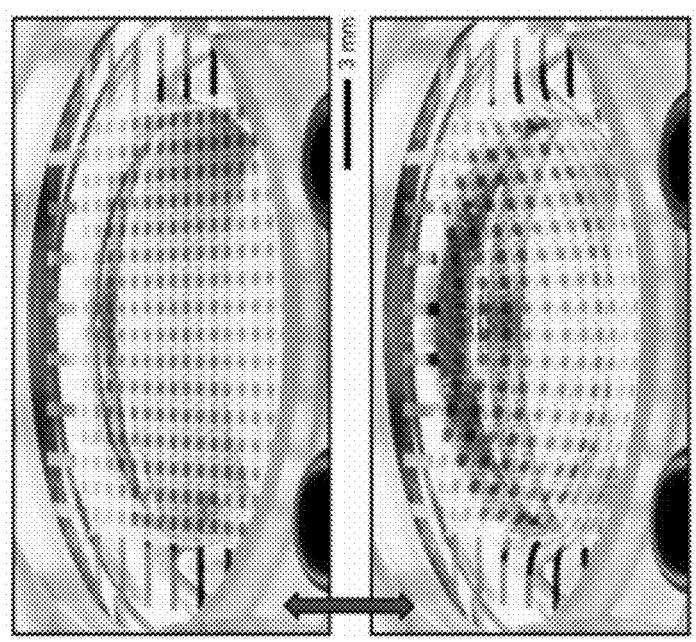
Fig. 2A
Fig. 2B

OPTICAL COMPONENT ARRAY HAVING ADJUSTABLE CURVATURE

CROSS-REFERENCE TO RELATED APPLICATIONS

This application claims the benefit of priority of U.S. Provisional Patent Application No. 61/433,099, filed Jan. 14, 2011, which is hereby incorporated by reference in its entirety.

STATEMENT REGARDING FEDERALLY SPONSORED RESEARCH OR DEVELOPMENT

This invention was made with United States governmental support awarded by Defense Advanced Research Planning Agency under N66001-10-1-4008 and the National Science Foundation under ECSS-0824129. The United States Government has certain rights in the invention.

BACKGROUND OF INVENTION

Provided herein are arrays of optical components supported by a deformable substrate having a variable and user-controlled curvature. The devices and methods of the invention have a number of useful applications, including in the field of optical detectors, imagers and optical emitters. Methods for varying the curvature of an array of optical components and for making the disclosed devices are also provided.

Much interest is devoted to the field of stretchable and foldable electronics. For example, good stretchability and foldability of various electronic and opto-electronic devices are disclosed in U.S. Pub. Nos. 2008/0157235, 2010/0002402 and U.S. Pat. No. 7,972,875, including eye-type imagers that incorporate focal plane arrays on hemispherical substrates. Foldable integrated circuit designs are accessed by supporting specially configured electronic materials on thin elastomeric substrates, including by interconnection of rigid device islands by interconnects that accommodate strains and stresses by straightening of the interconnects. In this manner, strain-sensitive materials can be isolated from stretch and/or bending-induced strains.

Although effort has been devoted to ensuring electronic circuits that can stretch and bend, a challenge remains as to providing a reliable, fast and consistent means for precisely varying and controlling the curvature of an electronic circuit in a dynamic manner. Certain systems involve direct printing of components onto curved surfaces (Xu et al. Org. Electron 9:1122-1127 (2008)) or geometric transformation of initially planar configurations into desired shapes (Ko et al. Nature 454:748-753 (2008); Jung et al. Appl Phys Lett 96:021110-1-021110-3 (2010); Ko et al. Small 5:2703-2709 (2009); Shin et al. Small 6:851-856 (2010)). Those systems, however, generally relate to rigid, concave device substrates whose curvature cannot be dynamically varied. In other words, the device is locked into one substrate shape. The lack of a reliable system to vary substrate curvature is particularly relevant for hemispherical imagers, where a change in the zoom by changing lens curvature, affects focal surface, or the curvature of a surface for which the image will be in focus. Provided herein, therefore, are methods and devices for dynamically varying the curvature of an array of optical components, including of a photodetector array that may be incorporated into an imaging system to provide focus over a range of lens curvatures.

SUMMARY OF THE INVENTION

Provided are optical components having a surface that is capable of a controlled and well-defined adjustment of the surface shape. The devices and related methods for accomplishing adjustment of optical component substrate curvature address a need for dynamic adjustment to curvature during use of the optical components. In contrast to conventional systems, where the curvature tends to be fixed, the disclosed devices and methods provide precise optical component substrate shape and curvature control, that can be rapid and reproducible. Control of substrate curvature can occur in the context of an optical array on a substrate that is part of an optical device. In this fashion, during use of the optical device the optical component curvature may be rapidly and reliable adjusted as desired.

In one embodiment, the invention is an optical device incorporating any of the disclosed arrays of optical components. In another embodiment, the invention is an array of optical components comprising a deformable substrate having a contact surface and an array of mechanically interconnected optical components supported by the contact surface. An actuator is operably connected to the contact surface, wherein the actuator variably controls a curvature of the contact surface. As provided herein, any number and types of actuator systems may be used, so long as the actuator provides variable control of the curvature (e.g., shape) of the deformable substrate contact surface.

In an aspect, the deformable substrate is capable of being deformed to a different curvature, such as from flat to curved. In an embodiment, the deformation is reversible or at least partially reversible. In an embodiment, the substrate comprises an elastomer. In an embodiment, the substrate comprises a plastic or other ductile material. In an aspect, the substrate is a shape-memory material, such as a shape memory polymer, metal or alloy. The particular application of interest will dictate the physical characteristics required in the substrate, and accordingly influence the substrate composition. For example, in applications requiring a large number of adjustments to the curvature such as in an adjustable zoom camera, the substrate is preferably formed of a material having reversible curvature over a large number of cycles. Accordingly, one suitable substrate material in that embodiment is an elastomer, such as poly(dimethylsiloxane) (PDMS). Other applications, however, may not be subject to such a large number of cycles and/or fast curvature adjustment, meaning that materials need not have properties of an elastomer, instead less reversibly deformable or elastic materials may be employed that have other advantages, such as better durability or relatively higher rigidity, while still being capable of being adjustable curved, such as plastics or non-elastic polymers.

In an aspect, the deformable substrate further comprises an encapsulating layer that at least partially encapsulates interconnects of the array, and that facilitates a neutral mechanical plane layout (see, for example, U.S. Pat. Pub. Nos. 2010-0002402 (213-07); 2011-0230747 (15-10)) to isolate rigid material of the array, such as metals or semiconductor elements, from bending-induced strain.

In an embodiment, the deformable substrate is thin to facilitate controllable curvature changes that are rapid and reproducible without adversely impacting the functionality of the optical array. Accordingly, in one aspect the substrate thickness is less than 1 mm, less than 0.5 mm, or between about 0.2 mm and 0.6 mm.

The invention is compatible with any number and types of optical components. Examples of useful optical components include optical detectors; optical emitters; optical reflectors; photovoltaics; lenses; filters; and polarizers. For example, in an optical device that is an imager or a camera, the optical components may comprise an array of mechanically interconnected photodiodes. Each individual component of the array may correspond to a pixel that detects light, such as light intensity and/or wavelength.

The invention is further compatible with any number and kinds of actuators. Examples of actuators include a hydraulic system, pneumatic system, mechanical actuators, or a force generator that is integrated with the deformable substrate. The operating conditions of the optical device and the particular application will influence the selection of actuators. A hydraulic or pneumatic-type actuator changes a fluid amount or pressure, such as a liquid (hydraulic) or gas (pneumatic), in a chamber to vary the curvature of the deformable substrate that forms a surface of the chamber. A mechanical actuator directly moves the substrate to generate change in curvature. A force generator integrated with the deformable substrate generates a force on the substrate to generate change in curvature. The force generator may act at a distance, such as a magnet that acts on magnetizable elements embedded or connected to the substrate. The force generator may be a part of the substrate, such as piezoelectric actuators embedded in or attached to the substrate. The force generator may itself be part of the substrate, such as a substrate formed by a shape memory material where change in substrate temperature effects a change in substrate curvature. In an embodiment, the integrated force generator is a shape memory polymer, metal or alloy.

In an aspect, the actuator is a piezoelectric actuator, an electrostatic actuator, or a magnetic actuator. In an embodiment, the mechanical actuator comprises an array of mechanical actuators positioned on a back surface that is opposed to the contact surface. In an embodiment, the actuator comprises two or more actuators or types of actuators. In this embodiment, the combination of actuators can provide additional control of curvature. For example, curvature may be spatially-dependent, with actuators configured to exert different forces at different substrate positions, referred herein as spatially variable curvature control. Alternatively, different actuators may provide different force ranges, so that one actuator type may provide course change in curvature with a second actuator type providing fine-control of the curvature. In this manner, precise control of curvature is achieved in a manner that can be rapid and reproducible.

In an embodiment, the actuator is a hydraulic or pneumatic system, such as a hydraulic or pneumatic system having an optical component fluid chamber, wherein the deformable substrate forms a surface of the optical component fluid chamber. A pressure controller controls a pressure in the optical component fluid chamber. In an aspect, the fluid chamber pressure is controlled by introducing or removing a fluid to the fluid chamber by the actuator. In an aspect, the fluid chamber pressure is controlled by moving a surface of the fluid chamber by the actuator, thereby changing the substrate curvature by the fluid in the fluid chamber. Unless specifically defined otherwise, pneumatics refers generally to a curvature that is controlled by a change in pressure in a fluid that can be either a gas or a liquid. More specifically in this general use, pneumatics encompasses the term hydraulics, which specifically refers to fluids that are liquids. Alternatively, pneumatics refers to a fluid that is a gas and hydraulics refers to a fluid that is a liquid. The terms are related in that both rely on change in pressure to effect a change in curvature.

In an aspect, the fluid chamber is positioned adjacent to a back surface of the deformable substrate, wherein the back surface is opposed and separated from the contact surface by the deformable substrate. In an aspect, the fluid chamber is positioned adjacent to the contact surface of the deformable substrate. In an aspect, any of the fluid chambers has separate fluid inlets and outlets. In an aspect, there is one conduit that provides both fluid inflow and outflow, depending on actuator state.

In an embodiment, the invention can be further described in terms of the array of optical components. In an aspect, the array of optical components comprises a plurality of islands, wherein each island is mechanically or electrically connected to an adjacent island by an interconnect. In an aspect, the interconnect is in a buckled or a serpentine configuration. In this manner, one or more optical components can be positioned on or in contact with the island, and the interconnects may accommodate strains or stresses associated with change in substrate curvatures. In an aspect, the interconnects, array configuration and components are as provided in US Pat. Pub. 2010/0002402 (Atty ref. 213-07), US Pat. Pub. US-2008/0157235 (Atty ref. 134-06) or U.S. Pat. Nos. 7,521,292 (Atty ref. 38-04C), 7,972,875 (Atty Ref. 216-06), each of which are specifically incorporated by reference for the optical component arrays, and methods of making and designing arrays of optical components.

In an aspect, any of the devices or methods provided herein provides a change in curvature that can range from a concave to a convex configuration. In particular, the system is configured so that the array of optical components remains functional over the concave to convex configuration, including at the extreme curvature configurations. "Remains functional" refers to at least 95%, at least 98% or at least 99% of the optical components remaining functional as intended with curvature change. In particular, the optical components do not fail, crack, mechanically separate, or electronically separate from the rest of the array.

In an aspect, curvature is described in terms of a radius of curvature, such as a radius of curvature that varies from 0.1 mm to flat in the concave or the convex configuration. Alternatively, for applications where the optical array need only vary over a concave configuration, the radius of curvature varies only the concave configuration. In an aspect, the radius of curvature is defined over a portion of the array or substrate surface, including a central portion, such as the inner 75%, inner 50%, or inner 25% of the substrate contact surface.

In an embodiment, the actuator and related system provide the capability of achieving high degree of curvature accuracy. In an aspect, the actuator provides a curvature that is within 10%, within 5%, or within 1% of a desired curvature; such a substrate may be referred to as "in focus" or at the "focal surface". In this aspect, a desired curvature may be calculated, such as a curvature to provide the best functional optical output from the array of optical components, whether the optical output is an image, light generation, optical absorption or reflection. A curvature within a percentage may relate to radius of curvature, equation that describes the curved surface, maximum deviation at a particular location, or other statistical comparison between a desired surface shape and the actual surface shape generated by the method or device.

In an aspect, the deformable substrate has a spatially-varying material property that influences the curvature of the contact surface. This aspect refers to a physical characteristic of the substrate that provides spatial variability to the bending or curvature of the substrate when a force is applied to the substrate. Accordingly, and similar to the multiple actuator configuration, this aspect is also referred to as having a spatially-variable curvature. Examples include varying the thickness, porosity, coating layers, coating elements, embedded elements, relief or recess features, across or along the substrate surface. In this manner, curvature can be tailored, such as to achieve special non-hemispherical curvatures in a spatially-dependent manner. Such spatially-varying material property allows a single actuation force to have significantly different effects that vary with substrate position, such as laterally along the substrate.

In an embodiment, the invention relates to an optical device having any of the array of optical components described herein. In an aspect, the optical device is an imaging system comprising any of the array of optical components described herein, wherein the optical components are photodiodes that form a photodetector array. The imaging system may be a camera having a continuously adjustable zoom, but without the complex optics and multiple lens components required in conventional systems to maintain focus for different levels of zoom.

In an aspect, the imaging system further comprises a tunable lens. In an embodiment, the tunable lens comprises an elastomeric lens membrane. In another aspect, the tunable lens is a tunable fluidic lens having a lens fluid chamber with one surface formed by the elastomeric lens membrane. An optical component fluid chamber has one surface formed by the deformable membrane. In this aspect, an actuator controls a pressure in the lens fluid chamber to tune the lens membrane curvature and a pressure in the component fluid chamber to tune the photodetector array (e.g., the deformable substrate) curvature. In this manner, as the lens curvature changes to provide different zoom, the photodetector array curvature changes to ensure the image remains in focus at any given level of zoom. Although the actuator is described in this embodiment as hydraulic or pneumatic in nature, any of the actuators described herein may be used in the imager. One constraint, however, is that the actuator for the lens should not adversely impact, degrade or unduly interfere with the transmission of light through the lens to-be-detected by the photodetector.

In an embodiment, the imaging system actuator comprises a lens fluid chamber actuator for controlling pressure in the lens fluid chamber and an optical component fluid chamber actuator for controlling pressure in the optical component fluid chamber. Use of valves, flow regulators, and other pressure-regulating means allows for a single actuator to reliably control pressure in both chambers in an independent fashion. Alternatively, separate actuators may be used. Optionally either or both chambers have, in addition to an inlet for inflow of fluid, an outlet for outflow of fluid, from the chamber(s). Alternatively, inlet and outlet may be combined in a single conduit.

In an aspect, the imaging system actuator varies a radius of curvature of the lens membrane, the deformable substrate supporting the array of optical components, or both, thereby providing a tunable imaging system. Varying the lens membrane radius of curvature provides a continuously adjustable zoom lens having an image at the photodetector array that is in focus by adjusting the contact surface curvature to match a Petzval surface formed by the lens membrane. The Petzval surface may be calculated on the fly, such as by raytracing or computation arising from known variables of image distance from the lens and the zoom or curvature of the lens. Accordingly, the imaging system may further comprise a processor for calculating the Petzval surface of an object imaged by the lens having a lens curvature, wherein the actuator generates curvature of the photodetector that substantially matches the Petzval surface. Alternatively, the curvature of the photodetector may be empirically determined by varying photodetector curvature until a desired level of focus is achieved. Level of focus can be quantified, such as by assessing the sharpness of an object edge or by the ability to individually resolve adjacent objects. Alternatively, level of focus may be assessed in terms of the closeness or deviation of the substrate contact surface from an ideal substrate surface, as determined computationally.

In an embodiment, the imaging system has a continuously adjustable zoom, such as continuously adjustable between a range that is greater than or equal to a factor of 1 and less than or equal to a factor of 50. In an aspect, the value of zoom relates to the curvature of the lens, with higher convex lens curvature providing higher zoom.

The imaging system is optionally described in terms of a high-quality imaging characteristic, such as one or more of high resolution; high sensitivity; high pixel density, high photodiode fill factor; and large field of view.

Also provided are various methods for controlling curvature of an optical array, including for controlling any of the optical arrays presented herein. In an aspect, an array of optical components on a contact surface of a deformable substrate is provided and a force is exerted on the deformable substrate, thereby deforming the deformable substrate and controlling the curvature of the optical device.

In an aspect, the force is exerted by activating an actuator that is operably connected to the deformable substrate. Alternatively, the deformable substrate itself generates a force, such as in response to a change in temperature, thereby changing the curvature.

In an embodiment, the force is exerted by the deformable substrate or an actuator positioned in or on the deformable substrate.

In an aspect, the method relates to adjusting curvature of an array of optical components that is incorporated in an optical device, such as an imaging system. In an embodiment, the array of optical components is a photodetector array comprising a plurality of mechanically interconnected photodiodes incorporated in an optical device such as an imaging system having a tunable lens. In this embodiment, the method optionally further comprises the steps of adjusting a curvature of the lens to obtain a desired optical zoom of an object positioned in the lens field of view, determining an ideal curvature of the photodetector to provide a focused image of light from the object transmitted through said lens, and adjusting the exerted force on the deformable substrate to substantially match the photodetector curvature to the ideal curvature; thereby obtaining an in focus image of said object for any optical zoom value. In this manner, the methods and devices provided herein are capable of obtaining high-quality images with a single lens and a single detector array.

In an aspect, any of the devices and methods provided herein has a controller for controlling the separation distance between the lens and the photodetector. In an embodiment, the method further comprises determining an ideal separation distance between the photodetector and the lens for capturing the focused image by the photodetector, and adjusting a separation distance between the lens and the photodetector to substantially match the separation distance to the ideal separation distance. The controller may employ a linear displacement drive that automatically separates the lens and photodetector, or may be a manually-implemented linear displacement, where a user adjusts the separation distance until a desired image is achieved. In this aspect, "substantially match" refers to a distance that is within 10%, within 5% or within 1% of ideal separation.

In an embodiment, the desired optical zoom corresponds to a zoom factor that is greater than or equal to 1 and less than or equal to 100 and the optical image at the photodetector is in focus for all zoom factor values. In an aspect, focus is achieved without additional lenses, mirrors, reflectors, or the like between the tunable lens and the photodetector. Alternatively, higher zoom can be achieved with additional optics between the lens and detector such as by use of field-flattening optics, including to telescopic levels. In an aspect, the higher zoom level is up to about 500 times.

Any of the methods or devices provided herein relate to determination of the ideal curvature computationally or empirically, including for an object whose image is obtained via a curved lens.

In an aspect, at least a central portion of the deformable substrate has a curvature that can be characterized or quantified as hemispherical or paraboloid.

One functional benefit of the methods and devices provided herein is that the array of optical components maintains functionality over a range of membrane curvatures. The curvatures may be generally described as concave, convex, or substantially planar (e.g., flat). Alternatively, the curvature for a hemispherical shape may be described by a radius of curvature, such as a radius of curvature anywhere between about flat (radius of curvature approaching infinity) to maximum curved, such as about 0.1 mm.

Any of the methods and devices incorporates calibration of the system. In an aspect, the method further comprises the step of calibrating the optical components to address the position of individual optical components of the array over a range of membrane curvatures. This is a reflection that as the substrate curves, the positions of the optical components change both in terms of their absolute position and their position relative to one another. The calibration step ensures that a positionally accurate image can be displayed, for example, in a flat configuration. In an aspect, the calibrating is by determining the pitch or inter-component spacing for a plurality of membrane curvatures computationally or empirically using a known image provided at a defined distance.

In an aspect, the devices and methods provided herein are based on a Petzval surface formed by light passing through a curved lens being in focus on a curved photodetector surface. In an embodiment, the ideal curvature corresponds to a Petzval surface formed by transmission of electromagnetic radiation through the lens.

In an embodiment, an un-actuated array of optical components is provided in a flat configuration by generating a pre-strain to the deformable substrate that supports the array of optical components. In an aspect, the pre-strain is greater than or equal to 1% and less than or equal to 5%, greater than or equal to 2% and less than or equal to 4%, or about 2% to 3%. In this manner, at rest the array of optical components is flat. Accordingly, any of the devices and methods further comprises a pre-strain element connected to the deformable substrate to provide a level of prestrain to the deformable substrate.

In an aspect, the device is a fixture system for holding the deformable substrate and optical component array supported thereon. In an embodiment, the deformable substrate is held by upper and lower covers. Although the system is effectively sealed by this design, including for use with an actuator that is hydraulic or pneumatic in design, the membrane can be significantly deformed by compression. As a result, a pre-strain element is connected to a cover, such as the top or bottom cover, and to the deformable membrane, to provide a radially-directed pre-strain. In an aspect, the prestrain is relatively small, such as less than about 5%, or about 2% to 3%. The prestrain element ensures, when desired, the substrate is flat, such as when no force is applied by the actuator. The covers provide an opening hole element in which the size and shape of the deformation is controlled. In an aspect, the opening hole element has a circular shape.

In an embodiment, any of the devices provided herein further comprise a fixture system to establish reliable electrical contact between the array of optical components on a deformable substrate and an external data acquisition system. The fixture ensures electrical contact by mechanical pressing. Cantilever springs provide mechanical pressing and contact between pin electrodes and electrodes of the optical component array, thereby establishing reliable and robust electrical contact with the array, even over large changes in substrate curvature. In an aspect, electrical resistance is reduced by polishing the surfaces of the electrode pins and coating with metal layers. In an aspect the metal layers comprise thin layers of Cr/Au, such as about 20 nm/400 nm. In an aspect, each row and each column of the array has an independent electrode electrically connecting the row or column to a corresponding pin electrode. In an aspect, the pin electrode comprises an electrically conductive metal. In an aspect, the electrically conductive metal is copper. In this embodiment, the array of optical components may correspond to a photodetector array of a device that is an optical imager. In this manner, the fixture system facilitates image display on a monitor and/or storage of the image digitally.

BRIEF DESCRIPTION OF THE DRAWINGS

FIG. 2A Tilted view of a photodetector array on a thin membrane of PDMS in flat (no defined radius of curvature) (Upper) and hemispherically curved (Lower) configurations, actuated by pressure applied to a fluid filled chamber underneath. FIG. 2B: Three dimensional (3D) rendering of the profile of the deformed surface measured by a laser scanner. Here, the shape is close to that of a hemisphere with a radius of curvature ($R_D$) of 13.3 mm and a maximum deflection ($H_D$) of 2.7 mm. Calculated and measured unit cell positions appear as squares of different shading on this rendered surface. 3D rendering of circumferential strains in the silicon devices (squares) and the PDMS membrane determined by finite element analysis (Lower).

DETAILED DESCRIPTION OF THE INVENTION

Figure 1A:
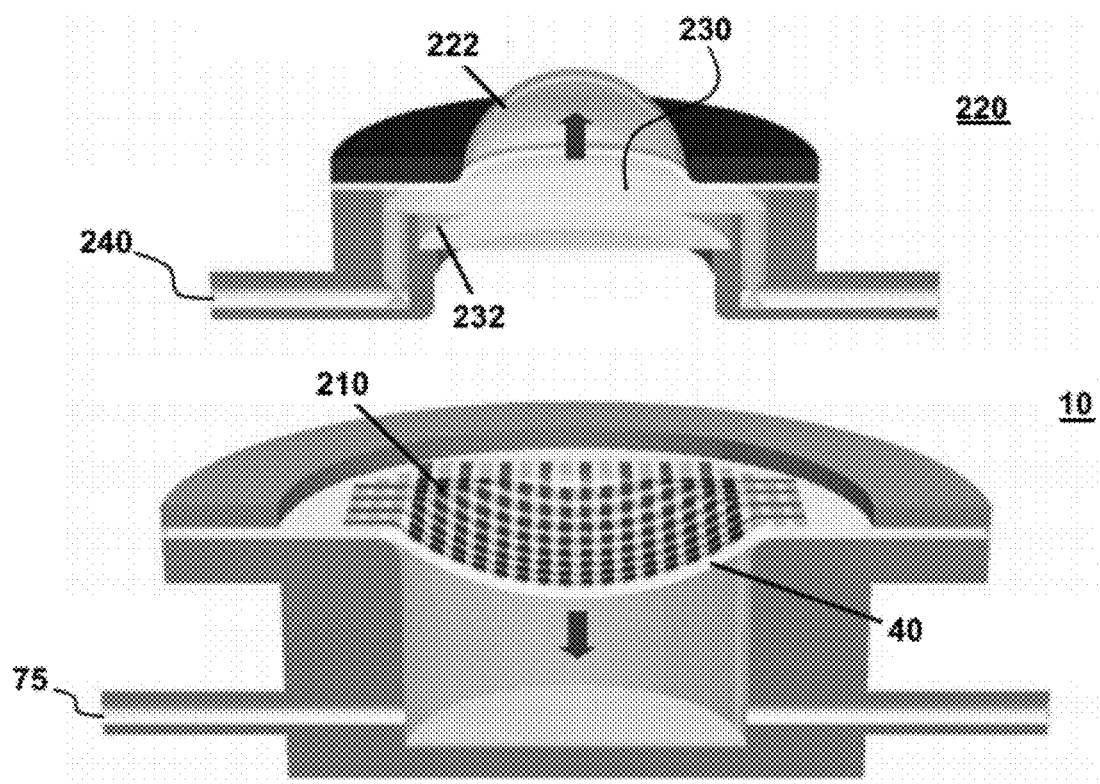
FIG. 1A Schematic illustration of a camera, including tunable lens (Upper) and tunable detector (Lower) modules. The lens comprises a fluid filled gap between a thin (about 0.2 mm or less) PDMS membrane and a glass window (about 1.5 mm thick) that is at least partially optically transparent, to form a plano-convex lens having a 9 mm diameter and radius of curvature that is adjustable with fluid pressure. The tunable detector comprises an array of interconnected optical components, in this example silicon photodiodes and blocking diodes (16×16 pixels), mounted in or on a thin (0.4 mm) PDMS membrane, in a mechanically optimized, open mesh serpentine design. This detector sheet mounts on a fluid filled cavity; controlling the pressure deforms the sheet into concave or convex hemispherical shapes with well defined, tunable levels of curvature.

"Optical component" is used broadly to refer to a material or device element that modulates, transmits, generates, reflects or otherwise affects a physical parameter associated with electromagnetic radiation, including light over a specified wavelength. In particular, the optical components are arranged in an array, such as an array with each component having position defined in terms of a column and row position. Accordingly, each repeating unit cell of the array corresponds to an optical component. In an embodiment, each optical component is independently wired, such as to a source of electric potential. In an embodiment, each optical component is connected to adjacent optical components with an interconnect. In an aspect, the interconnect provides a mechanical connection. In an aspect, the interconnect provides an electrical connection, thereby minimizing the number of electrical connections to the array to the number of rows plus the number of columns.

"Optical device" refers to the device in which the optical component may be incorporated, and so includes other elements required for the device to provide the desired functionality. The optical device, and therefore the underlying array of optical components, may be defined in terms of functionality. Examples of functionality include optical imagers, optical detectors, displays, emitters, reflectors, absorbers, polarizers, filters, lenses, and corresponding devices thereof. For example, an optical absorber may be part of a photovoltaic device, an optical detector part of a camera, an optical emitter part of a light emitting device. Optical devices of particular relevance include those where having the array of optical components in a controllable and variable surface curvature provides functional benefit. Examples include optical detectors where varying the surface curvature of the optical detectors provides improved image focusing. In the context of photovoltaics, varying the curvature of the photovoltaic array surface (e.g., semiconductor material) facilitates matching photovoltaic surface shape to angle or position of incident light, thereby improving overall efficiency. With respect to light emitters, an array of light emitting components, such as light emitting diodes, may have a surface shape varied so as to provide additional control to light output, such as light position, illumination area, diffusivity, and intensity, particularly when paired with other optical components such as lenses, polarizers and filters. In an embodiment, the optical device is not a mirror.

"Deformable substrate" refers to a material to which the array of optical components is connected and that is capable of moving in response to a change in applied force, such as by bending.

"Operably connected" refers to a connection between elements of the present invention so that the functionality of each element is preserved. An actuator that is operably connected to the contact surface of the deformable substrate refers to an arrangement where the actuator generates a controllable force (magnitude and/or direction) that is transferred to a contact surface upon which the optical component array is supported, thereby controlling the curvature of the contact surface and corresponding array. The actuator, however, does not adversely impact the functionality of the array.

"Variably controls" or "variable control" of curvature refers to an actuator that is capable of changing curvature of a deformable substrate surface in a controlled and precise manner. In an embodiment, variable control refers to the curvature of the substrate contact surface that is within 10%, within 5%, or within 1% of the desired curvature, including for a curvature that can be characterized as having a radius of curvature or another parameter that provides a quantifiable description of curvature (e.g., parabolicity, or other equation that fits a curved surface). The variable control may refer to an average value, or the maximum deviation from a desired value at one or more locations over a defined area.

"Curvature" refers to the shape of a surface, such as a contact surface that supports the optical component array. In certain embodiments, the curvature is smooth and can be defined at least partially by a radius of curvature (partially spheroid), a paraboloid, ellipsoid. Curvature includes, in certain embodiments, more complex surface shapes, such as hyperboloid, Gaussian curvature, and non-uniform curvatures. An advantage of the devices and methods provided herein is that the combination of one or more actuator(s), the optical component array configuration on a thin deformable substrate, and the ability to incorporate shape-influencing elements in or on the substrate, accesses any number of simple and/or complex curvatures, as desired.

"Elastomer" refers to a polymeric material which can be stretched or deformed and return to its original shape without substantial permanent deformation. Elastomers commonly undergo substantially elastic deformations. Exemplary elastomers useful in the present invention may comprise, polymers, copolymers, composite materials or mixtures of polymers and copolymers. Elastomeric layer refers to a layer comprising at least one elastomer. Elastomeric layers may also include dopants and other non-elastomeric materials. Elastomers useful in the present invention may include, but are not limited to, thermoplastic elastomers, styrenic materials, olefenic materials, polyolefin, polyurethane thermoplastic elastomers, polyamides, synthetic rubbers, PDMS, polybutadiene, polyisobutylene, poly(styrene-butadiene-styrene), polyurethanes, polychloroprene and silicones. In one aspect, the deformable substrate comprises an elastomer, including for those applications where elastic deformation is desired, including over a large number and/or curvature change.

"Serpentine" refers to an interconnect geometry that has a meandering curvature with respect to a straight-line distance between the ends of the interconnect. In other words, the length of the interconnect is substantially greater than a virtual straight line that connects the interconnect ends. In an aspect, the interconnect length is at least 20%, at least 50%, at least 100% greater than the virtual straight line. In an aspect, the curvature has two distinct portions, wherein the curvature direction of each portion is opposite the other. In an aspect, the serpentine geometry is characterized as "in plane" in that the interconnect generally follows the surface of a plane formed by an underlying contact surface, including as disclosed in U.S. Pat. Pub. 2010-0002402; PCT Pub. No. WO 2011/115643, U.S. Pat. No. 7,768,373. In contrast, a buckled geometry has a curvature with an out-of-plane deformation, including as disclosed in U.S. Pat. Pubs. 2008/0157235, 2010/0059863 and U.S. Pat. No. 7,521,292. A buckled and serpentine geometry refers to an interconnect having both in-plane meandering and out-of-plane buckling. This configuration of interconnects facilitates strain or stress isolation of those portions of the optical component array that are more sensitive to strain or stress.

"Spatially-varying material property" refers to a property of a material that varies selectively along one or more lateral dimensions of a deformable substrate. Examples of material property include thickness, modulus, reinforcement elements, embedded material, air pockets, and other features that influence how a material reacts to an applied force.

"Tunable" refers to the ability to adjust the curvature of the deformable substrate to a desired curvature, thereby obtaining a functional benefit to the system. In the imaging application, a functional benefit of tuning the photodetector array is to better focus an image captured from a curved lens, no matter the zoom factor.

"In focus" refers to an image obtained from a curved surface that substantially matches a curved surface that provides the highest image resolution, sharpness and information. For example, for a curved lens, a Petzval surface for the lens configuration and object distance from the lens is calculated, such as by raytracing or solution of the lens equation. The substrate is then accordingly curved to substantially match the Petzval surface, thereby providing an in focus image. In an aspect, in focus is quantified as a curvature of the substrate contact surface that is within 10%, within 5%, or within 1% of the desired curvature, such as for a Petzval surface in the context of an imaging application. The quantification may be at a specific point of the surface, averaged over a region, or averaged over the entire surface. In focus also refers to an empirically-determined surface shape, where surface shape is adjusted to obtain an image that is maximally in focus, such as having sharp edge features, and high resolution between adjacent elements. For example, the surface shape can be manually adjusted in a manner similar to conventional cameras where a manual adjustment of lens optics provides a means of focusing. Alternatively, the focusing can be automated, in a manner similar to cameras having auto-focus lens.

"Dynamically tunable" refers to the ability adjust curvature in real-time and on the fly, during use of a device incorporating the array of optical components. In contrast, non-dynamically tunable refers to systems that, although curvature may be controlled to a desired value, that desired value is then fixed and cannot be readily adjusted thereafter.

"Fluidic lens" refers to a lens whose curvature is adjusted via control of fluid pressure exerted against a surface of the lens. Increasing fluid pressure increase lens curvature, thereby influencing a number of optical properties, including zoom and field of view. Examples of fluidic lenses include various systems described in JBO Letters 15(3):030504-1 (2010); Optics Letters 33(3):291-293 (2008); U.S. Pat. Nos. 7,986,465, 8,018,658, 7,453,646, 7,675,686, 7,826,145.

"Continuously adjustable" refers to the ability to vary a parameter continuously and smoothly over a range. For the embodiment where an imaging system has a continuously adjustable zoom, the lens curvature is controlled to any curvature within a range, so that the zoom is correspondingly continuous over the range constrained by the curvature range. By varying lens curvature, the zoom factor along with field of view is varied. Because the detector paired to the lens is also continuously adjustable over a curvature range, focus is substantially maintained over all zooms without need for intervening optical components between the lens and photodetector.

"Semiconductor" refers to any material that is a material that is an insulator at a very low temperature, but which has an appreciable electrical conductivity at a temperatures of about 300 Kelvin. In the present description, use of the term semiconductor is intended to be consistent with use of this term in the art of microelectronics and electronic devices.

Semiconductors useful in the present invention may comprise element semiconductors, such as silicon, germanium and diamond, and compound semiconductors, such as group IV compound semiconductors such as SiC and SiGe, group III-V semiconductors such as AlSb, AlAs, Aln, AlP, BN, GaSb, GaAs, GaN, GaP, InSb, InAs, InN, and InP, group III-V ternary semiconductors alloys such as $Al_xGa_{1-x}As$, group II-VI semiconductors such as CsSe, CdS, CdTe, ZnO, ZnSe, ZnS, and ZnTe, group I-VII semiconductors CuCl, group IV-VI semiconductors such as PbS, PbTe and SnS, layer semiconductors such as $PbI_2$, $MoS_2$ and GaSe, oxide semiconductors such as CuO and $Cu_2O$. The term semiconductor includes intrinsic semiconductors and extrinsic semiconductors that are doped with one or more selected materials, including semiconductor having p-type doping materials and n-type doping materials, to provide beneficial electronic properties useful for a given application or device. The term semiconductor includes composite materials comprising a mixture of semiconductors and/or dopants. Specific semiconductor materials useful for in some applications of the present invention include, but are not limited to, Si, Ge, SiC, AlP, AlAs, AlSb, GaN, GaP, GaAs, GaSb, InP, InAs, GaSb, InP, InAs, InSb, ZnO, ZnSe, ZnTe, CdS, CdSe, ZnSe, ZnTe, CdS, CdSe, CdTe, HgS, PbS, PbSe, PbTe, AlGaAs, AlInAs, AlInP, GaAsP, GaInAs, GaInP, AlGaAsSb, AlGaInP, and GaInAsP. Porous silicon semiconductor materials are useful for applications of the present invention in the field of sensors and light emitting materials, such as light emitting diodes (LEDs) and solid state lasers. Impurities of semiconductor materials are atoms, elements, ions and/or molecules other than the semiconductor material(s) themselves or any dopants provided to the semiconductor material. Impurities are undesirable materials present in semiconductor materials which may negatively impact the electronic properties of semiconductor materials, and include but are not limited to oxygen, carbon, and metals including heavy metals. Heavy metal impurities include, but are not limited to, the group of elements between copper and lead on the periodic table, calcium, sodium, and all ions, compounds and/or complexes thereof. In an aspect, the optical components comprise a semiconductor material.

Figure 26:
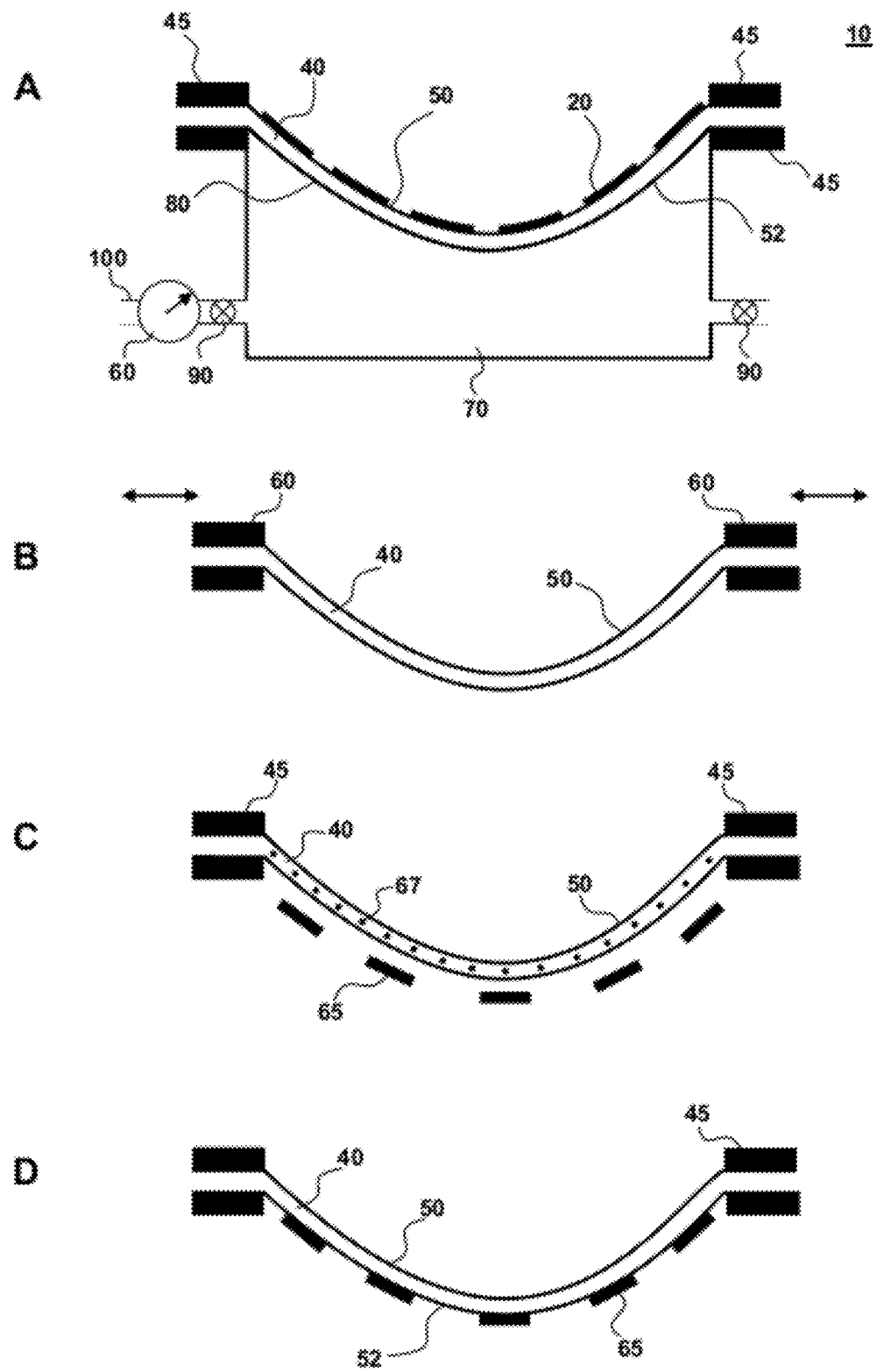
FIG. 26 Schematic illustration of an array of optical components having a tunable curvature by various actuators: A Hydraulic or pneumatic actuator; B Mechanical actuator; C Force generator integrated with deformable substrate; D Array of actuators positioned on substrate back surface.
Figure 27:
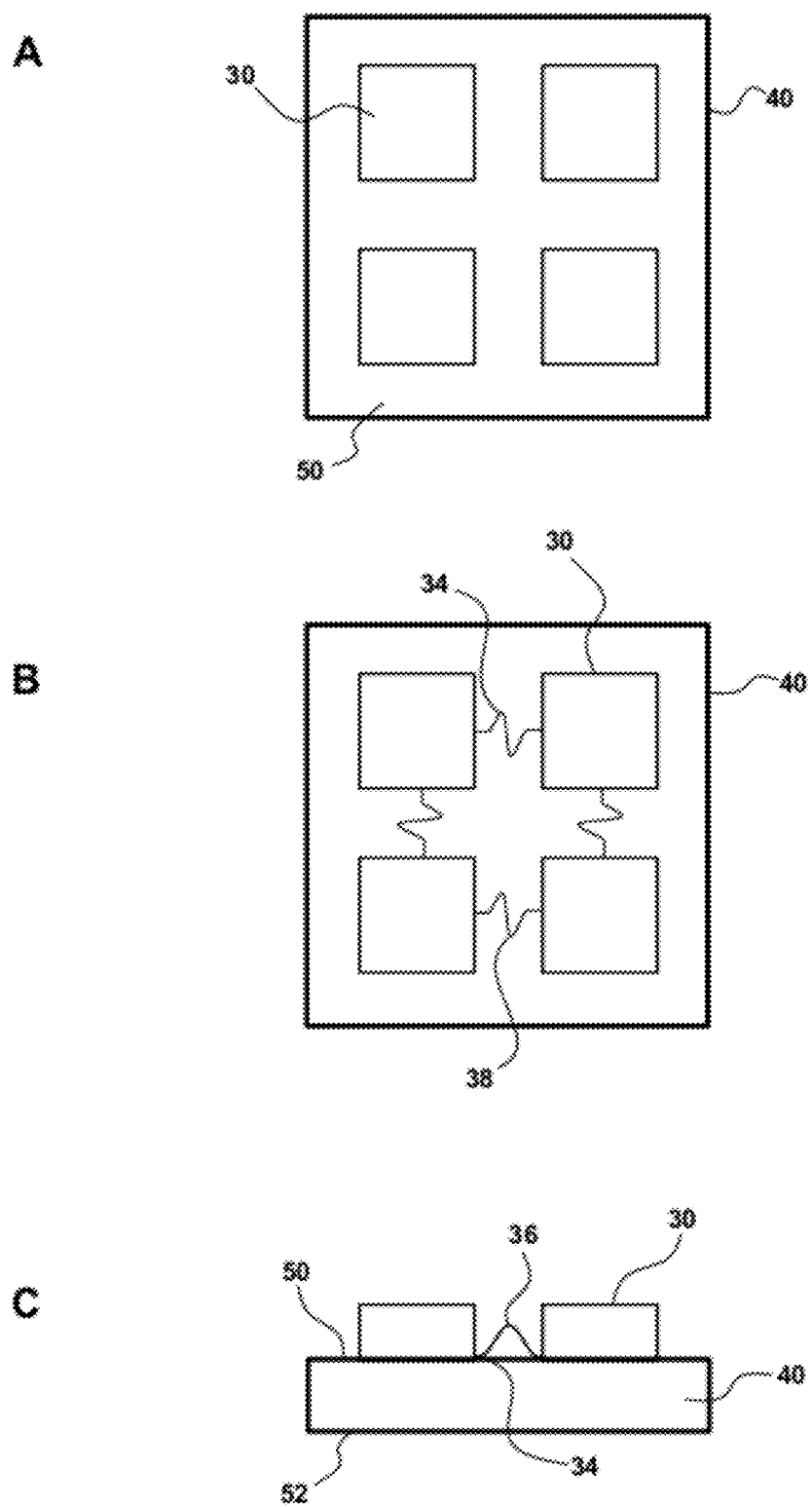
FIG. 27 Schematic illustration of mechanically interconnected optical components: A Mechanical interconnection via the substrate contact surface; B Serpentine interconnects; C Out-of-plane buckled interconnects.

A schematic illustration of one embodiment of an array of optical components is provided in FIG. 26A, wherein the curvature or shape of the array of optical components is variable and controllable. A tunable array of optical components 10 comprises a deformable substrate 40 having a contact surface 50 that supports an array of mechanically interconnected optical components 20. "Support" is used broadly to refer to a mechanical connection between the substrate and optical components, and includes embodiments where optical components are on the surface, partially embedded, and/or completely embedded in the substrate. In an embodiment, the optically active portion of the optical component is not embedded in the substrate, and has an optically active surface that is at least not covered by the substrate. The contact surface 50 is curved, and optionally hemispherically shaped defined by a radius of curvature. The array of optical components 20 is further illustrated in FIG. 27, comprising islands 30 interconnected to adjacent islands by interconnects 34, including serpentine interconnects 38 (FIG. 27B) and/or buckled interconnects 36 (FIG. 27C). In an aspect, the island comprises a semiconductor material. In an aspect, the island comprises a silicon photodetector. A serpentine and/or buckled configuration provides the ability for the array to remain functional over a range of curvatures, ranging from flat (as illustrated in FIG. 27) to curved (FIG. 26A). The contact surface 50 is shown in a concave configuration in FIG. 26A. In an embodiment, the contact surface has a convex configuration. In an aspect, the array (and corresponding deformable substrate), can be configured between concave, convex and flat, with the array of optical components maintaining good functionality over all desired curvatures.

The ability to precisely control the curvature of the array of optical components provides the "tunability" of the array of optical components, including for an array of optical detectors in an imaging system. In an embodiment, tunability is implemented via an actuator that controls curvature of the deformable substrate. Any actuator type may be used to provide curvature control, including actuators that are integrated with the membrane or are physically separate from the deformable substrate.

One embodiment of an actuator that is physically separated from the substrate is illustrated in FIG. 26A, (see also, e.g., FIG. 1A, 1B, 9, 12, 16), where the actuator is part of a hydraulic or pneumatic system. The actuator 60 controls the pressure or fluid amount in an optical component fluid chamber 70, such as an actuator that is a fluid pump. Optionally, other in-line components such as a pressure controller or regulator 90 provides a means for more precisely controlling or regulating pressure or fluid to the chamber 70, such as a stop-cock for diverting or releasing fluid, a flow-meter or flow-regulator. The fluid chamber 70 has a surface 80 corresponding to a surface of the elastomeric membrane 40. For the embodiment where the other surfaces of the fluid chamber 70 are rigid, a change in pressure or fluid amount in the fluid chamber 70 results in a change in curvature of the membrane 40, and correspondingly change in curvature of the array of optical components 20 by virtue of the membrane 40 ends fixed in place by a holder 45. In the embodiment of FIG. 26A the fluid chamber is positioned adjacent to a back surface 52 of the deformable substrate 40, wherein the substrate 40 separates the back 52 and contact 50 surfaces. In this embodiment, increasing pressure or fluid 100 to chamber 70 decreases the curvature toward a more flat geometry. In an aspect, increasing further the pressure or fluid amount in the chamber 70 can provide an opposite curvature (e.g., from concave to convex). Alternatively, the fluid chamber 70 is positioned adjacent to the contact surface, where an increase in pressure or fluid amount generates an increase in curvature compared to that shown in FIG. 26A. In an aspect the fluid 100 is a liquid. In an aspect the fluid 100 is a gas.

In an embodiment, the actuator is a mechanical actuator that applies a direct mechanical force to the deformable substrate. FIG. 26B illustrates an embodiment where a mechanical actuator 60 applies a direct mechanical force to the deformable substrate 40, such as a radially-directed tension and displacement to control curvature of a circular membrane or deformable substrate. Additional curvature control may be implemented by incorporating spatially-varying substrate parameters, such as modulus, thickness, or features that influence substrate curvature such as relief or recess features (e.g., contouring of substrate surface(s)), rigidity-promoting elements, air pockets, and combinations thereof.

In another embodiment, the actuator is at least partially integrated with the deformable substrate, as illustrated in FIG. 26C, where a force generator 65 exerts a force on the deformable substrate 40 by a force exerted on a material 67 integrated with the deformable substrate 40. For example, a material may be embedded in the substrate and upon actuation of the actuator a force is generated on the substrate, thereby controlling substrate curvature. The force generator may be based on piezoelectric, electrostatic or magnetic devices. For magnetic actuation, magnetizable particles may be embedded in the substrate, and magnets positioned as desired to achieve the desired shape by precisely controlling the magnetic force. In an aspect, electromagnet(s) are used to provide precise control of magnetic force magnitude and direction. Similarly, the embedded material may be an electroactive material, wherein electric input to the material generates a force that, in turn, affects curvature of the deformable substrate 40.

Alternatively, the deformable substrate may itself be the actuator, such as by a substrate formed by shape-memory material, such as a shape-memory polymer, alloy or metal. In an aspect, the substrate is a shape-memory polymer whose curvature is controlled by varying temperature. In an embodiment illustrated in FIG. 26D, an array of mechanical actuators 65 are positioned on the substrate 40 back surface 52 to provide controlled change in curvature of the substrate and corresponding array of optical components supported by the substrate. Similarly, the actuators 65 may be positioned within the substrate 40 to effect change in substrate curvature. In an embodiment, the actuators are piezoelectric actuators.

FIG. 27 illustrates details of mechanically interconnected optical components. "Mechanically interconnected" is used broadly to refer to the aspect where movement of one optical component necessarily results in controlled and corresponding movement of another optical component. In the simplest aspect, illustrated in FIG. 27A, individual optical components 30 are mechanically connected to another optical component at least by virtue of being supported by a common contact surface 50. In this manner, optical components may be individually and independently wired. FIGS. 27B and 27C illustrate an embodiment where adjacent optical components are interconnected with each other, such as by a serpentine (FIG. 27B) or a buckle (FIG. 27C) interconnect. In an aspect, the interconnect may establish electrical connection between adjacent optical components (see, e.g., U.S. Pub. No. 2008/0157235), or may provide additional functionality to the array, such as an interconnect that is a semiconductor material or a semiconductor device (see, e.g., U.S. Pat. No. 7,521,292, U.S. Pub. No. 2010/0059863). An interconnect that is buckled or serpentine facilitates functionality of the interconnect, and associated optical components to which the interconnect ends are connected, over wide ranges of curvature, ranging from highly concave, through substantially planar, to highly convex.

Example 1: Dynamically Tunable Hemispherical Electronic Eye Camera System with Adjustable Zoom Capability. Imaging systems that exploit arrays of photodetectors in curvilinear layouts are attractive due to their ability to match the strongly non-planar image surfaces (i.e. Petzval surfaces) that form with simple lenses, thereby creating new design options. Recent work has yielded significant progress in the realization of such 'eyeball' cameras, including examples of fully functional silicon devices capable of collecting realistic images. Although such systems provide advantages compared to those with conventional, planar designs, their fixed detector curvature renders them incompatible with changes in the Petzval surface that accompany variable zoom achieved with simple lenses. This example describes a class of digital imaging device that overcomes this limitation, through the use of photodetector arrays on thin elastomeric membranes, capable of reversible deformation into hemispherical shapes with radii of curvature that can be adjusted dynamically, including by actuation via hydraulics or pneumatics. Combining this type of detector with a similarly tunable, fluidic plano-convex lens yields a hemispherical camera capable of adjustable zoom and excellent imaging characteristics. Systematic experimental and theoretical studies of the mechanics and optics reveal all underlying principles of operation. This type of technology has a number of useful applications, including for night-vision surveillance, endoscopic imaging and other areas that require compact cameras with simple zoom optics and wide angle fields of view.

Mammalian eyes provide the biological inspiration for hemispherical cameras, where Petzval-matched curvature in the photodetector array can dramatically simplify lens design without degrading the field of view, focal area, illumination uniformity or image quality(1). Such systems use photodetectors in curvilinear layouts due to their ability to match the strongly non-planar image surfaces (i.e. Petzval surfaces) that form with simple lenses(2-4). Historical interest in such systems has culminated recently with the development of realistic schemes for their fabrication, via strategies that overcome intrinsic limitations associated with the planar operation of existing semiconductor process. Several approaches have yielded significant progress(4-6). The most promising procedures involve either direct printing of devices and components onto curved surfaces(6), or geometrical transformation of initially planar systems into desired shapes(1, 7-9). All demonstrated designs involve rigid, concave device substrates, to achieve improved performance compared to planar cameras when simple lenses with fixed magnification are used. Interestingly, biology and evolution do not provide guides for achieving the sort of large-range, adjustable zoom capabilities that are widely available in man-made cameras. The most relevant examples are in avian vision, where shallow pits in the retina lead to images with two, fixed levels of zoom (50% high magnification in the center of the field of view)(10). Also, changes in imaging properties occur, but in an irreversible fashion, during metamorphosis in amphibian vision to accommodate transitions from aquatic to terrestrial environments(11).

The challenge in hemispherical imagers is that, with simple optics, the curvature of the Petzval surface changes with magnification in a manner that leads to mismatches with the shape of detector array. This behavior strongly degrades the imaging performance, thereby eliminating any advantages associated with the hemispherical detector design. The solution to this problem demands that the curvature of the detector array changes in a coordinated manner with the magnification, to ensure identical shapes for the image and detector surfaces at all zoom settings. This example provides a system that accomplishes this outcome by use of an array of interconnected silicon photodetectors on a thin, elastomeric membrane, in configurations that build on advanced concepts of stretchable electronics(12-14). Actuating a fluidic chamber beneath the membrane of the optical components causes it to expand or contract in a linear elastic, reversible fashion that provides precise control of the radius of curvature. Integrating a similarly actuated fluidic plano-convex lens yields a complete, hemispherical camera system with continuously adjustable zoom capability.

Figure 1B:
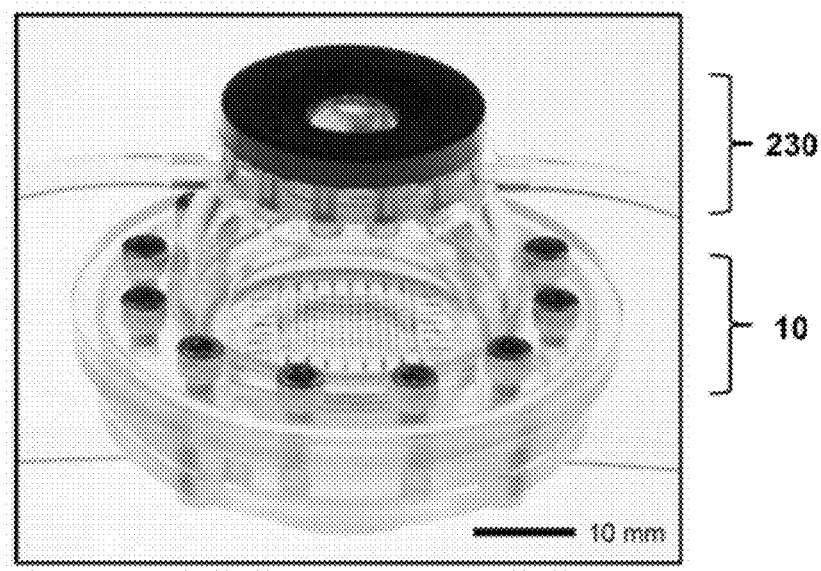
FIG. 1B is a photograph of a complete camera.
Figure 1C:
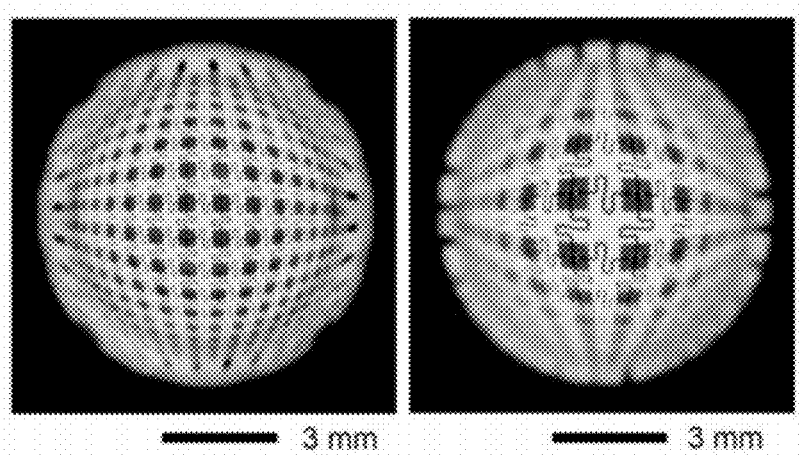
FIG. 1C: Photographs of the photodetector array imaged through the lens, tuned to different magnifications. The left and right images are acquired at radius of curvature in the lens of 5.2 mm and 7.3 mm. In both cases, the radius of curvature of the detector surface is 11.4 mm. The distance of the center part of the detector from the bottom part of the lens is 25.0 mm.
Figure 1D:
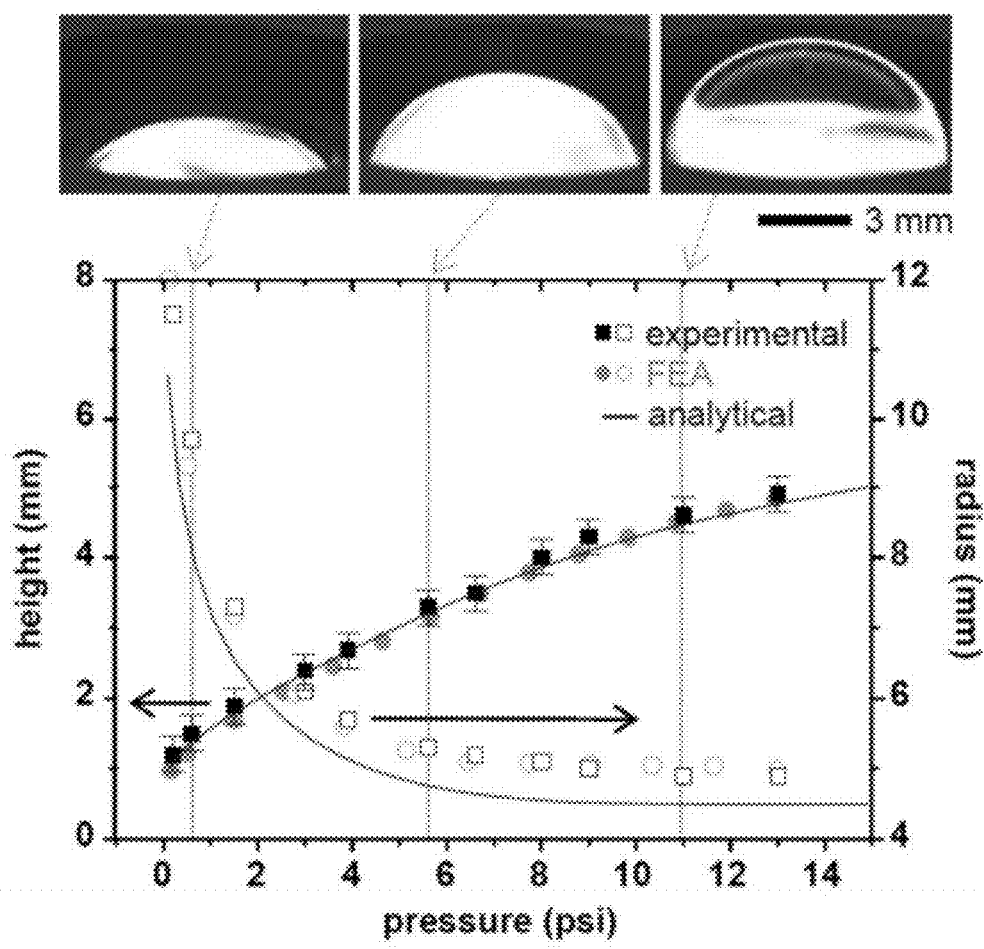
FIG. 1D: Angled view optical images of the tunable lens at three different configurations (Upper), achieved by increasing the fluid pressure from left to right. The lower frame shows measurements of the height and radius of curvature of the lens surface as a function of applied fluid pressure. The results reveal changes that are repeatable and systematic (experimental; open and filled square symbols), and quantitatively consistent with analytical calculations of the mechanics (labeled analytical) and finite element analysis. (labeled FEA).
Figure 10:
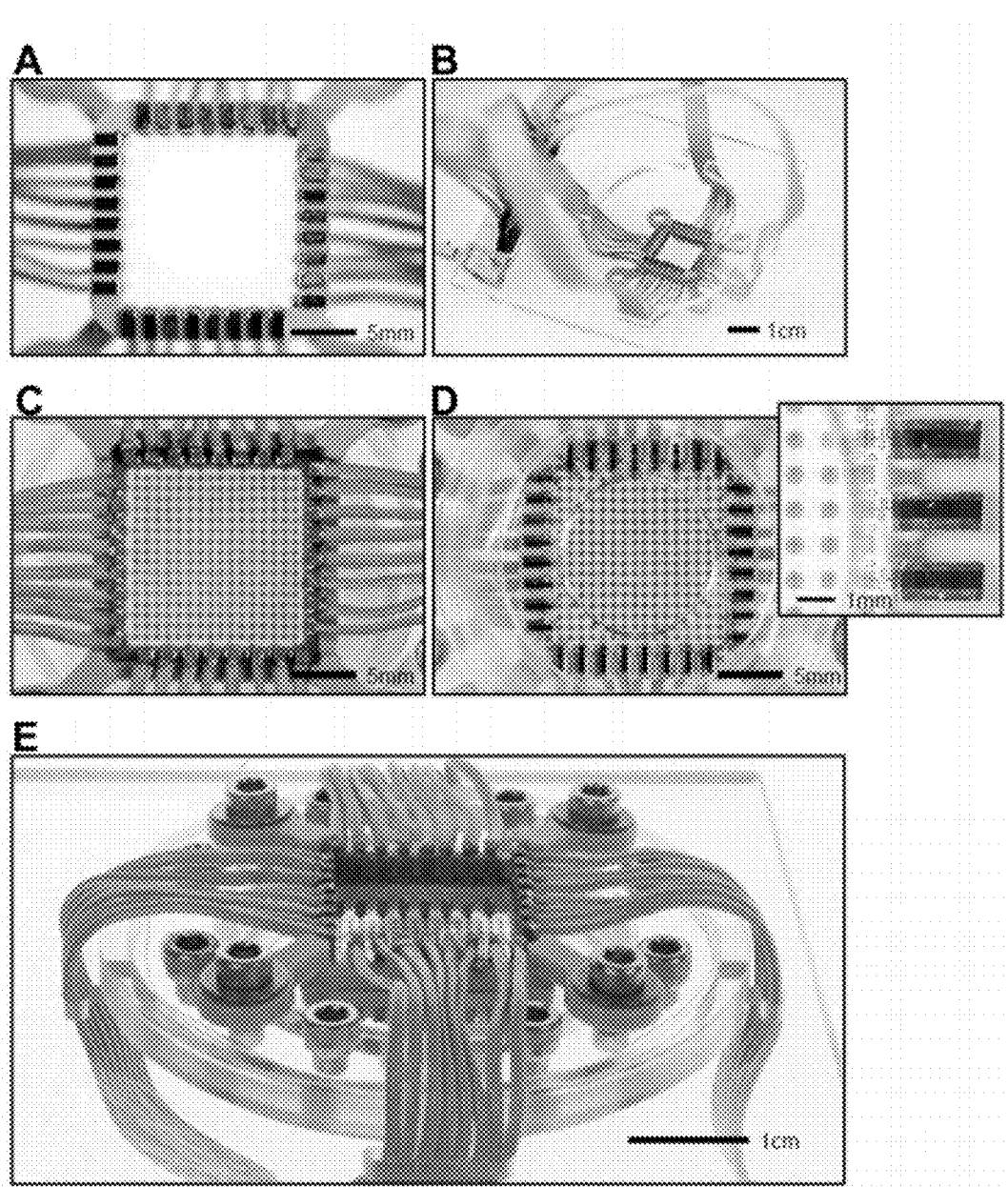
FIG. 10 (A) Photograph of contacting electrodes pin assembly before surface polishing and metal layer deposition. (B) Photograph of the mounting board with electrodes pin array assembled. (C) The top down photograph of electrodes pin array installed on a photodetector/diode array. (D) The bottom up view of electrodes pin array installed on a photodetector/diode array, close-up view of the area where electrode pins are pressing electrodes of device array (inset). (E) A tilted view of the pressing bar element which has four cantilever springs at the corner.

FIG. 1A provides a schematic illustration of one embodiment of the device having hydraulic or pneumatic actuation and FIG. 1B shows a picture of an integrated system. The upper and lower components correspond to an adjustable, plano-convex zoom lens 220 and a tunable, hemispherical detector array 210, respectively. The lens uses adapted versions of similar components described elsewhere(15-18);

it comprises a water-filled cavity (1 mm thick, in the planar, unpressurized state; "lens fluid chamber") between a thin (0.2 mm) membrane of the transparent elastomer poly (dimethylsiloxane) (PDMS) 222 on top and a glass window (1.5 mm thick) or optically transparent window 232 underneath. Pumping water into this cavity by liquid input 240 deforms the elastomer lens 222 into a hemispherical shape, with a radius of curvature that depends on the pressure. This curvature, together with the index of refraction of the PDMS and water, defines the focal length of the lens and, therefore, the magnification that it can provide. FIG. 1C shows images of the detector array viewed through the fluidic lens, at two different positive pressures. The changes in magnification evident in FIG. 1C are reversible, and can be quantified through measurement and mechanics modeling. FIG. 10 presents side view images (top panel) and data collected at various states of deformation (bottom panel). The lens adopts an approximately hemispherical shape for all tuning states, with an apex height and radius of curvature ($R_L$) that change with pressure in a manner quantitatively consistent with theory (lines) and finite element analysis (circles), as shown in the graph of FIG. 1D.

An important and challenging component of the camera is the tunable detector array 210 of the tunable array of optical components 10. The image formed by a plano-convex lens lies on a Petzval surface that takes the form of an elliptic paraboloid of revolution(1, 7), well approximated by a hemisphere in many cases of practical interest. The curvature depends strongly on magnification. As a result, the shape of the detector surface must change to accommodate different settings in the lens configuration. FIG. 1A, 1B and FIG. 2 provide illustrations, images and other details of a system that affords the required tunability, via stretchable designs actuated by hydraulics or pneumatics. The detector comprises of an array of unit cells, each of which includes a thin (1.25 µm) silicon photodiode and blocking diode, the latter of which facilitates passive matrix readout. Narrow metal lines (Cr (5 nm)/Au (150 nm)) encapsulated with thin films of polyimide (~1 µm) on top and bottom provide ribbon-type interconnects between these cells, in a neutral mechanical plane layout that isolates the metal from bending induced strains. The interconnects have serpentine shapes, to form an overall system with an open mesh geometry. These collective features enable the array to accommodate large strains associated with deformation of a thin (0.4 mm) supporting membrane of PDMS (13, 14). The fabrication involves planar processing of the devices and interconnects on a rigid substrate; release and transfer to the PDMS represents the final step. The area coverage of the device islands and the photoresistive regions are ~30% and ~13%, respectively. Previously reported mechanical designs can be used to achieve coverage up to ~60%. (9) Typical yields of working pixels were ~95%. An additional ~1-2% of the pixels fail after extensive mechanical cycling. For the images presented in the following, we used overscanning procedures to eliminate effects of defective pixels.

Figure 2C:
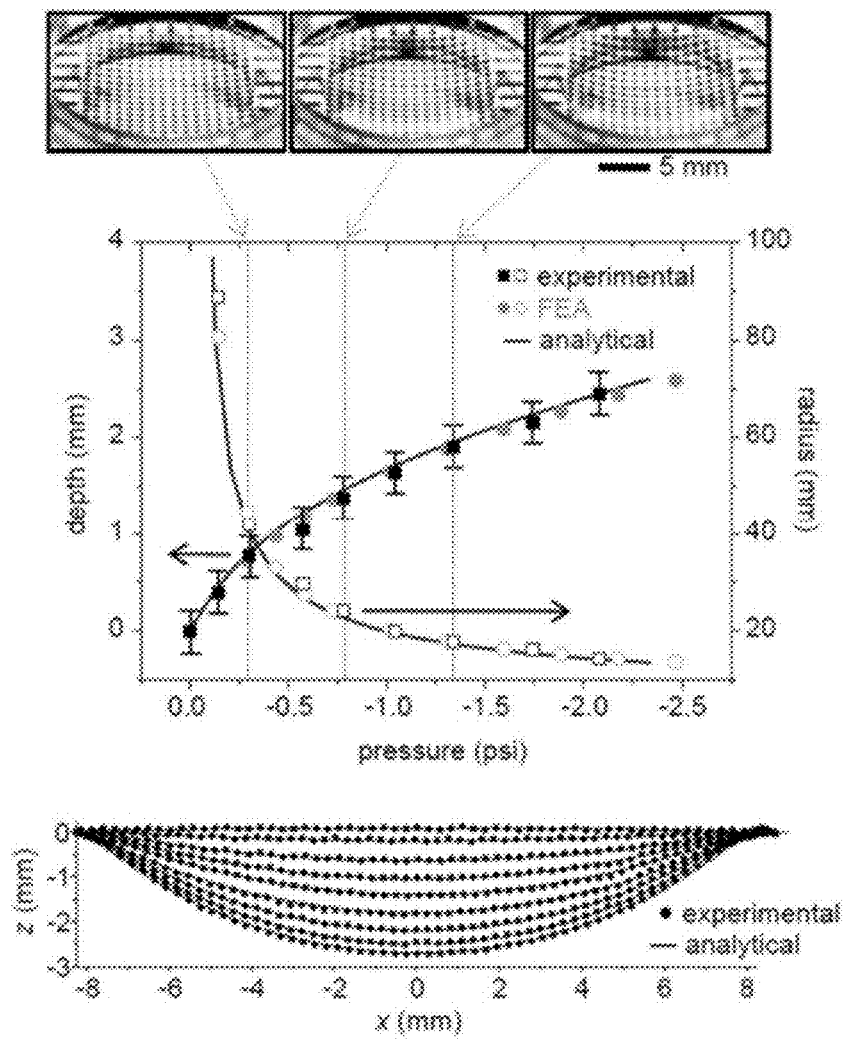
FIG. 2C: Angled view optical images of the tunable detector in three different configurations (Upper), achieved by decreasing the level of negative pressure applied to the underlying fluid chamber from left to right. Measurements of the apex height and radius of curvature of the detector surface as a function of applied fluid pressure reveal changes that are repeatable and systematic (experimental), and quantitatively consistent with analytical calculations of the mechanics (analytical), as shown in the middle frame. Laser scanning measurements of the profiles of the deformed detector surface show shapes that are almost perfectly hemispherical, consistent with analytical mechanics models. Here, each measured profile (symbols) is accompanied by a corresponding analytical calculated result (lines).
Figure 2D:
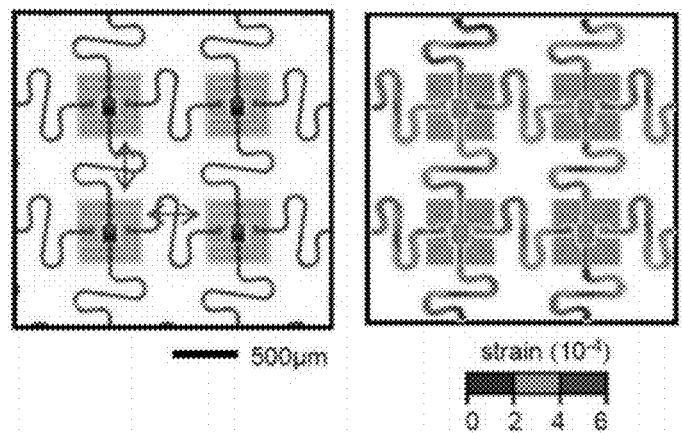
FIG. 2D: Optical micrograph of a 2×2 array of unit cells, collected from a region near the center of a detector array, in a deformed state (Left) and maximum principal strains in the silicon and metal determined by finite element analysis (Right) for the case of overall biaxial strain of 12%. These strains are far below those expected to cause fracture in the materials.
Figure 14:
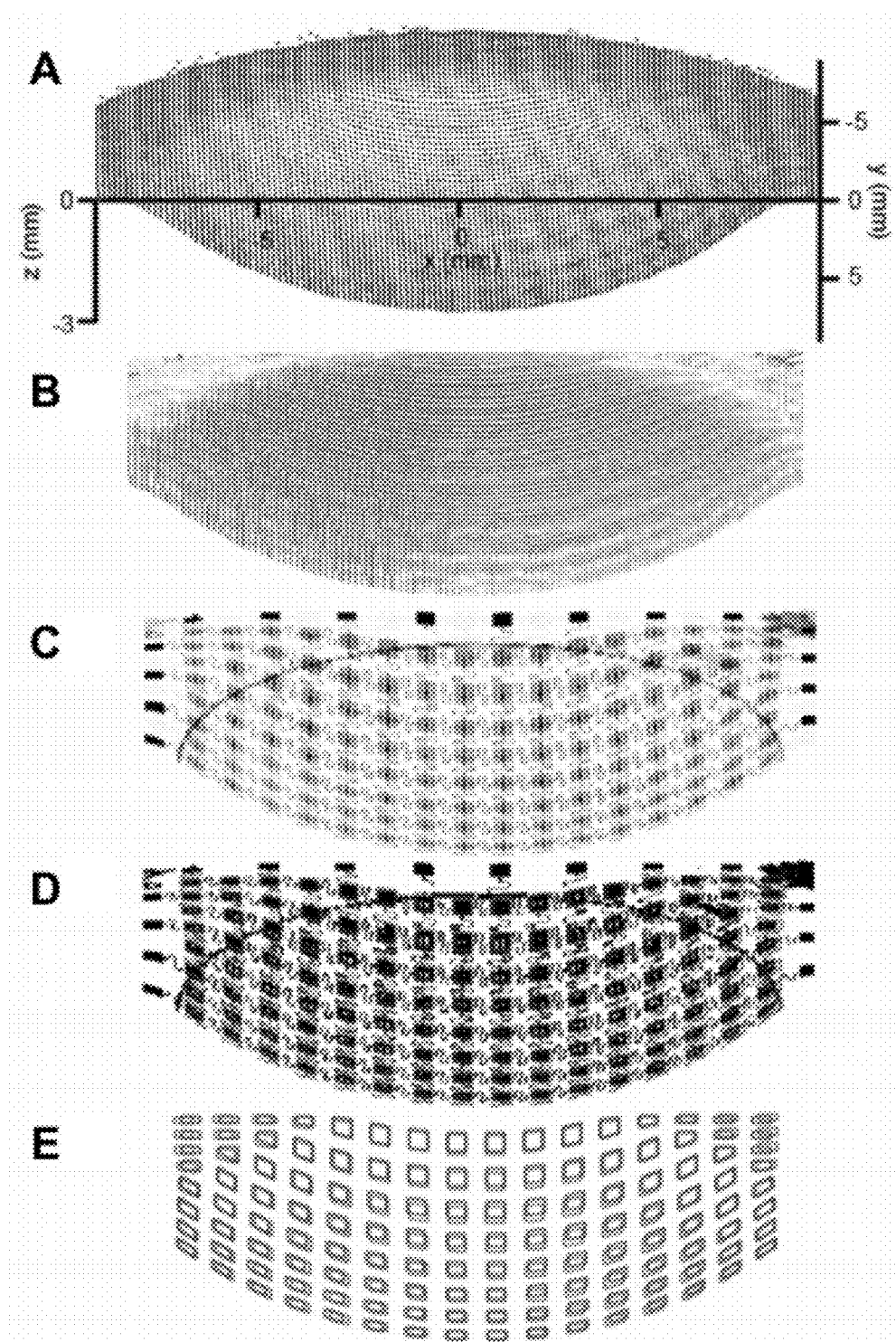
FIG. 14 Measurement scheme of pixel position: (A) Raw point data of deformed detector surface acquired by 3D scanner. (B) Generated surface by raw data. (C) Top-down view of device array projected on the generated surface. (D) Measured pixel position (squares) is overlapped on the detector surface. (E) Analytically calculated position is overlapped on measured position of (D).

Mounting the membrane with the photodetector array bonded to its surface onto a plate with a circular opening (circular, with diameter D) above a cylindrical chamber (FIGS. 1A and B), filling this chamber with distilled water and connecting input and output ports to an external pump prepares the system for hydraulic or pneumatic tuning. FIG. 2A shows tilted views of a representative device in its initial, flat configuration (i.e. no applied pressure; top frame) and in a concave shape induced by extracting liquid out of the chamber (i.e. negative applied pressure; bottom frame). The exact shapes of the deformed surfaces, and the positions of the photodetectors in the array are both important to operation. A laser scanner tool (Next Engine®) provided accurate measurements of the shapes at several states of deformation (i.e. applied pressures). For all investigated pressures, the detector surfaces exhibit concave curvature well characterized by hemispherical shapes. FIG. 2B shows a rendering of the laser-scanned surface. Measured profiles yield the peak deflection (H, at the center of the membrane) and the radius of curvature ($R_D$, also near the center). Top down images define the two dimensional positions (i.e. along polar r and θ axes of FIG. 2B) of the photodetectors, at each deformed state. Projections onto corresponding measurements of the surface shape yield the heights (i.e. along the z axis). The outcomes appear as squares in FIG. 2B. Comparison to analytical mechanics modeling of the positions shows excellent agreement (overlapping squares). The photodetector surface deforms to a hemispherical shape due to water extraction, which implies a uniform meridional strain in the deformed surface, and therefore a uniform spacing between photodetectors in this direction(19). Mechanics analysis yields predictions for H as a function of the applied pneumatic pressure caused by water extraction and also a simple expression for the radius of curvature: $R_D=(D^2+4H^2)/(8H)$. Both results appear as curves in the middle frame of FIG. 2C; they show excellent agreement with experiment (squares) and finite element analysis (circles). A photodetector with an initial position given by (r,θ,0) in cylindrical coordinates on the flat surface moves to a new position given by ($R_D \sin \phi, \theta, R_D-H-R_D \cos \phi$) on the deformed surface, where $\phi=(2r/D)\sin^{-1}[4DH/(D^2+4H^2)]$ is the polar angle (FIG. 14). The analytically obtained photodetector positions are indicated as squares in the top frame of FIG. 2B, which shows excellent agreement with both experiment and finite element analysis (bottom frame of FIG. 2B), and therefore validates the hemispherical shape of the deformed detector surface. Similar modeling can be used to define the distribution of strains across both the PDMS membrane and the array of silicon photodiodes/blocking diodes. The results (FIG. 2B) show strains in both materials that are far below their thresholds for fracture (>150% for PDMS; ~1% for silicon). The overall computed shape of the system also compares well to measurement. Further study illustrates that this level of agreement persists across all tuning states, as illustrated in FIG. 2C. Finite element analysis (bottom frame of FIG. 2B) shows that the serpentine interconnects have negligible effects on the photodetector positions(20). Understanding their behavior is nevertheless important because they provide electrical interconnection necessary for operation. Three dimensional finite element analysis of a square, 2×2 cluster of four unit cells appears in FIG. 2D. The color shading shows the max principal strains in the silicon and metal, which are the most fragile materials in the detectors. The calculated peak strains in the materials are all exceptionally low, even for this case where the overall biaxial strain is ~12%, corresponding to the point of highest strain in the array when tuned to the most highly curved configuration.

FIG. 3A presents a picture of a completed detector with external interconnection wiring to a ribbon cable that interfaces with an external data acquisition system(1). Here, a top-mounted fixture with a circular opening supports 32 electrode pins that mechanically press against corresponding pads at the periphery of the detector array. A compression element with four cantilever springs at each corner ensures uniformity in the applied pressure, to yield a simple and robust interconnection scheme (no failures for >100 tuning cycles), see also FIG. 10. These features and the high yields on the photodetector arrays enable cameras that can collect realistic images, implemented here with resolution enhancements afforded by scanning procedures to allow detailed comparison to theory. To explore the basic operation, we first examine behavior with a fixed plano-concave imaging lens (see, e.g., FIG. 1D). Representative images collected with the detector in planar and hemispherical configurations appear in FIG. 3B. The object in this case consists of a pattern of discs (diameters: 2 mm; distances between near neighbors: 3 mm; distances between distant neighbors: 5 mm), placed 75 mm in front of a glass plano-convex lens (diameter: 9 mm; focal length: 22.8 mm). The image in the flat state corresponds to a distance of 26.2 mm from the lens, or 5.5 mm closer to the lens than the nominal position of the image computed with thin lens equations. At this location, the regions of the image in the far periphery of the field of view (i.e. the four corners) are in focus. The center of the field of view is not simultaneously in focus because of the Petzval surface curvature associated with the image. Deforming the detector array into a concave shape moves the center region away from the lens, and toward the position of the image predicted by the thin lens equation. The hemispherical shape simultaneously aligns other parts of the detector with corresponding parts of the image. As a result, the entire field of view comes into focus at once. Simulated images based on experimental parameters appear in FIG. 3D. The results use ray-tracing calculations and exploit the cylindrical symmetry of the device(21, 22). In particular, fans of rays originating at the object (75 mm in front of the lens) were propagated through the system to determine relevant point spread functions (PSFs). Placing corresponding PSFs for every point at the object plane, using a total of 10000 rays, onto the surface of a screen defined by the shape of the detector yields images suitable for direct comparison to experiment.

Figure 3:
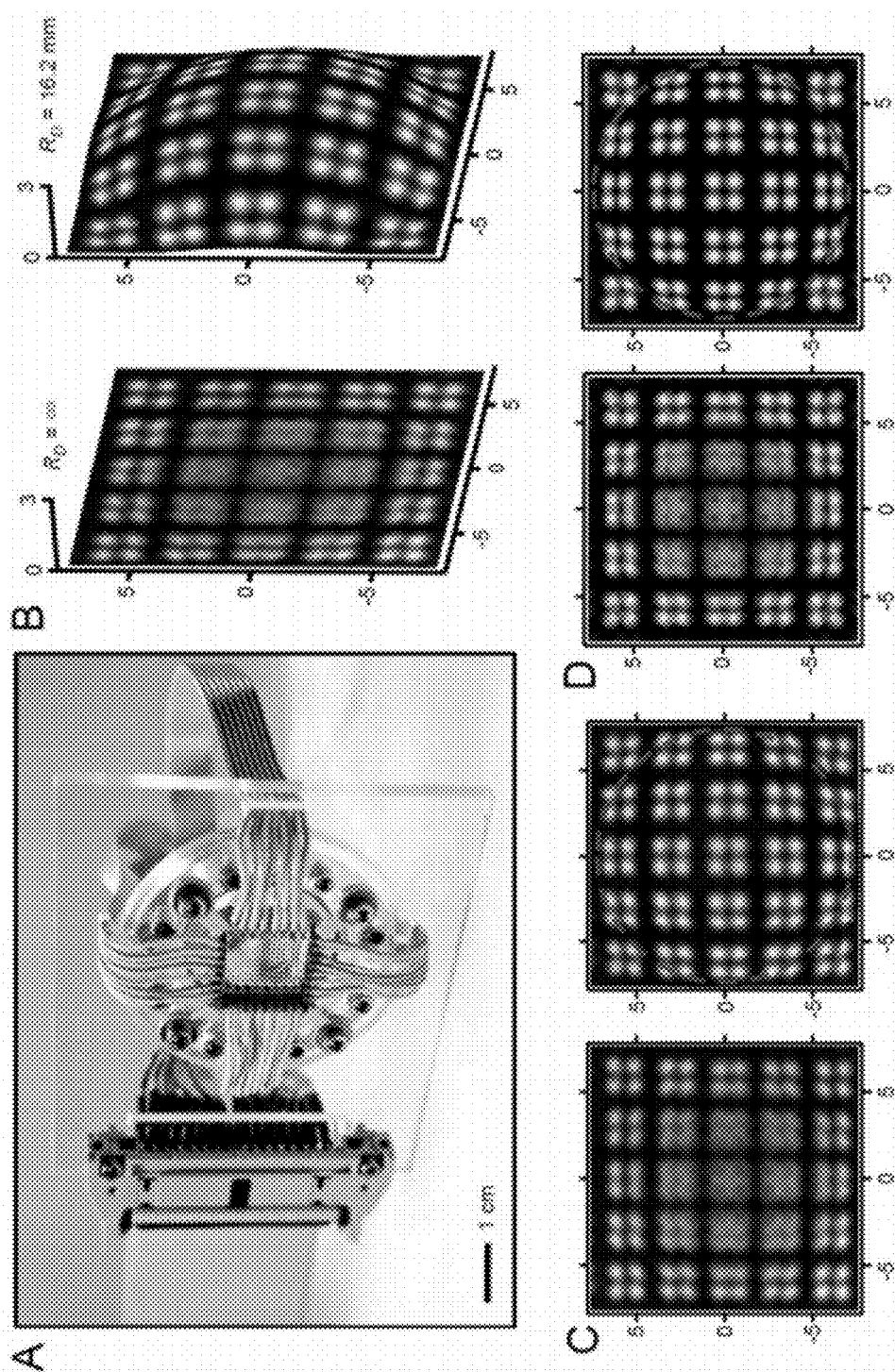
FIG. 3. (A) Photograph of a deformable detector array with external electrical interconnections. Electrode pins on a mounting plate press against matching electrodes at the periphery of the array to establish connections to a ribbon cable that leads to a data acquisition system. (B) Images of a test pattern of bright circular discs, acquired by the device in flat (Left) and deformed hemispherical (Right) configurations, collected using a glass plano-convex lens (diameter: 9 mm, focal length: 22.8 mm). The images are rendered on surfaces that match those of the detector array. The distance between the lens and the source image is 75 mm. The radius of curvature and the maximum deflection in this deformed state are 16.2 mm and 2.2 mm, respectively. The image in the flat case was collected at a distance of 5.5 mm closer to the lens than the focal location expected by the thin lens approximation (31.7 mm). In this position, only the far peripheral regions of the image are in focus. The image in the curved configuration is acquired simply by actuating the detector into this shape, without changing any other aspect of the setup. This deformation brings the entire field of view into focus, due to matching of the detector shape to the Petzval surface. (C) Planar projections of these images. (D) Modeling results corresponding to these two cases, obtained by ray-tracing calculation. The outcomes show quantitative agreement with the measurements. The dashed circle indicates the area under deformation.
Figure 4A:
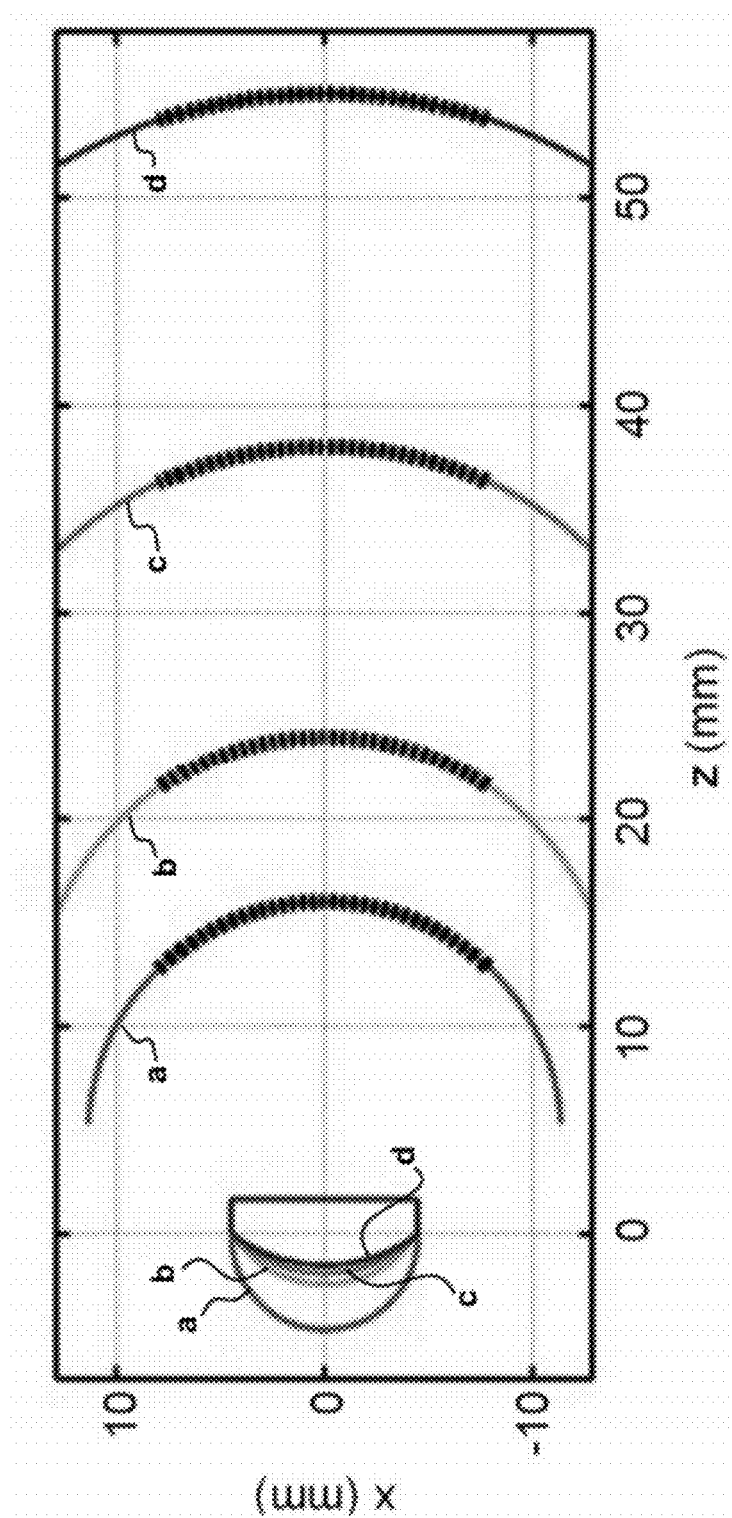
FIG. 4A: Raytracing analysis of the positions and curvatures of the image surfaces (i.e. Petzval surfaces; Right) that form with four different geometries of a tunable plano-convex lens (Left). Actual sizes of detector surfaces are shown as dashed lines.
Figure 4B:
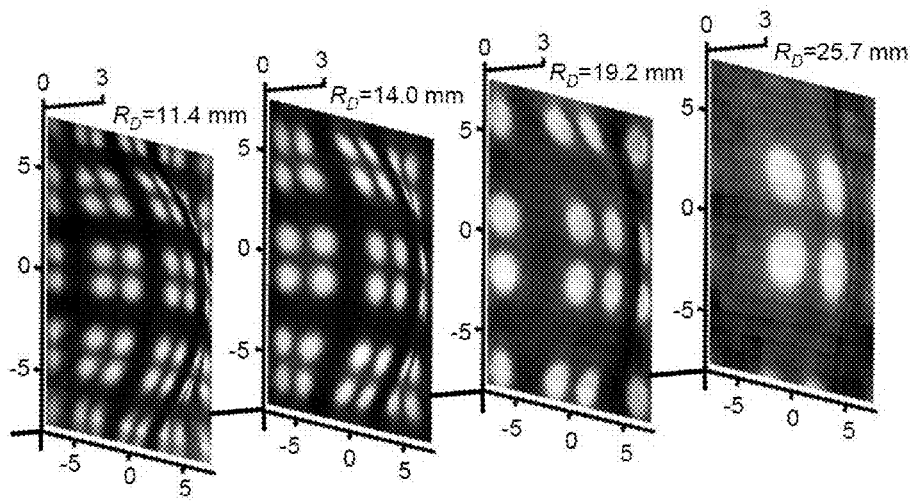
FIG. 4B: Images acquired by a complete camera system, at these four conditions. These images are collected at distances from the lens (z) of 16 mm, 24 mm, 38 mm and 55 mm with corresponding radii of curvature of the lens surface ($R_L$) of 4.9 mm, 6.1 mm, 7.3 mm and 11.5 mm. The radii of curvature ($R_D$) of the detector surface, set to match the computed Petzval surface shape, were 11.4 mm, 14.0 mm, 19.2 mm, 25.7 mm. These images are acquired by a scanning procedure described herein. The object consists of a pattern of light circular discs (diameter: 3.5 mm, pitches between circles: 5 mm and 8.5 mm).
Figure 4C:
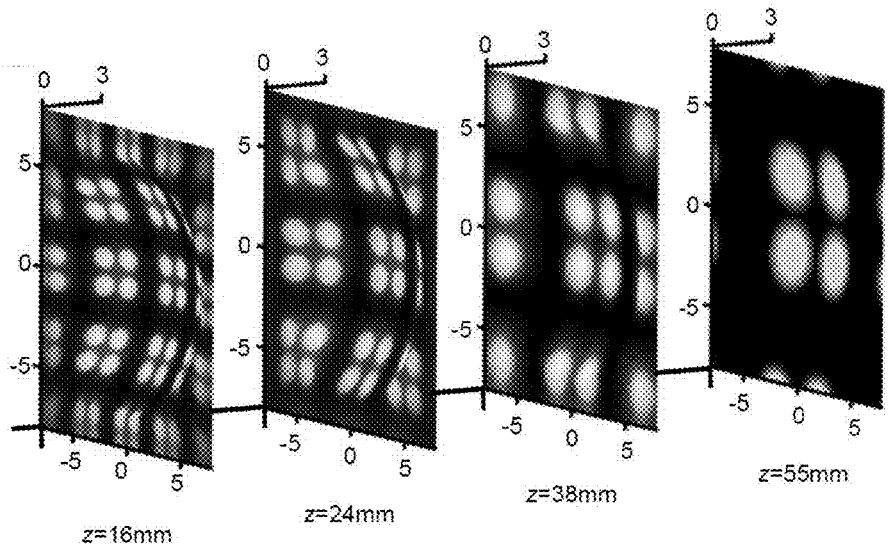
FIG. 4C: Images computed by ray tracing analysis, at conditions corresponding to the measured results. The axis scales are in millimeters.

To demonstrate full imaging capabilities and adjustable zoom, we acquired images with the tunable, fluidic lens. Ray tracing analysis for the case of an object at 67 mm from the lens provided matched parameters of $R_L$, $R_D$ and z, the distance to the center of the image surface, as representative configurations for different magnification settings. FIG. 4A shows two dimensional representations of Petzval surfaces for four different lens shapes, all plano-convex with hemispherical curvature, corresponding to ($R_L$, $R_D$, z) values of (4.9 mm, 11.4 mm, 16 mm), (6.1 mm, 14.0 mm, 24 mm), (7.3 mm, 19.2 mm, 38 mm) and (11.5 mm, 25.7 mm, 55 mm). As expected, increasing $R_L$ decreases the focal length and increases the magnification, thereby increasing z and $R_D$. Setups in this example involve manual adjustment of the distance between the detector and the lens, however, automatic adjustment of this distance may be employed via actuators or motors. Images collected at these four settings appear in FIG. 4B. The object in this case is an array of circular discs, similar to those used in FIG. 3, but with diameters of 3.5 mm, pitch values of 5 mm and 8.5 mm. The optical magnifications are 0.24, 0.36, 0.57 and 0.83, corresponding to a 3.5× adjustable zoom capability. Uniformity in focus obtains for all configurations. Optical modeling, using the same techniques for the results of FIG. 3, show quantitative agreement.

The results in this example demonstrate that camera systems with tunable hemispherical detector arrays can provide adjustable zoom with wide angle field of view, low aberrations, using only a simple, single-component, tunable plano-convex lens. The key to this outcome is an ability to match the detector geometry to a variable Petzval surface. This type of design could complement traditional approaches, particularly for applications where compound lens systems necessary for planar or fixed detectors add unwanted size, weight or cost to the overall system; night vision cameras and endoscopes represent examples. Although the fill factor and total pixel count in the reported designs are moderate, there is no fundamental limitation in the system to prevent use of higher pixel counts and fill factors. The pneumatic control strategy illustrated in this example for the lens and the optical array represents one of several actuation mechanisms. As explained herein, other actuation systems are compatible such as mechanical actuators that apply a direct radial force to the deformable substrate or lens, force at a distance actuation (e.g., magnetism-based), electroactive or piezoelectric actuation. Although the exemplified design in this example incorporates two separate pumps and manual z-axis positioning, a single actuator can instead adjust both lens and detector, and their separation, simultaneously, in a coordinated fashion. Other approaches include microactuators embedded directly on the elastomer, providing a class of hybrid hard/soft MEMS device.

Fabrication of Silicon Photodetector Arrays on Elastomeric Membranes: The detector arrays are made by doping a sheet of silicon in a configuration designed for pairs of photodiodes and blocking diodes in a 16×16 square matrix. In particular, the top layer of an SOI wafer (1.25 µm thick silicon on a 400 nm thick layer of silicon dioxide on a silicon substrate, p-type, <100> direction, Soitec) is p- and n-doped sequentially through a masking layer of silicon dioxide (900 nm thick) deposited by plasma enhanced chemical vapor deposition (PECVD; SLR730, Unaxis/Plasma-Therm) and patterned by photolithography and etching. For p-doping, the sample is exposed to a boron source for 30 min at 1000° C. in a $N_2$ environment (custom 6 inch tube furnace). n-doping used a phosphorous source under the same conditions for 10 min (Model 8500 Dual-Stack Diffusion/Oxidation Furnaces, Lindberg/Tempress). Each unit cell is then isolated by reactive ion etching (RIE; Unaxis/Plasma-Therm) through the silicon layer in a patterned defined by photolithography. Interconnects comprise metal lines (Cr (5 nm)/Au (150 nm)) deposited by sputtering (AJA International, Inc) and encapsulated with polyimide (~1 µm, from polyamic acid solution, Sigma Aldrich) on top and bottom. Just prior to transfer, the buried silicon dioxide was removed by wet etching (30 min, HF 49%) through an array of holes (3 µm in diameter) etched through the silicon.

A stamp of (poly)dimethylsiloxane (PDMS; SYLGARD 184 Silicone elastomer kit, Dow corning) is used to transfer the resulting photodetector array to thin (e.g., about 0.4 mm) membrane of PDMS pre-exposed to ultraviolet induced ozone for 2.5 min. Before peeling back the stamp, the entire assembly is baked at 70° C. for 10 min to increase the strength of bonding between the array and the membrane.

Completing the Tunable Detector System. The membrane supporting the detector array is cut into a circular shape (49 mm in diameter), and then placed on a machined plate with a hole (13 mm or 15 mm in diameter) at the center. A cylindrical chamber, with volume of 3.5 ml, is then attached to the bottom of this plate. The membrane is mechanically squeezed at the edges to form a seal and, at the same time, to yield slight radial tensioning, through the action of structures on the plate designed for this purpose. The bottom chamber has two inlets, one of which connects to a stop cock (Luer-lock polycarbonate stop cocks, McMaster-Carr), and the other to a custom syringe pump capable of controlling the volume of liquid moving in and out of the camber with a precision of ~0.05 ml. Distilled water fills the system. A gauge (diaphragm gauge 0~3 psi, Noshok) was used to monitor the pressure.

For electrical connection, the top insulating layers covering the electrode pads at the periphery of the detector array were removed by RIE (CS 1701 Reactive Ion Etching system, Nordson MARCH) through an elastomeric shadow mask. These electrodes press against copper electrode pins on a mounting plate designed with four cantilever springs at its corners. To ensure good electrical contact, the surfaces of the pins were polished and then coated with metal layers by electron beam deposition (Cr (20 nm)/Au (400 nm)). Each electrode pin was connected to an electrical wire using conductive epoxy (CW2400, Chemtronics); these wires were assembled with a pin connector which connects to a ribbon cable.

Fabricating the Tunable Lens: The tunable lens comprises a thin PDMS membrane (0.2 mm in thickness, 25.4 mm in diameter) and a glass window (12.5 mm in diameter, 1.5 mm in thickness, Edmund Optics), attached to a plastic supporting piece by epoxy (ITW Devcon). The separation between the PDMS membrane and the glass window is ~1 mm. To ensure a water-tight seal, the membrane is squeezed between two plastic plates. A hole in the top plate defines the diameter of the lens (9 mm). Gauges (Diaphragm gauge 0~10 psi, Noshok, differential gauge 0~20 psi, Orange Research) are used to measure the pressure.

Capturing Images: Diffusive light from an array of light emitting diodes (MB-BL4×4, metaphase technologies) provided a source for illumination. The objects consisted of printed transparency films (laser photoplotting, CAD/Art Services) or metal plates machined by laser cutting. In all cases, images were collected by combining data sets collected by stepping the detector along two orthogonal axes x, y normal to the optic axis. Either 10 or 20 steps with spacing of 92 µm for each axis were used, to achieve effective resolutions of 100 times larger than the number of photodetectors. Lookup tables and automated computer codes were used, in some cases, to eliminate the effects of malfunctioning pixels.

Example 2: Array of optical components having adjustable curvature. This example provides information on fabricating and transferring an array of optical components, including the photodetector array of Example 1. Further discussion is provided for the pneumatic tuning system and electrical connection hardware, techniques for determining the surface geometry and pixel positions, the mechanical analysis and evaluation of the tunable lens and the imaging process.

Figure 5:
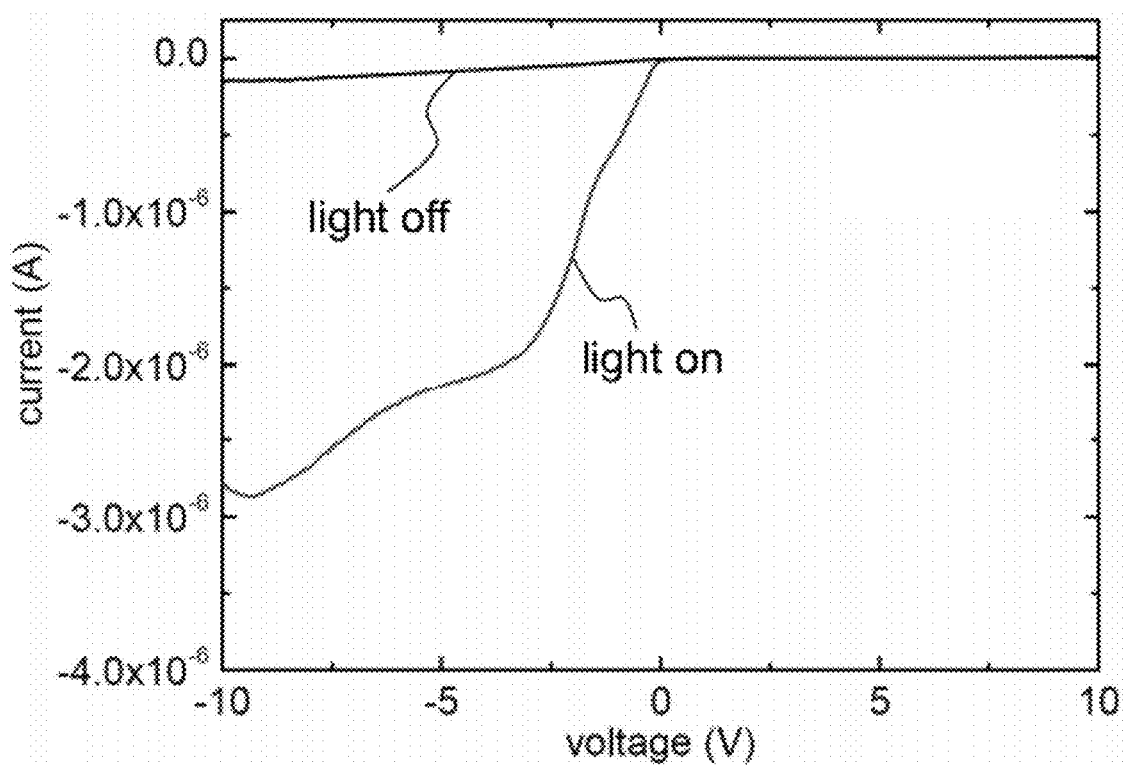
FIG. 5 Representative current-voltage response of a pixel at the center of the array, with a light on and off.

Fabrication Process of Photodetector Array and I-V Characteristics: The steps for fabricating the photodetector array generally follow procedures previously reported(1), although the specific designs of this example are adapted to allow tunable mechanics and improved performance in the photodetectors. For the latter, the major changes are in the use of the solid source doping, both for p and n type, to replace the use of spin-on-dopants. The response of a representative individual pixel appears in the FIG. 5. Detailed fabrication procedures are provided in TABLE 2.

Figure 6:
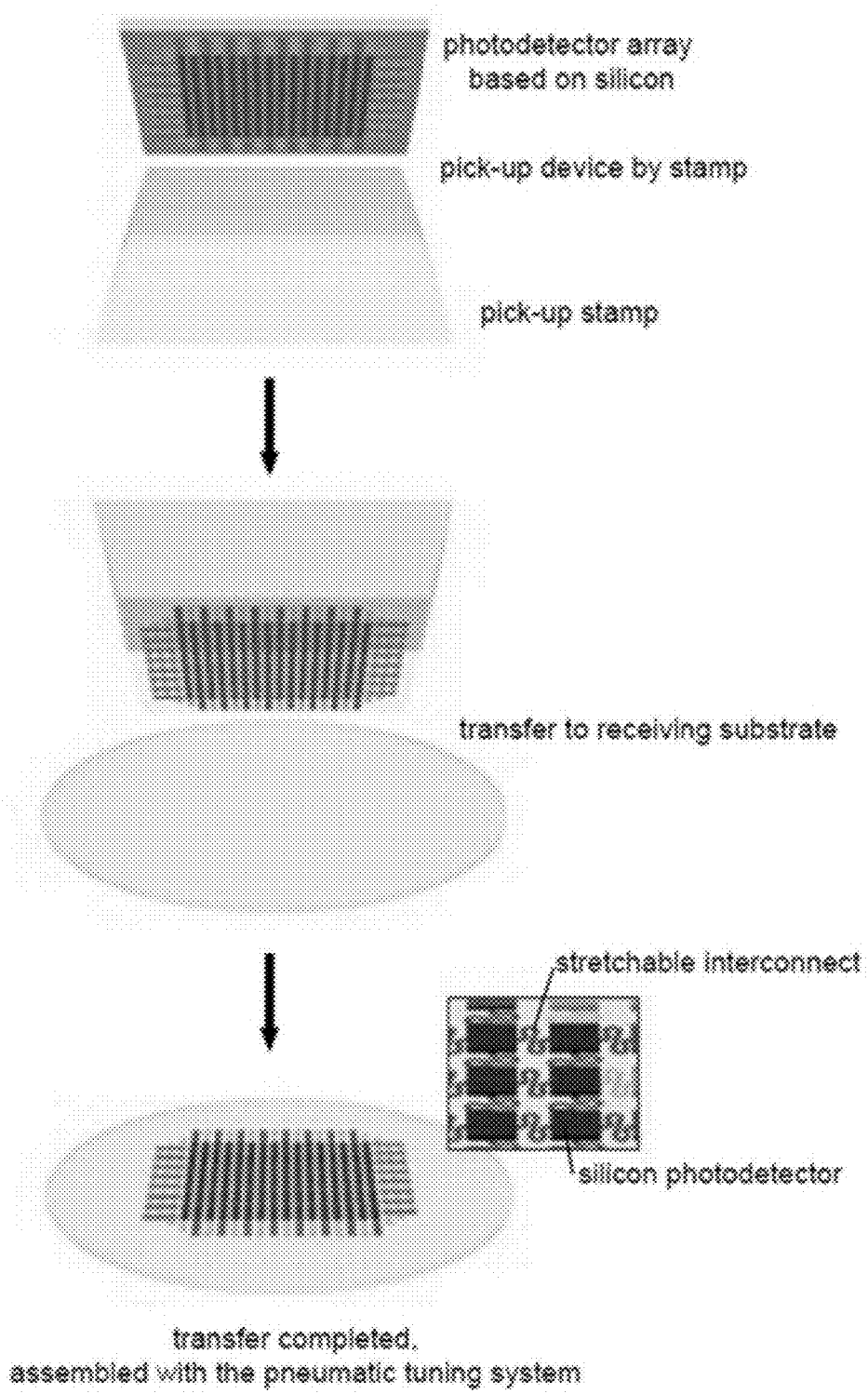
FIG. 6 Schematic illustration of steps for transferring photodetectors array onto PDMS membrane substrate.

Method for Transferring Device Array and Completing Camera: In general, the transfer procedure followed methods reported previously(2). FIG. 6 illustrates each step. For transfer, we manually control the speed of releasing the flat PDMS stamp at each stage. The device array is first lifted onto a flat PDMS stamp, by fast retraction from the fabricated silicon source substrate. (~0.1 sec) Then, the device array is transferred to a thin PDMS membrane. In this case, the flat PDMS stamp is slowly removed (~10 sec). The transfer process is mostly successful owing to higher bonding force between silicon surface (device bottom) and PDMS than the force between polyimide (device top) and PDMS.(3) To ensure perfect transfer, the target PDMS substrate is treated with ultraviolet induced ozone and baked at 70° C. Detailed procedures are in TABLE 3.

Figure 7A:
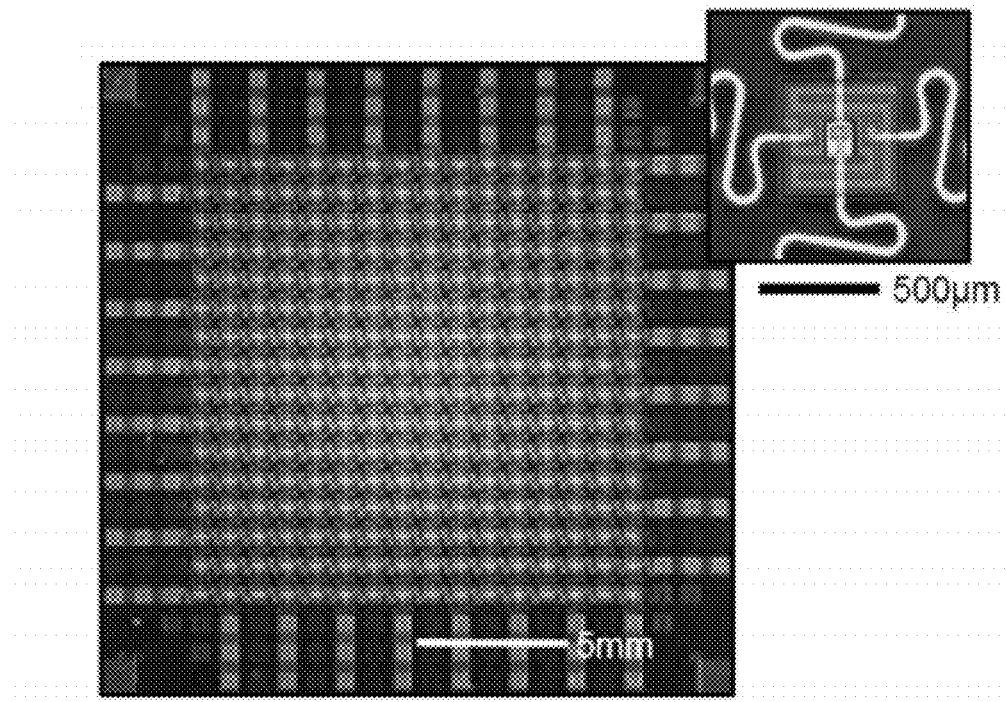
FIG. 7A Photograph of a photodetector/diode array before transfer on a planar surface. Optical microscope image of single photodetector (inset).
Figure 7B:
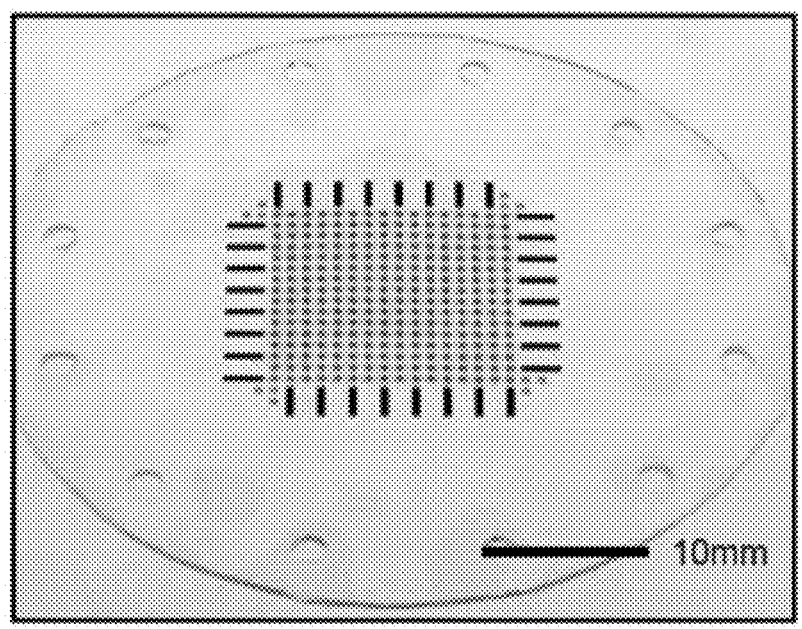
FIG. 7B Transferred photodetector array on PDMS membrane substrate.
Figure 8:
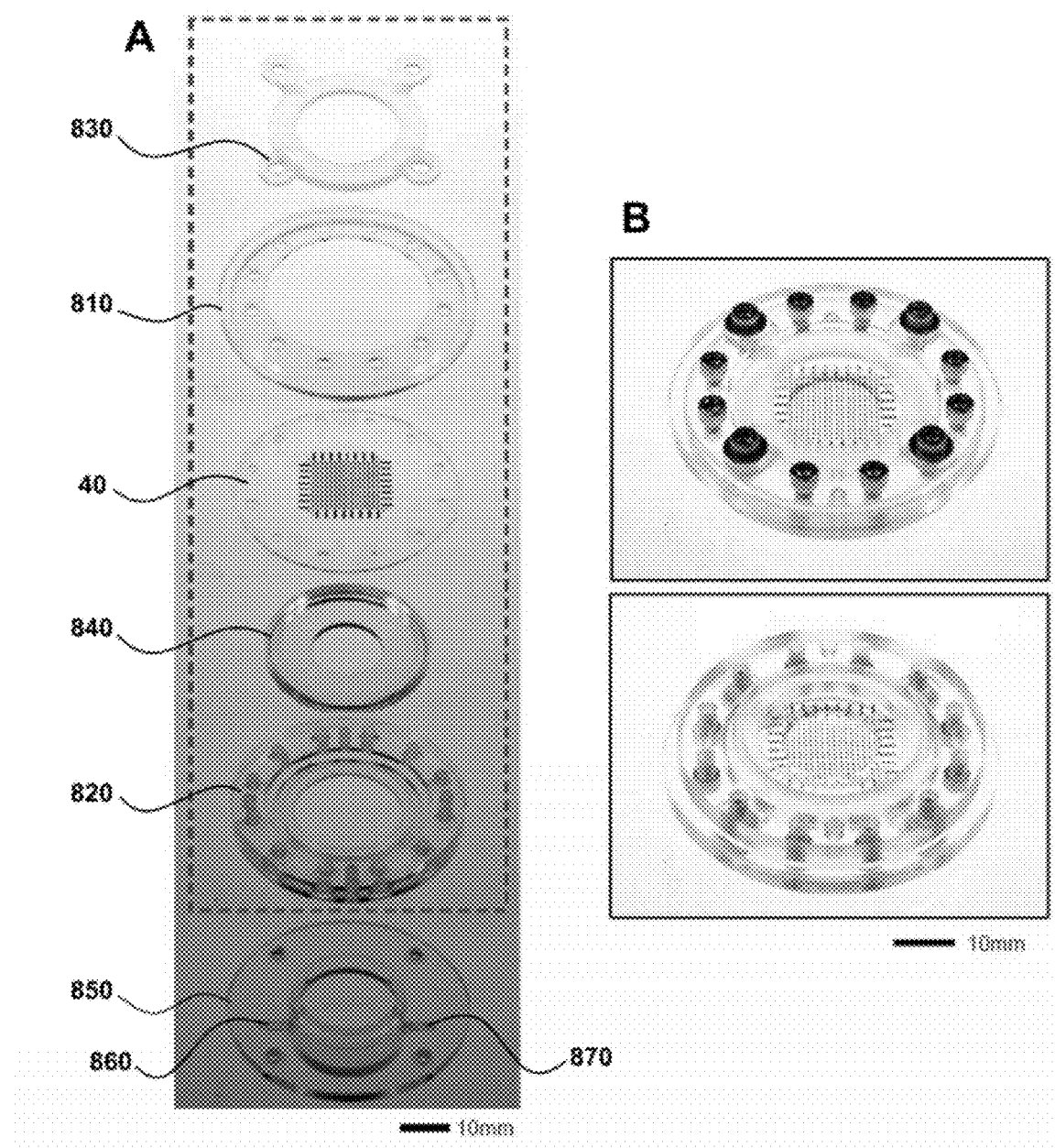
FIG. 8 (A) Photograph of elements for completing a fluidic deformation system. (B) Top down view of the cover assembly for the fluidic deformation system, which is composed of components in the dashed rectangle in the left figure (upper), bottom up view of the cover assembly (lower).
Figure 9:
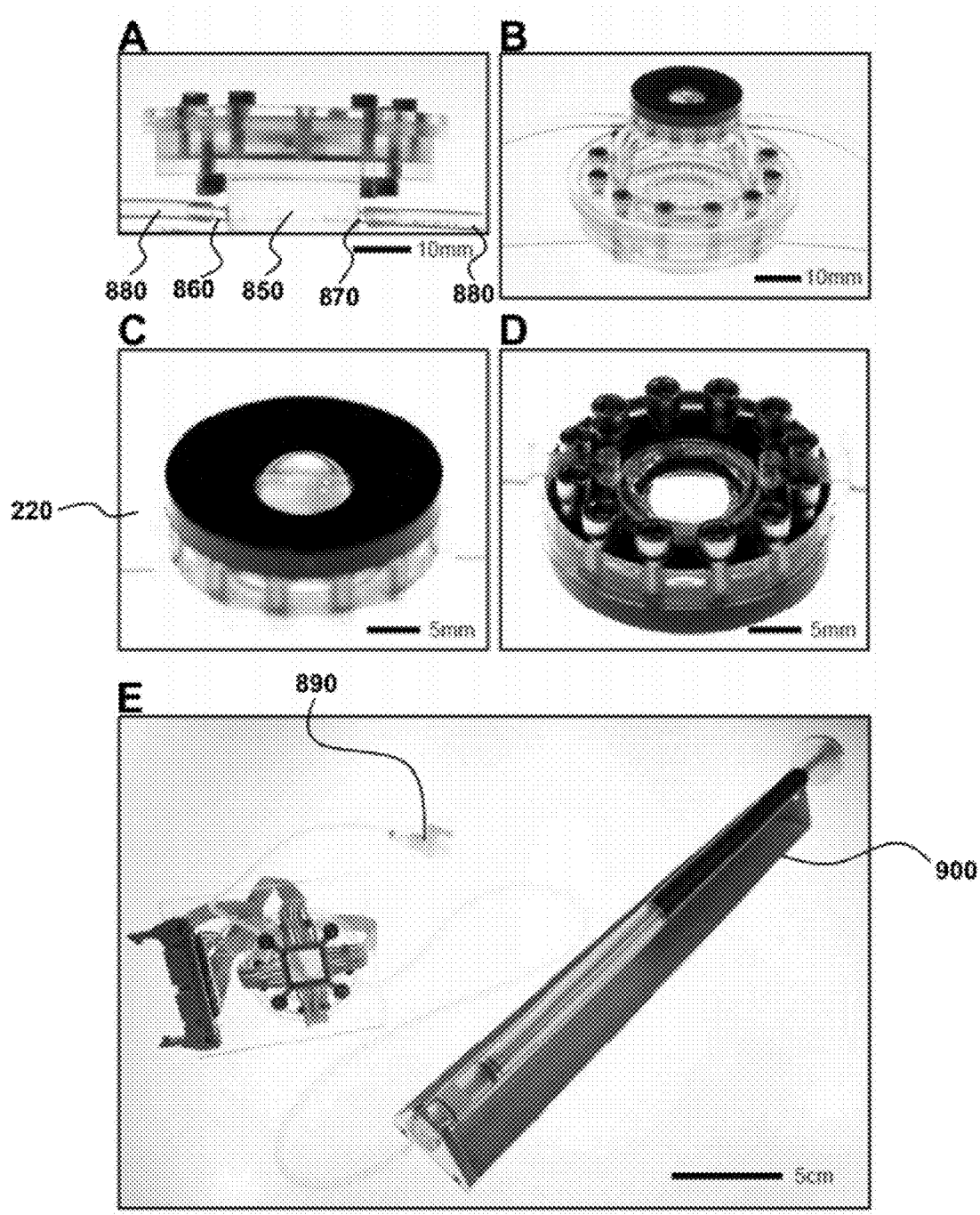
FIG. 9 (A) The side view of the tunable detector connected with in/out tubes. (B) Photograph of a system with the tunable lens positioned above the tunable detector. (C) The top-down view of the tunable lens. (D) The bottom-up view of the tunable lens. (E) The completed camera connected to a custom made syringe.

Method for Tuning the Lens and the Detector Surface Geometry: FIG. 7A shows a fabricated silicon-based photodetector array before transfer and FIG. 7B shows the transferred device array on a circular PDMS membrane. This PDMS membrane served as a substrate and also as a component for sealing the pneumatic tuning system. The fixture for securably holding the array is made from several components, shown in FIG. 8A. To ensure reliable sealing, the PDMS membrane 40 is squeezed by the upper 810 and the lower 820 covers. Although the system is effectively sealed by this design, the membrane is significantly deformed by compression. As a result, additional components are designed to stretch the deformed membrane, to ensure a flat surface, such as pre-strain element 830. This results in 2~3% of pre-strain, $\epsilon_0$. The opening hole element 840 is used to control the size and shape of deformation. FIG. 8B shows the assembled device array with the pneumatic tuning system. This assembly is connected with the fluidic chamber (the lowest part 850 in FIG. 8A). This fluidic chamber has two liquid input/output ports (860, 870). As in FIG. 9A, these ports are connected to tubing and to either a stop cock 890 or a custom made syringe 900. These ports are used not only for applying pressure but also for releasing air/bubble entrapped in the system. The stop-cock is closed after air/bubble is released. For tunable fluidic lens, we used a liquid-core solid-cladding lens geometry(4-7) due its simplicity over liquid-core liquid-cladding designs(8-11). FIG. 9C, 9D show the tunable lens 220. As in this case with the tunable detector, the tunable lens also incorporates a deformable PDMS membrane. This membrane is squeezed to ensure sealing. In this case, a pre-straining element is not included in the design, partly because the membrane surface is deformed in its initial state. To measure the pressure inside of the tunable lens and the tunable detector system, a pressure gauge is connected through a t-connector. Several pressure gauges are used depending on range of pressure inside of systems. (diaphragm gauges 0~3 psi, 0~10 psi, Noshok, differential gauge 0~20 psi, Orange Research). Detailed step-by step procedures for completing the tunable detector system are in TABLE 4.

Method for Establishing Electrical Connection and Device Yield: Establishing reliable electrical connection between the device array and the external data acquisition system was a significant challenge for completing a working camera. In previous, static hemispherical camera designs, metal layers deposited through elastomeric shadow masks (1) or patterns of silver epoxy connected electrodes of the device array to those on a printed computer board(12, 13). However, these methods could not be applied to the tunable system due to significant deformation of PDMS substrate, particularly due to stress concentrations at the edges. A special fixture system which can make electrical contact with device on a flexible substrate by mechanical pressing was designed. FIG. 10A shows bottom-up view of the hardware which comprises 32 copper pin electrodes. These pins are designed to press against electrodes of device array using cantilever springs. (FIG. 10B, 10E) To reduce the contact resistance, the surfaces of electrode pins are polished and coated with metal layers (Cr/Au, 20 nm/400 nm). FIG. 10C, 10D show these 32 pins aligned and in contact with device electrodes. The inset shows more clearly that these electrode pins press against electrodes of device array. This hardware also stretches the membrane slightly to form a flat or substantially flat surface.

Figure 11:
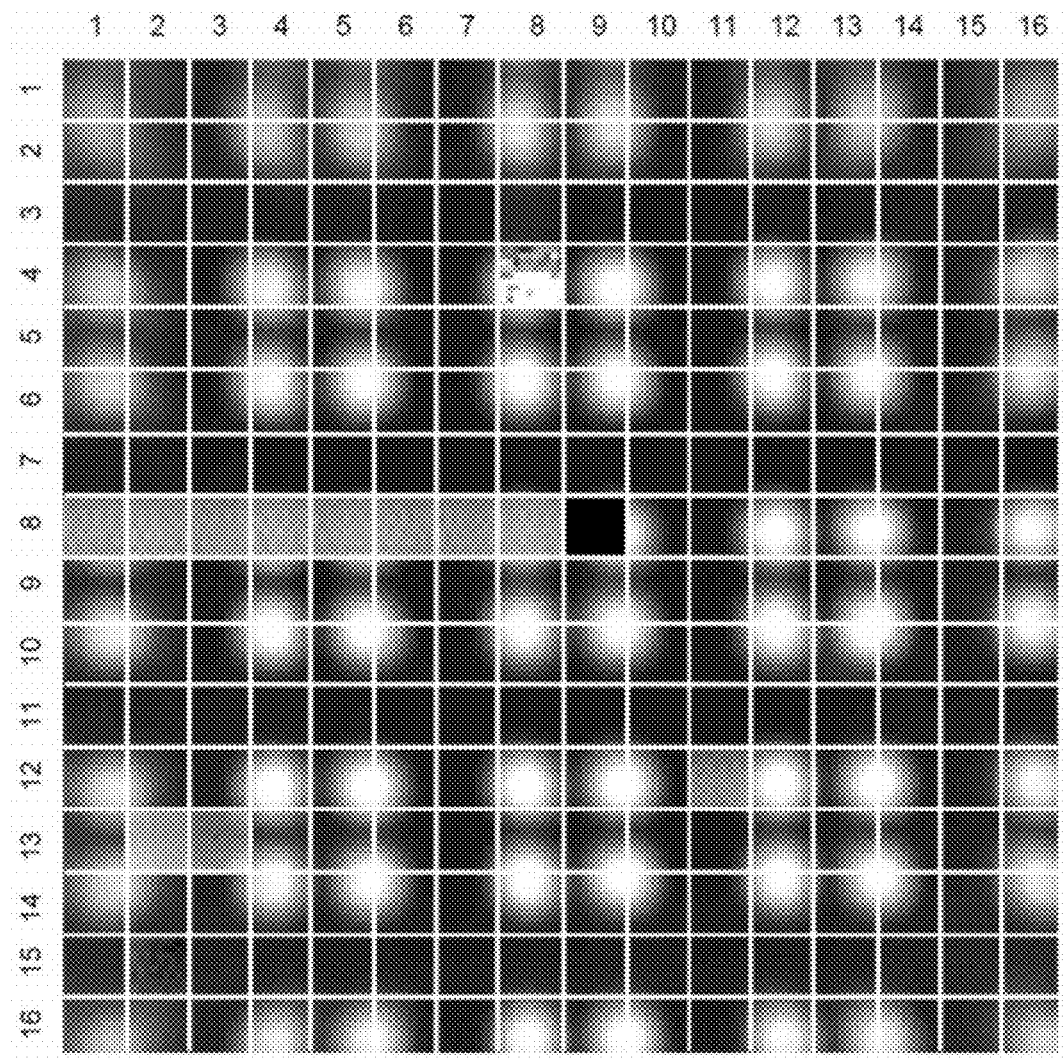
FIG. 11 Device yield of working camera used in the imaging experiments. In this experiment, a plano-convex lens (diameter of 9 mm and focal length of 22.8 mm, JML Optical Industries, Inc.) is used.
Figure 12:
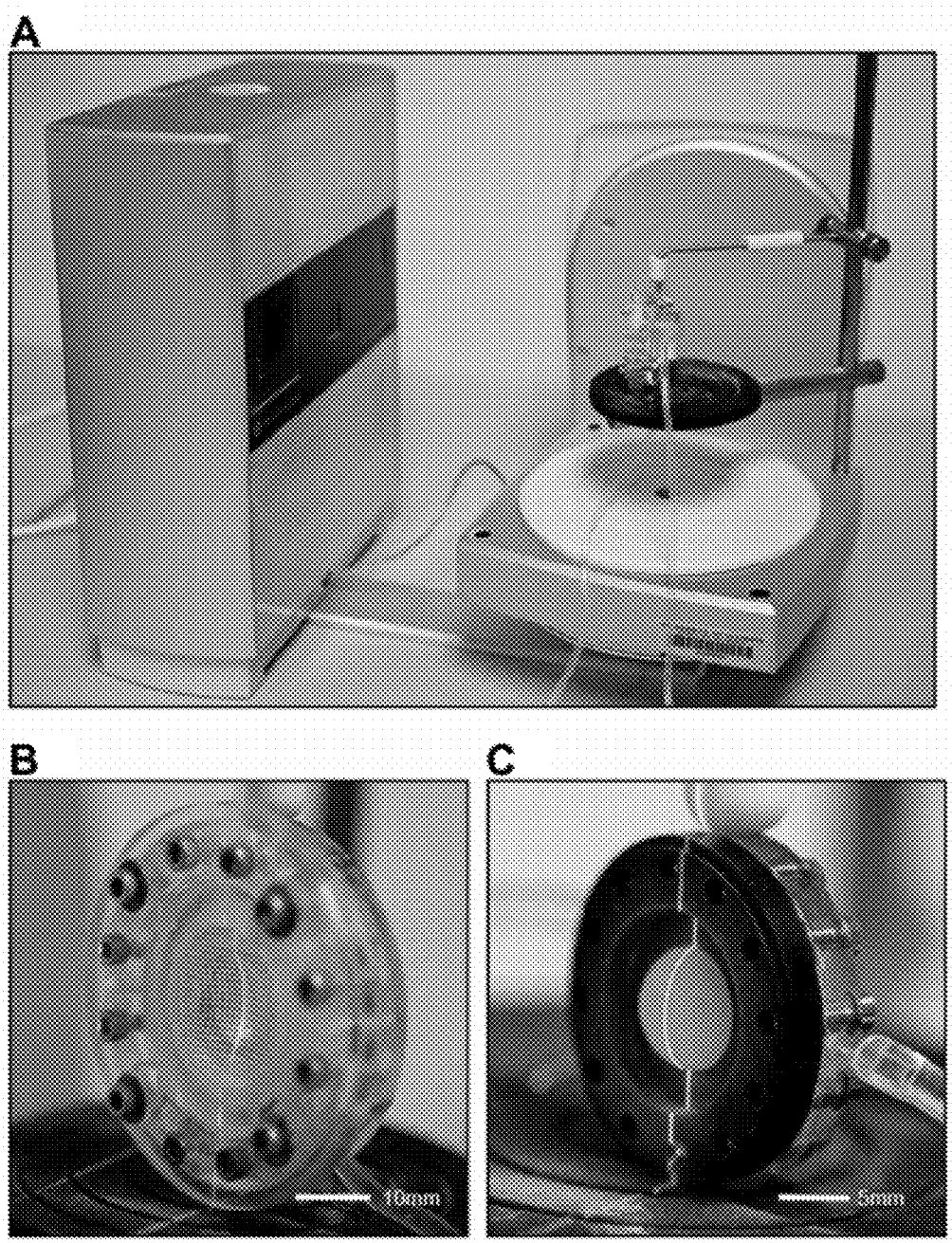
FIG. 12 (A) The 3D laser scanning system for measuring surface profile. (B) Scanning the tunable detector. (C) Scanning the tunable lens.

FIG. 10E shows that electrical wires are attached to electrode pins for further interface with the LABVIEW® data acquisition system(1). This electrical connection hardware made successful electrical contact over the entire 32 electrodes. FIG. 11 shows a test imaging result from the tunable detector imaging system using this electrical contact hardware. The result reveals that electrical contact is successfully made over all electrodes. (100% contact yields). However, it is observed that 11 pixels out of 256 pixels (95% pixel yields) are not working properly. In these cases, overscanning is used to eliminate the effects of defective pixel elements.

Figure 13A:
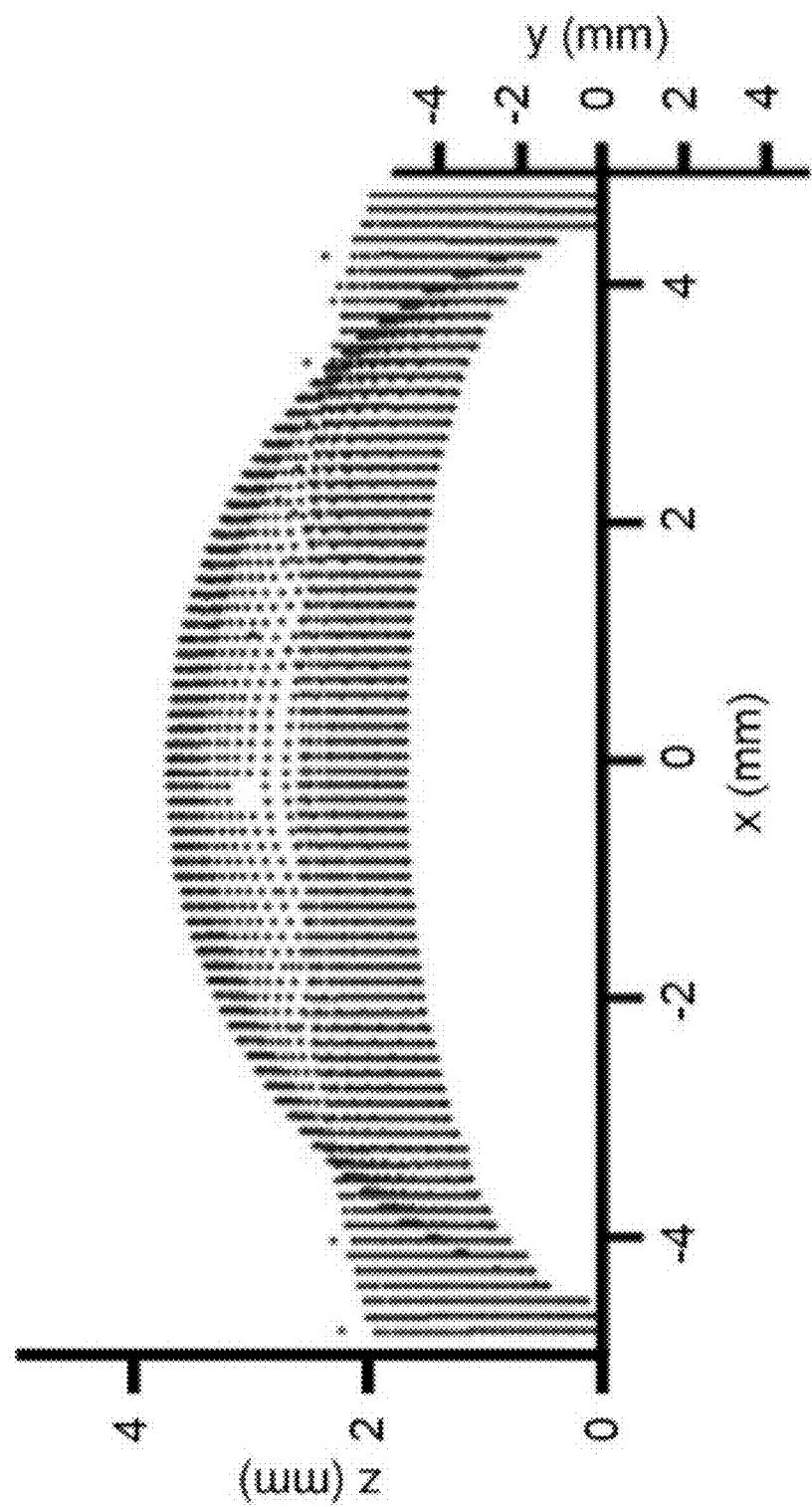
FIG. 13A Raw point data of deformed lens surface acquired by 3D scanner.
Figure 13B:
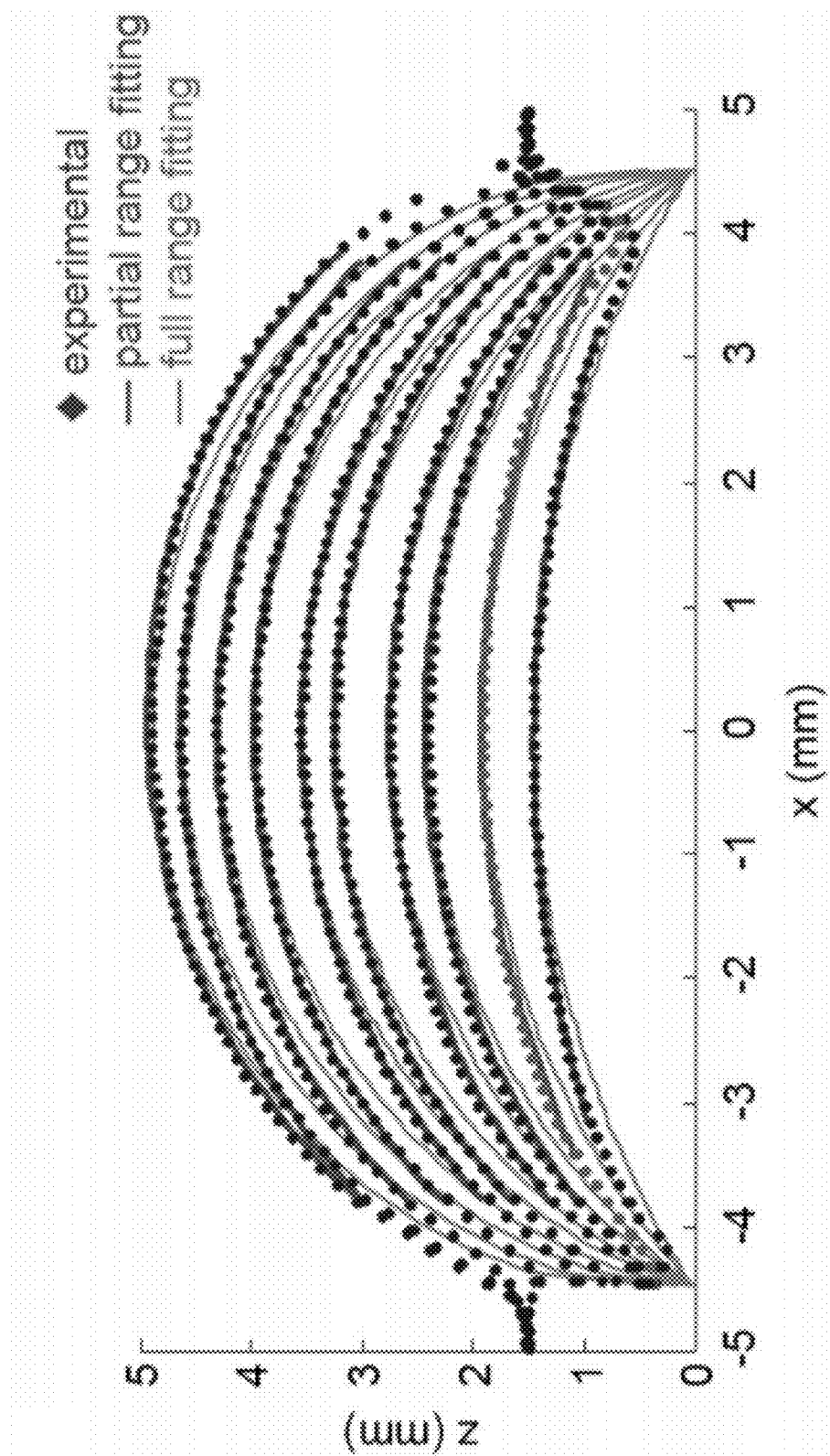
FIG. 13B Measured profiles and fitted curves of lens surface at various states of deformation.
Figure 13C:
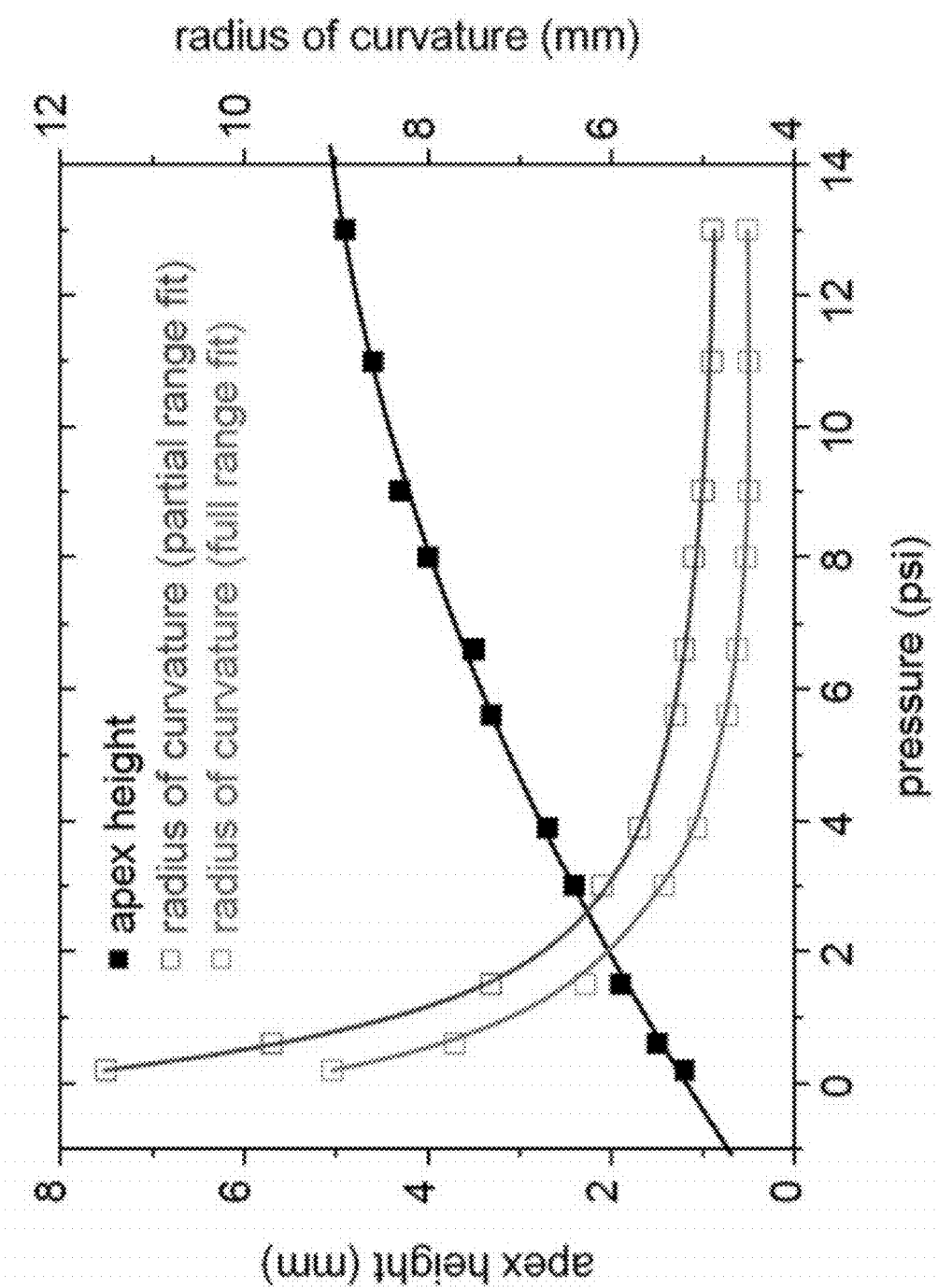
FIG. 13C The apex height and the radius of curvature as a function of pressure.

Determination of the Lens and the Detector Surface Geometry: A real time movie showing deformation of the detector deformable surface is available on the world-wide web at pnas.org/content/108/5/1788/suppl/DCSupplemental (corresponding to the supplemental content for "Dynamically tunable hemispherical electronic eye camera system with adjustable zoom capability." PNAS 108(5):1788-1793 (Feb. 1, 2011)). At several states of deformation, three dimensional geometries of the deformed surfaces were determined by 3D laser scanner. (Next Engine, The Imaging Technology Group, Beckman Institute for Advanced Science and Technology, University of Illinois at Urbana-Champaign). FIG. 12A shows this 3D laser scanning tool configured for measuring geometry of detector surface. FIG. 12B, C are close-up views of the tunable detector and the tunable lens which are being scanned. FIG. 13A shows three dimensional rendering of raw data of a deformed surface of the tunable lens. To determine the radius of curvature and the apex height of deformed surface, a MATLAB® code is used. FIG. 13B shows the center profile at several states of deformations. Although the lens profile around the apex fits well with a circle, the total profile is not perfectly matched with a circle. This is due to the deformation of PDMS membrane after initial installation, induced by squeezing. As a result, the radius of curvature is determined differently depending on the range of data for fitting (FIGS. 13B, 13C). However, the radius of curvature fitted from a partial range is used as the parameter of the lens, because the calculated focal distance agreed with the real measurement when this value is used as a parameter for ray-tracing calculation.

The geometry of detector surface can be determined similarly. FIG. 14A shows raw data from the deformed detector surface. Whereas lens surfaces can be fitted to a circle around the apex, detector surfaces are fitted with a circle over the entire deformed surface. (See FIG. 2C). This is due to the pre-straining element which is designed to stretch the PDMS membrane after installation. (See FIG. 8A.) To determine the pixel position, a top-down view of device array obtained at the same deformation state is used. From this picture, x, y pixel positions are determined using AutoCad®. Then, the height information is obtained by projecting onto the deformed surface (FIG. 14B). FIG. 14D shows determined pixel positions overdrawn on the projected top-down view. Determined positions also match with the analytically calculated positions. (FIG. 14E)

Mechanics of the Tunable Lens: The PDMS membrane of thickness t=0.2 mm in the tunable lens is confined by an open hole (of diameter D=9 mm) on a water chamber. Water injection into the chamber induces a pressure difference p between the two surfaces of PDMS, which deforms the PDMS membrane to a large strain (>40%). Since PDMS is nearly incompressible and displays nonlinear material behavior under large strain(14), it can be represented by the Yeoh hyperelastic material model with the elastic energy density function given by(15)

$$U = \sum_{n=1}^{3} C_n (I_1 - 3)^n, \quad [1]$$

where $C_n$ are material constants, $I_1 = \lambda_1^2 + \lambda_2^2 + \lambda_3^2$ is the first invariant of the left Cauchy-Green deformation tensor, and $\lambda_i$ are the principal stretches which satisfy $\lambda_1 \lambda_2 \lambda_3 = 1$ due to incompressibility.

For uniaxial tension, $\lambda_1 = 1 + \epsilon \equiv \lambda$, which gives $\lambda_2 = \lambda_3 = 1/\sqrt{\lambda}$, $I_1 = \lambda^2 + 2/\lambda$, and stress $$\sigma = 2\left(\lambda^2 - \frac{1}{\lambda}\right)[C_1 + 2C_2(I_1 - 3) + 3C_3(I_1 - 3)^2]. \quad [2]$$

For PDMS (sylgard 184), the uniaxial tensile stress-strain data(14) give $$C_1 = 0.285 \text{ MPa}, C_2 = 0.015 \text{ MPa}, C_3 = 0.019 \text{ MPa}. \quad [3]$$

The shape of the lens after water injection depends on its deflection.

Figure 15:
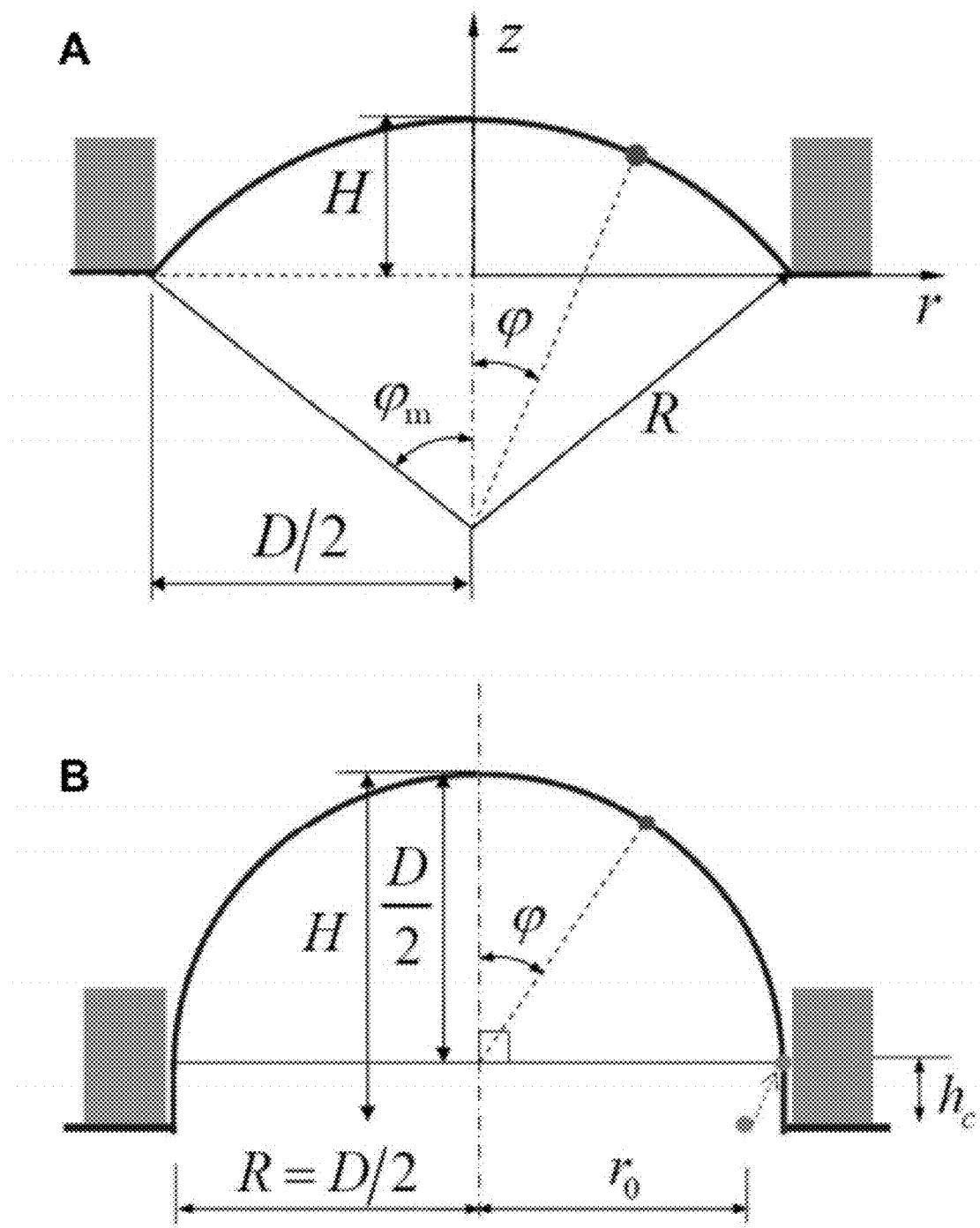
FIG. 15 (A) The lens deforms to be a spherical cap for deflection H≤D/2. (B) For deflection H>D/2, the lens surface has contact with the sidewall of the top plate. Its deformed shape consists of a full hemisphere and a short cylinder.

(1) For H≤D/2, the lens deforms to a spherical cap, as shown in FIG. 15A. The spherical radius and polar angle are $$R = \frac{D^2 + 4H^2}{8H}, \quad \varphi_{max} = \sin^{-1} \frac{D}{2R} \quad [4]$$

For a point initially at (r,θ,0) in cylindrical coordinates, its polar angle on the deformed surface is $$\varphi = \frac{2r}{D} \varphi_{max}.$$

The principle stretches are $$\lambda_1 = \frac{2R\varphi_{max}}{D}, \lambda_2 = \frac{R \sin \varphi}{r}, \lambda_3 = \frac{1}{\lambda_1 \lambda_2} = \frac{Dr}{2R^2 \varphi_{max} \sin \varphi}. \quad [5]$$

The elastic strain energy is obtained as $$U_e = 2\pi t \int_0^{D/2} \sum_{n=1}^{3} C_n (I_1 - 3)^n r \, dr. \quad [6]$$

The work done by the pressure is $$W = pV = \frac{\pi}{3} pH^2 (3R - H), \quad [7]$$

where $V = \pi H^2 (3R - H)/3$ is the volume of the spherical cap.

(2) For H>D/2, the spherical cap becomes a full hemisphere of radius $$\frac{D}{2}$$

and polar angle $$\frac{\pi}{2},$$

i.e., $$R = \frac{D}{2}, \varphi_{max} = \frac{\pi}{2}. \quad [8]$$

The deformed surface is composed of the hemisphere and a cylinder of height $h_c = H - D/2$ that is in contact with the vertical surface of the hole, as shown in FIG. 15B. Neglecting the friction between the PDMS and the vertical surface of the hole gives the uniform axial strain in the cylindrical part of PDMS, which also equals to the meridional strain in the hemisphere. Therefore the point separating the hemispherical and cylindrical parts has the radial coordinate $$r_0 = \frac{\pi D^2}{2(\pi - 2)D + 8H} \quad [9]$$

in the initial cylindrical coordinates $(r, \theta, 0)$. The corresponding polar angle of the point is $$\varphi = \frac{\pi r}{2 r_0}.$$

The principle stretches for $r \leq r_0$ are $$\lambda_1^{sphere} = \frac{(\pi - 2)D + 4H}{2D}, \quad [10]$$

$$\lambda_2^{sphere} = \frac{D \sin\varphi}{2r},$$

$$\lambda_3^{sphere} = \frac{4r}{[(\pi - 2)D + 4H]\sin\varphi}.$$

The principle stretches for $r \geq r_0$ are $$\lambda_1^{contact} = \frac{(\pi - 2)D + 4H}{2D}, \quad [11]$$

$$\lambda_2^{contact} = \frac{D}{2r},$$

$$\lambda_3^{contact} = \frac{4r}{(\pi - 2)D + 4H}.$$

The elastic strain energy is obtained as $$U_e = \quad [12]$$

$$2\pi t \int_0^{r_0} \sum_{n=1}^{3} C_n (I_1^{sphere} - 3)^n r \, dr + 2\pi t \int_{r_0}^{D/2} \sum_{n=1}^{3} C_n (I_1^{contact} - 3)^n r \, dr.$$

The work done by the pressure is $$W = pV = \frac{1}{24}\pi D^2 (6H - D) p, \quad [13]$$

where $$V = \frac{1}{24}\pi D^2 (6H - D)$$

is the volume enveloped by the deformed PDMS.

The principle of minimum potential energy gives $$p = \frac{\partial U_e}{\partial V}. \quad [14]$$

This gives analytically the relation between the pressure p and maximum deflection H.

Figure 16:
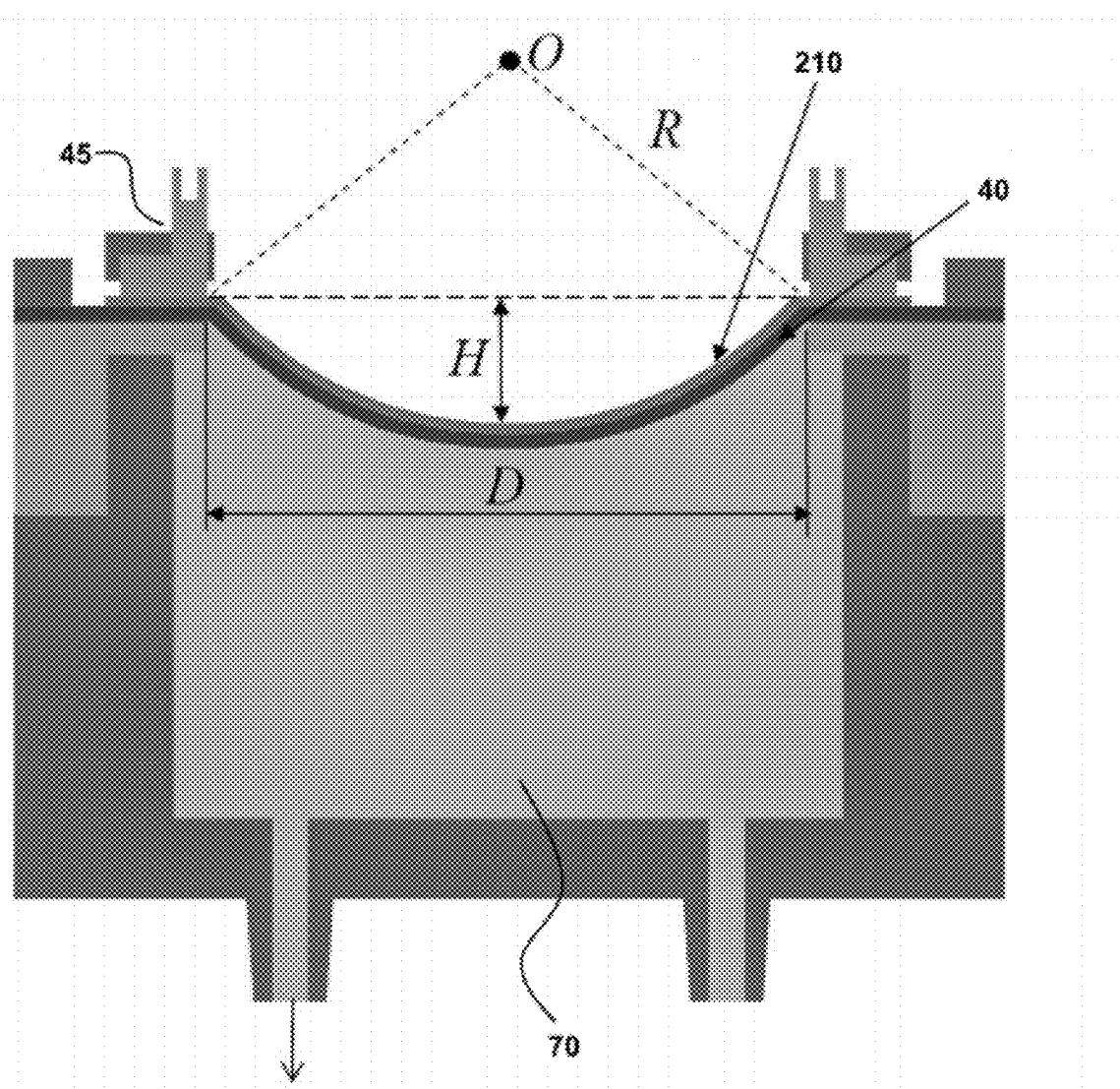
FIG. 16 Schematic illustration of the deformation of photodetector surface due to water extraction.
Figure 17:
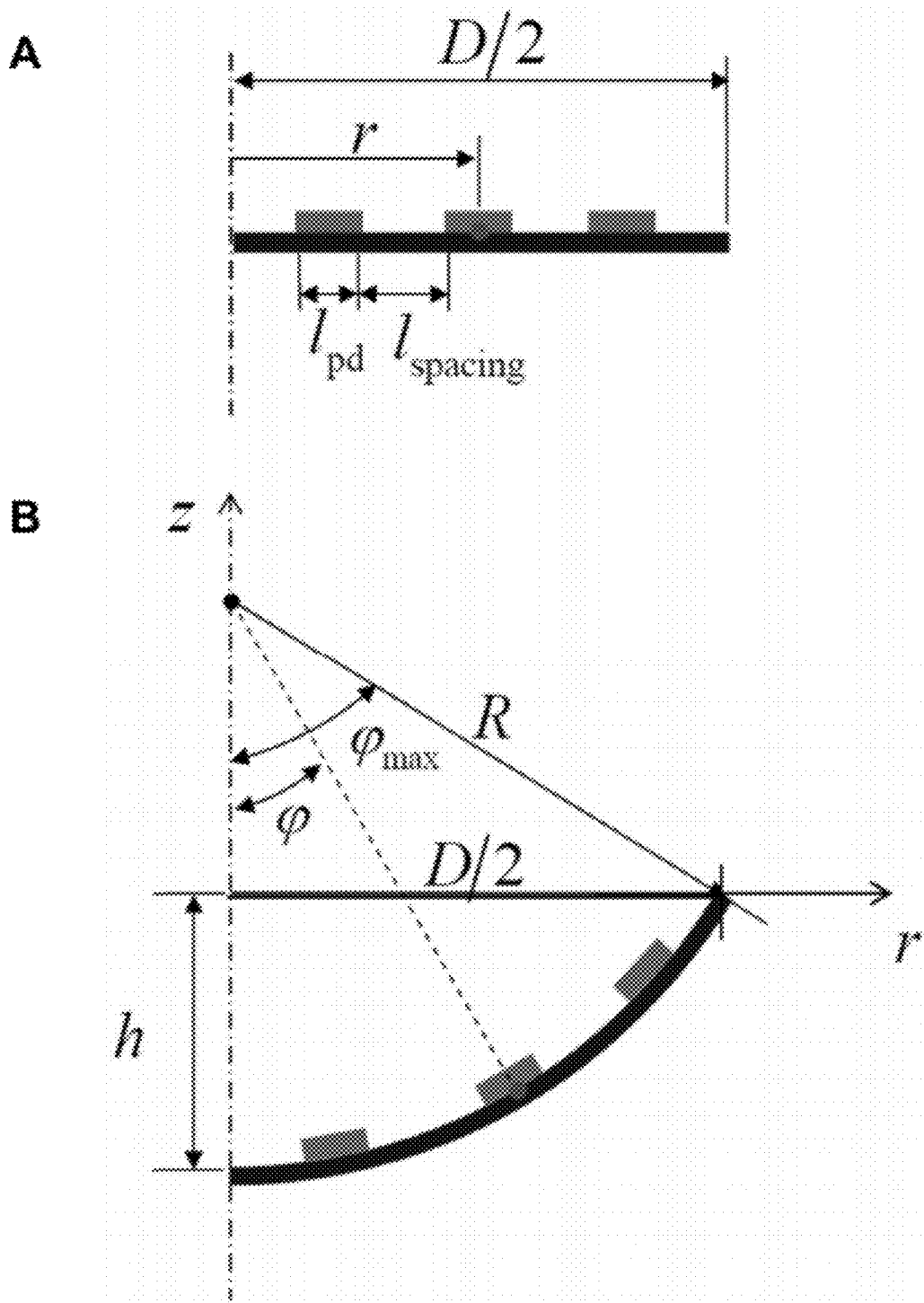
FIG. 17 (A) Schematic illustration of photodetectors on undeformed PDMS surface. (B) Schematic illustration of photodetectors on deformed PDMS surface.

Mechanics of the Tunable Photodetector Surface: As shown in FIG. 16, a flat PDMS membrane (of Young's modulus E and Poisson's ratio v) 40 with a square array of photodetectors 210 on its top surface is installed on a water chamber 70. The open hole (of diameter D) at the top of the chamber confines the deformation of PDMS membrane during water extraction. The photodetector has a square shape of size $l_{pd}$=0.5 mm, and the spacing between adjacent photodetectors is $l_{spacing}$=0.42 mm. The area fraction of photodetectors is $f = l_{pd}^2/(l_{pd} + l_{spacing})^2$. The position of each photodetector on the flat PDMS is expressed in cylindrical coordinates as $(r, \theta, z=0)$, as shown in FIG. 17A. The PDMS membrane deforms to a spherical cap of height H as water is extracted from the chamber (FIG. 17B). The radius of curvature is $$R = \frac{D^2 + 4H^2}{8H},$$

and polar angle $$\varphi_{max} = \sin^{-1}\frac{4DH}{D^2 + 4H^2}$$

(FIG. 17B). The hemispherical profile can be expressed analytically in the cylindrical coordinates as $r^2 + (z-R+H)^2 = R^2$, or equivalently $$r^2 + z^2 - \left(\frac{D^2}{4H} - H\right)z - \frac{D^2}{4} = 0.$$

Finite element analysis (FEA) is also used to study the deformation of PDMS membrane and to track the positions of photodetectors during water extraction. Since its deformation is negligible, the water chamber is modeled as a rigid part and is fixed during the simulation. The PDMS membrane (thickness 0.5 mm, Young's modulus 2 MPa and Poisson's ratio 0.48) is clamped 45 on the water chamber, and is modeled by continuum shell elements SC8R in the ABAQUS® finite element program, since its thickness is much larger than photodetectors. Each photodetector is composed of polyimide (thickness 2.4 µm, Young's modulus 2.5 GPa and Poisson's ratio 0.34) and Si (thickness 1.2 µm, Young's modulus 130 GPa and Poisson's ratio 0.27), and is modeled by (composite) shell elements S4R, since it's very thin and has a multilayer structure. Uniform pressure is applied on the PDMS surface to simulate its deformation due to water extraction.

Figure 18:
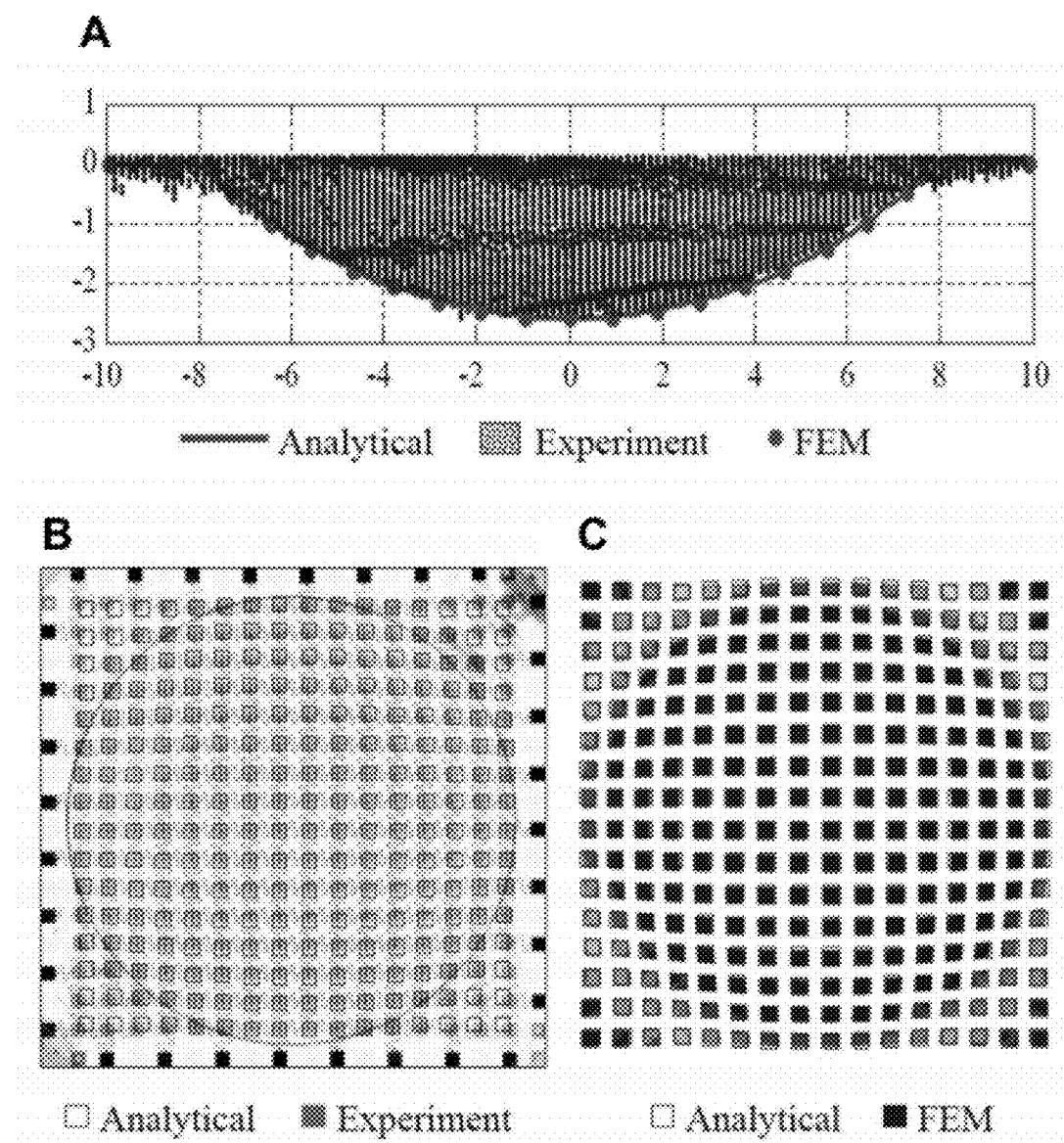
FIG. 18 (A) Deformed photodetector surface shape by analytical solution shows good agreement with experiment and finite element analysis for 2.69 mm deflection. The analytically given photodetector positions shows good agreement with experiment (B) and finite element analysis (C).

FIG. 18A shows that the hemispherical profile $$r^2 + z^2 - \left(\frac{D^2}{4H} - H\right)z - \frac{D^2}{4} = 0$$

agrees very well with the experimentally measured profile and that obtained by FEM without any parameter fitting. This validates the analytical model, and confirms that the PDMS membrane indeed deforms into a hemispherical shape.

The hemispherical shape implies that the meridional strain in the PDMS membrane is uniform. Since the radius $D/2$ of the PDMS membrane on the open hole is stretched to the arc length $R\varphi_{max}$, the photodetector initially at $(r,\theta,0)$ in cylindrical coordinates has the spherical angle $$\varphi = \frac{2r}{D}\varphi_{max}$$

on the hemisphere (FIG. 17B). The cylindrical coordinates of the photodetector after deformation are $(R \sin \phi, \theta, R-H-R \cos \phi)$, or equivalently, $$\left[\frac{D^2+4H^2}{8H}\sin\left(\frac{2r}{D}\sin^{-1}\frac{4DH}{D^2+4H^2}\right), \theta,\right.$$
$$\left.\frac{D^2-4H^2}{8H} - \frac{D^2+4H^2}{8H}\cos\left(\frac{2r}{D}\sin^{-1}\frac{4DH}{D^2+4H^2}\right)\right].$$

Figure 19:
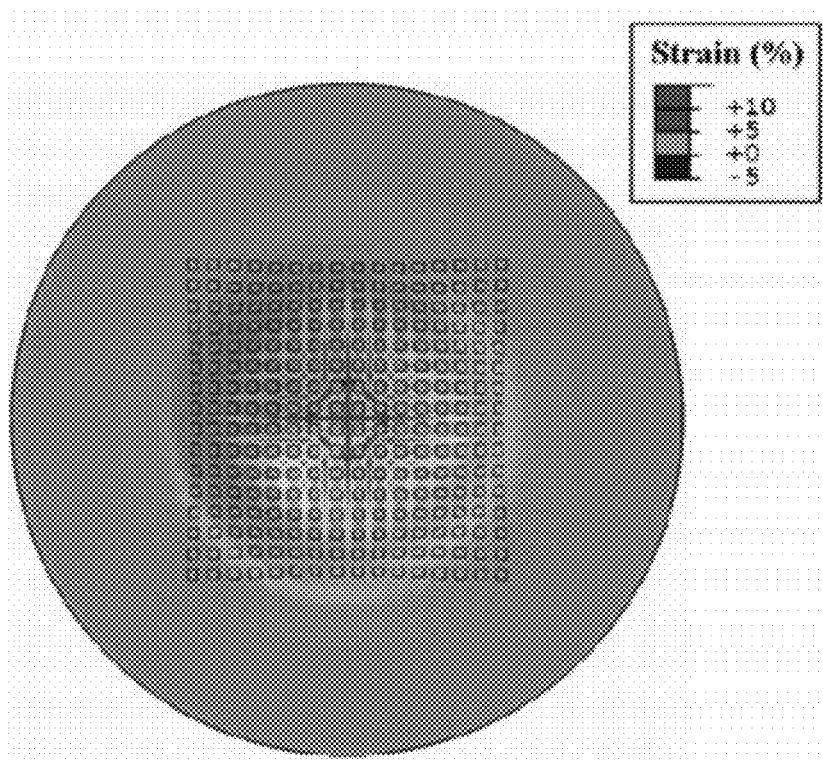
FIG. 19 Circumferential (A) and meridional (B) strain in PDMS membrane.
Figure 19:
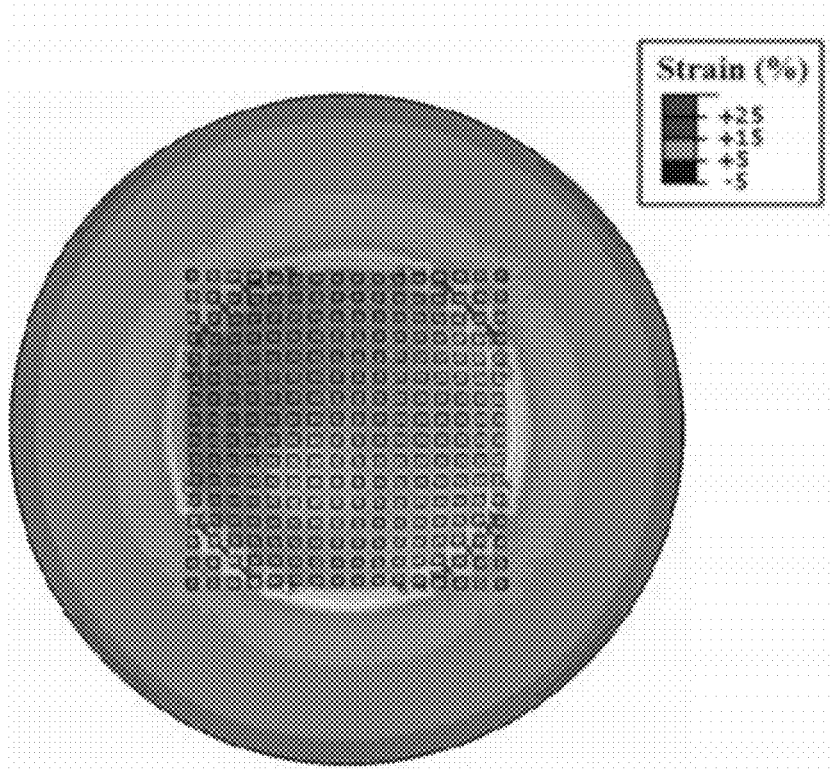

As shown in FIGS. 18B and C, the above analytical expression for photodetector position agrees very well with the experiment and FEM without any parameter fitting. This provides further validation of the analytical model. The calculated circumferential and meridional strains in PDMS membrane are shown in FIGS. 19A and B, respectively.

The deflection H can be obtained in terms of pressure p, using the same method as in the previous section. Linear elasticity is used due to small deformation of photodetector surface. Since silicon is several orders of magnitude more rigid than PDMS, the deformation of PDMS underneath photodetector is negligible. Therefore the circumferential strain and meridional strain are obtained as $$\varepsilon_\varphi = \frac{2R\varphi_{max} - D}{D\sqrt{1-f}} \text{ and } \varepsilon_\theta = \frac{R\sin\varphi - r}{r\sqrt{1-f}}.$$

The elastic strain energy is $$U_e = \frac{\pi t E}{1-v^2}\int_0^{D/2}(\varepsilon_\varphi^2 + \varepsilon_\theta^2 + 2v\varepsilon_\varphi\varepsilon_\theta)(1-f)r\,dr. \qquad [15]$$

The work done by the pressure is given by Eqs. 7. Then pressure p is given in terms of deflection H by Eqs. 14, or equivalently $H=H(p)$.

Figure 20:
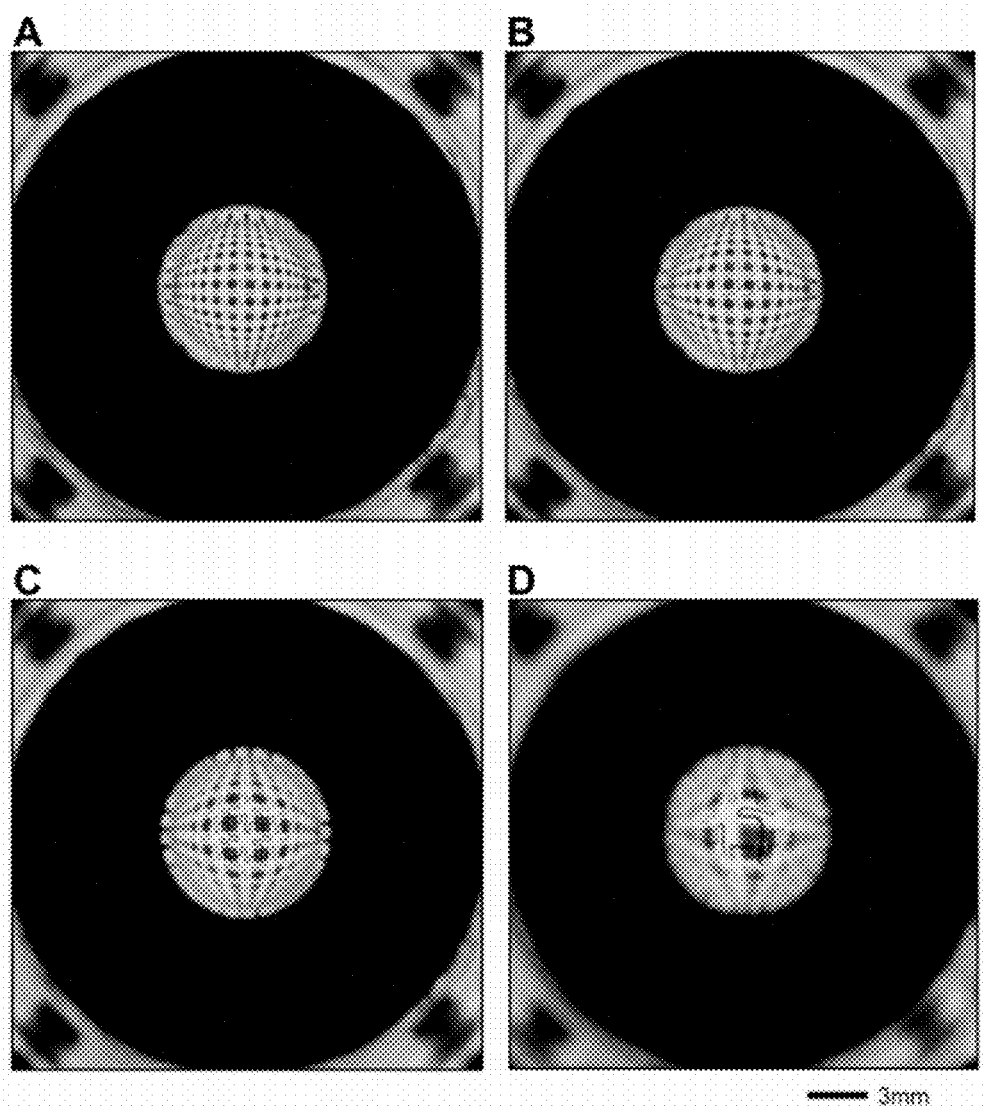
FIG. 20 Photographs of the tunable detector imaged through the tunable lens at four different lens geometries (radius of curvature of lens surface): (A) $R_L$=4.9 mm, (B) $R_L$=6.1 mm, (C) $R_L$=7.3 mm, (D) $R_L$=11.5 mm. The distance from the bottom of the lens to the bottom of the detector in this example is z=25.0 mm.
Figure 21A:
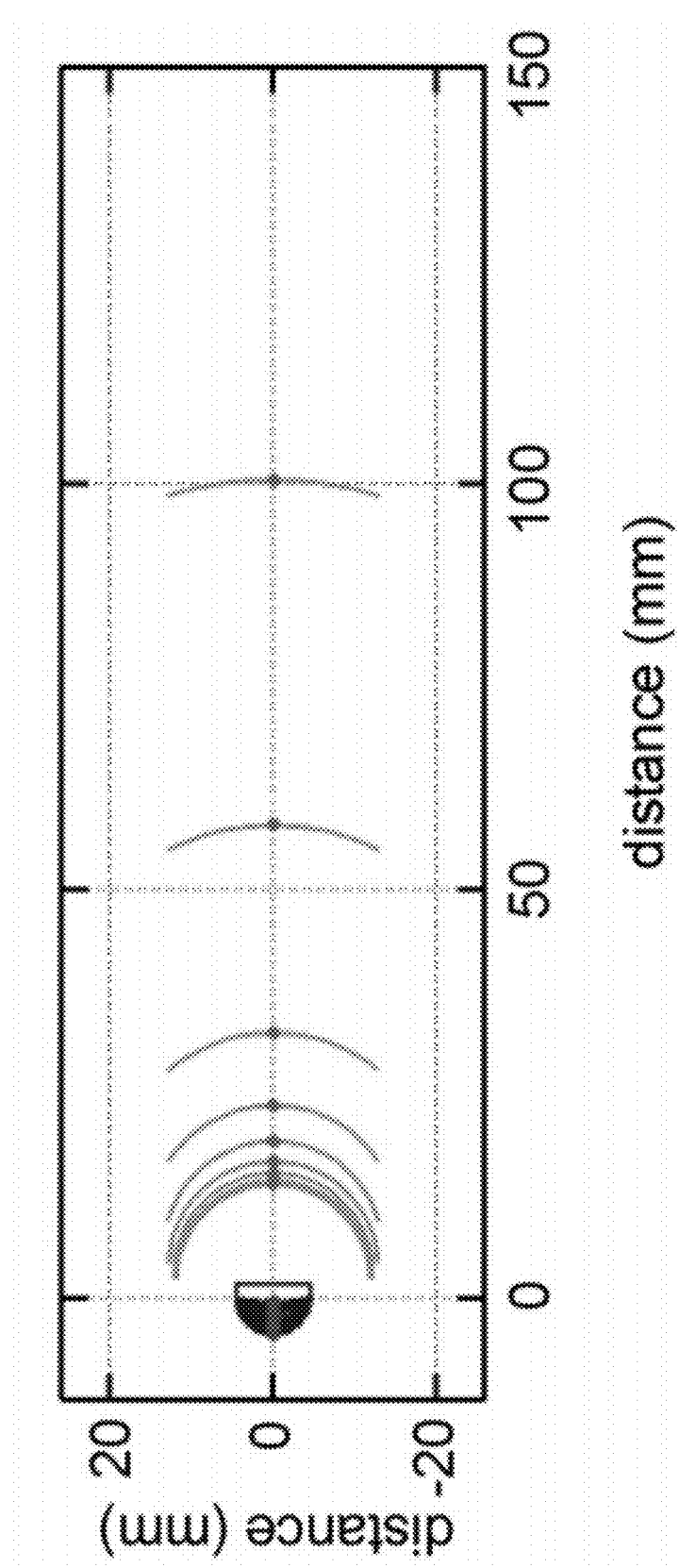
FIG. 21A The shapes of lens surfaces and corresponding detector surface shape and distance by raytracing calculation.
Figure 21B:
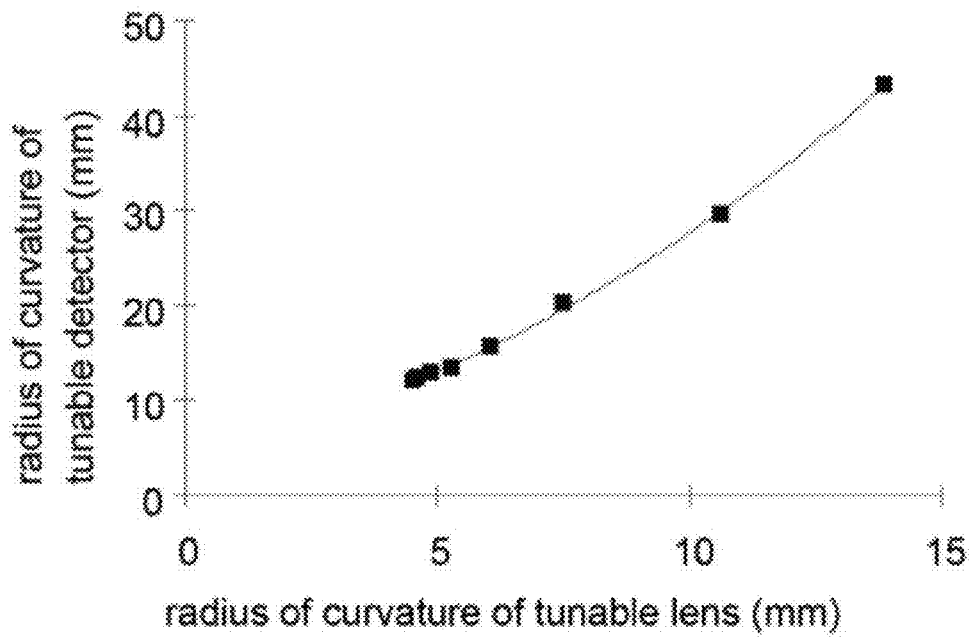
FIG. 21B Relation between radius of curvature of lens and radius of curvature of detector, FIG. 21C Relation between radius of curvature of lens and distances from lens.
Figure 21C:
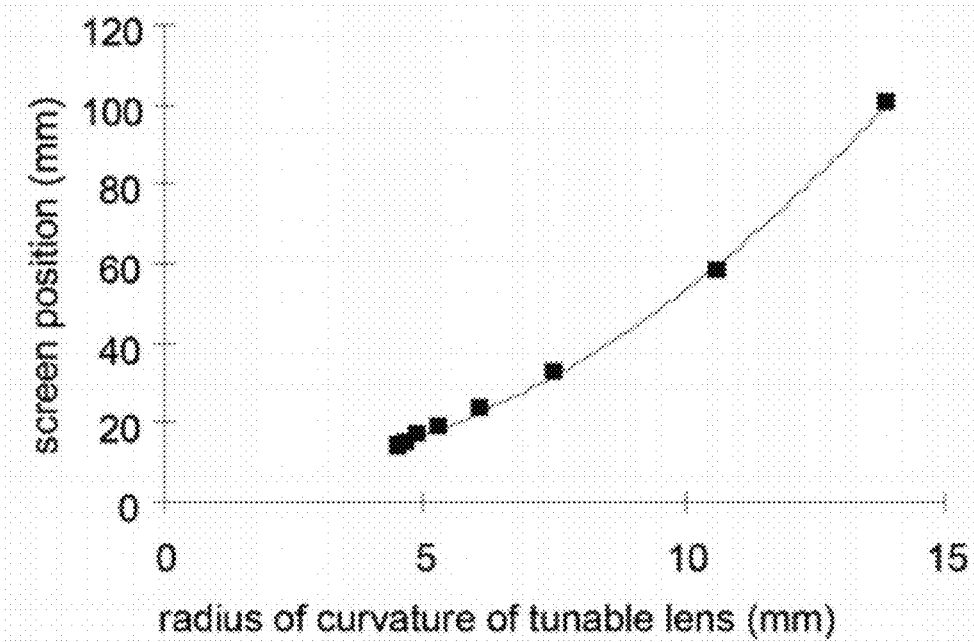
Figure 22:
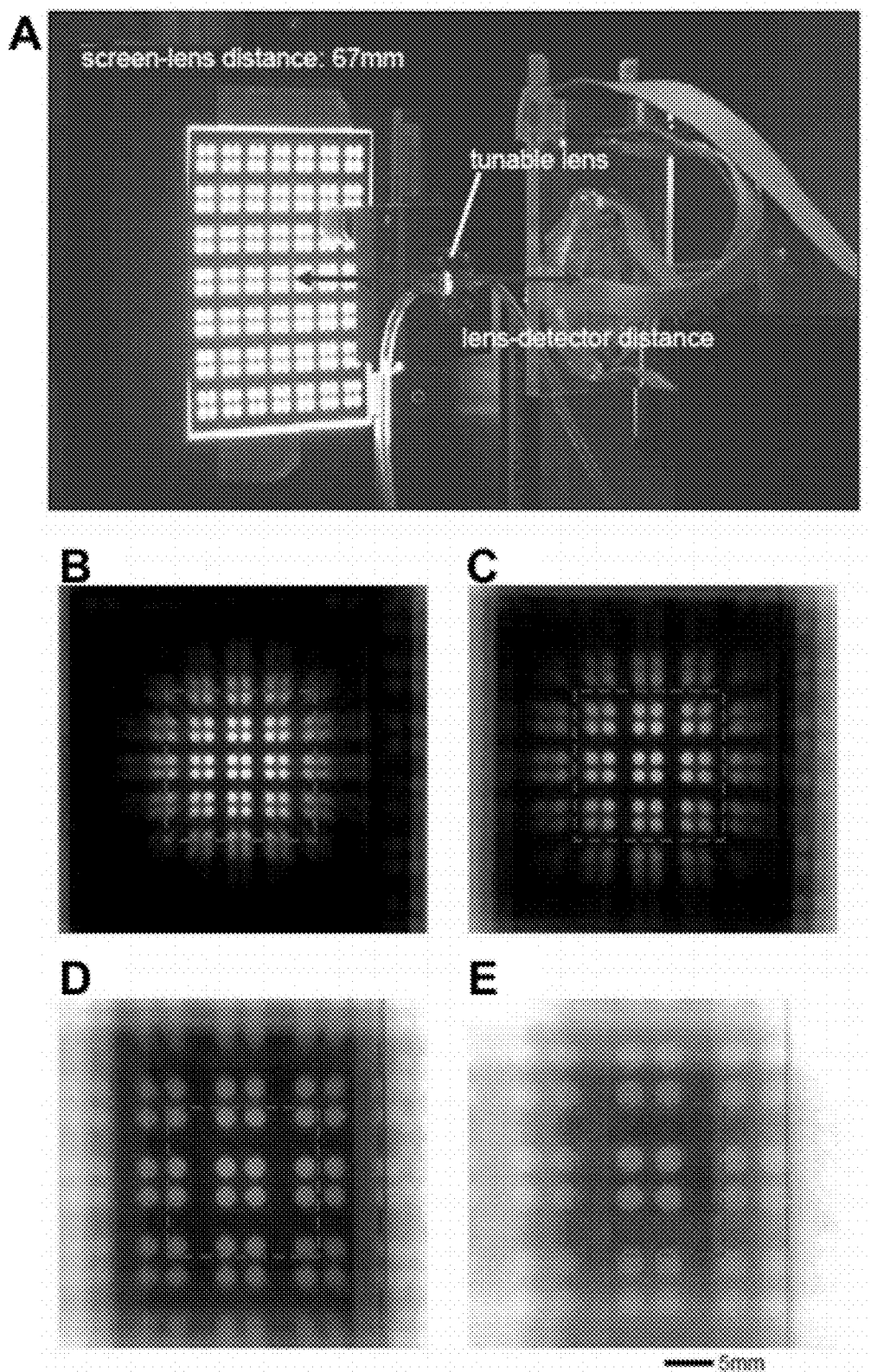
FIG. 22 (A) Photograph of the optical setup for image acquisition. (B)-(E) Photographs of image formed by tunable lens at a flat diffusive screen for different distance from the lens: (B) z=16 mm, radius of curvature of lens surface $R_L$=4.9 mm, (C) z=24 mm, $R_L$=6.1 mm, (D) z=38 mm, $R_L$=7.3 mm, (E) z=55 mm, $R_L$=11.5 mm.

Raytracing calculation and preliminary test of the tunable lens: Prior to imaging with the tunable detector, the tunable lens is tested by both experiment and ray-tracing calculation. First, the tunable lens is qualitatively tested by viewing detector surface through the lens at several states of the lens deformations. As shown in the FIG. 20, field of view and magnification change according to deformation of lens surface. The properties of the lens are more quantitatively studied by ray tracing calculation. (Optical Bench)(16, 17) Rays originating from on an object plane, which is 67 mm distant from the lens, pass through the lens and cross at points that define an imaging surface(13). By this method, the shape and the distance of detector surface can be determined at several states of lens deformation. (FIG. 21A) From this analysis, it is found out that the radius of curvature of the lens surface is proportional to the distance and the radius of curvature of detector surface. (FIG. 21B, 21C) This prediction is validated by real testing at an optical bench. FIG. 22A shows setup for the real imaging experiment with the tunable lens and the tunable detector. FIG. 22B, C, D, E show formed image on a flat diffusive screen at four different states of the lens deformation. These images are taken by a commercial digital camera at the back side of diffusive screen. (EOS-1Ds Mark III, Canon) Dashed lines show the actual size of the tunable detector. These flat screen images are off-focused at the periphery, which is obvious at the lowest magnification. (FIG. 22B)

Figure 23:
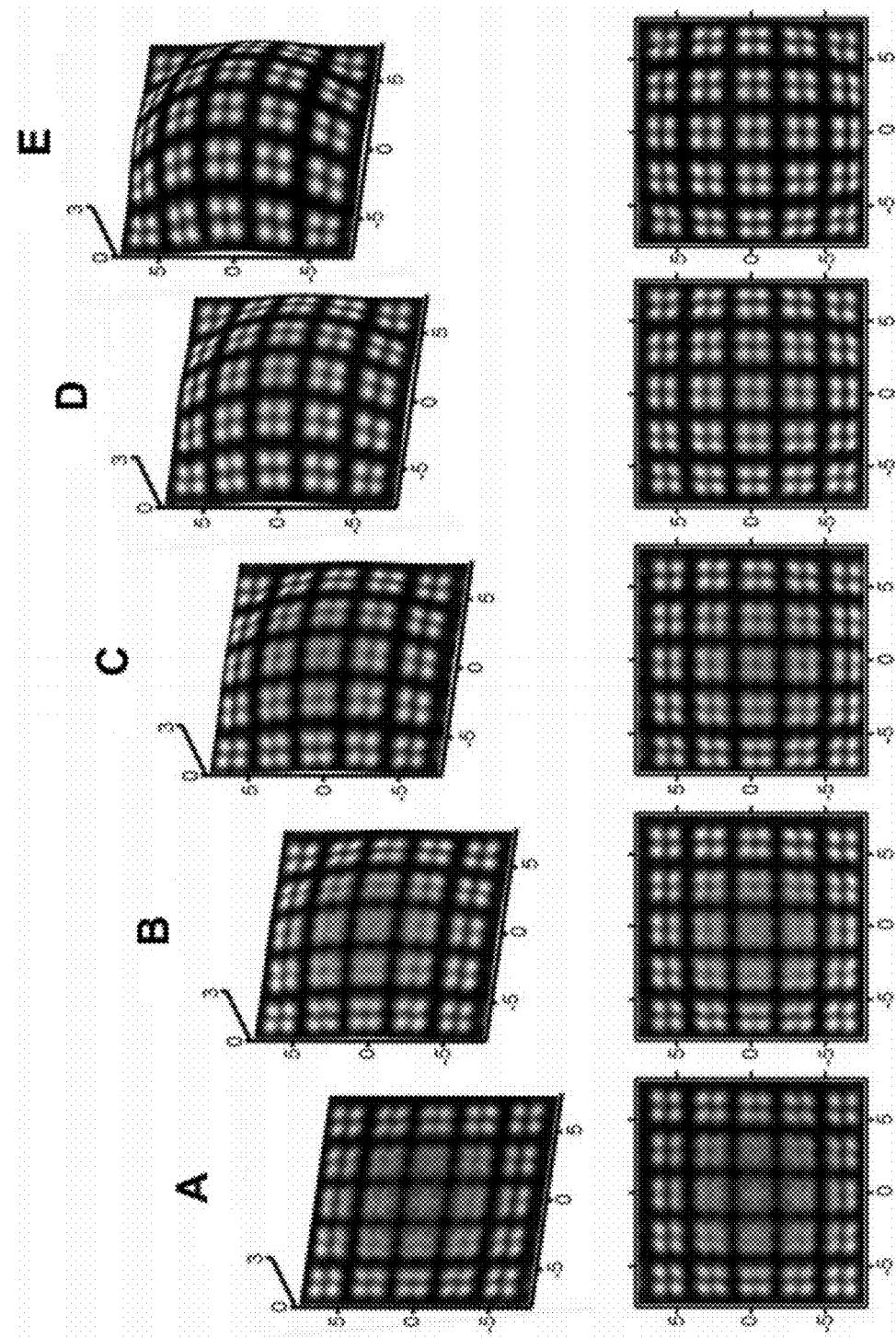
FIG. 23 Images acquired by the tunable detector at different deformations of detector surfaces: (A) flat detector surface, (B)-(E) various radius of curvature: (B) $R_D$=88.7 mm and the bottom depth $H_D$=0.4 mm, (C) $R_D$=42.0 mm, $H_D$=0.8 mm, (D) $R_D$=24.1 mm, $H_D$=1.4 mm, (E) $R_D$=16.2 mm, $H_D$=2.2 mm. The images in the bottom panel correspond to a straight-on view of the images of A-E.

Imaging Result: To demonstrate the operation of the tunable hemispherical imaging system, two types of imaging experiment are performed. One experiment shows focusing effects. In this experiment, a plano-convex lens (diameter of 9 mm and focal length of 22.8 mm, JML Optical Industries, Inc) is used. FIG. 23 show series of images at different deformation of detector surface placing in front of exact focal distance. As deformation of the detector become larger (e.g., $R_D$ decreases from A to E), the distance approaches the ideal focal distance, and images come into focus.

Figure 24:
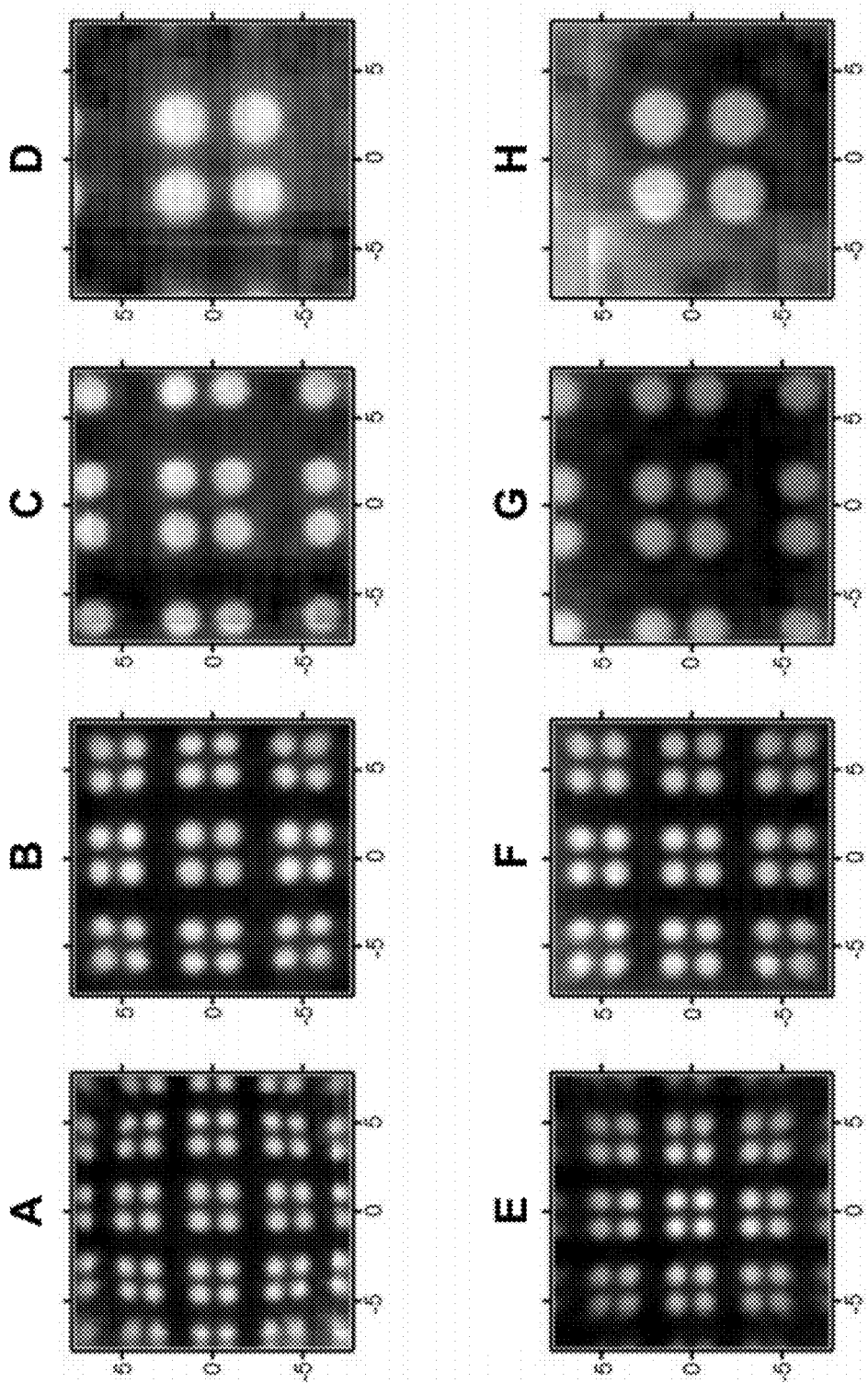
FIG. 24 Images acquired by the tunable detector and the tunable lens at four imaging conditions: distance from the lens (A) z=16 mm, radius of curvature of lens surface $R_L$=4.9 mm, radius of curvature of detector surface $R_D$=11.4 mm, (B) z=24 mm, $R_L$=6.1 mm, $R_D$=14.0 mm, (C) z=38 mm, $R_L$=7.3 mm, $R_D$=19.2 mm, (D) z=52 mm, $R_L$=11.5 mm, $R_D$=25.7 mm, (E) flat detector surface at the condition (A); (F) flat detector surface at the condition (B); (G) flat detector surface at the condition (C); (H) flat detector surface at the condition (D).
Figure 25:
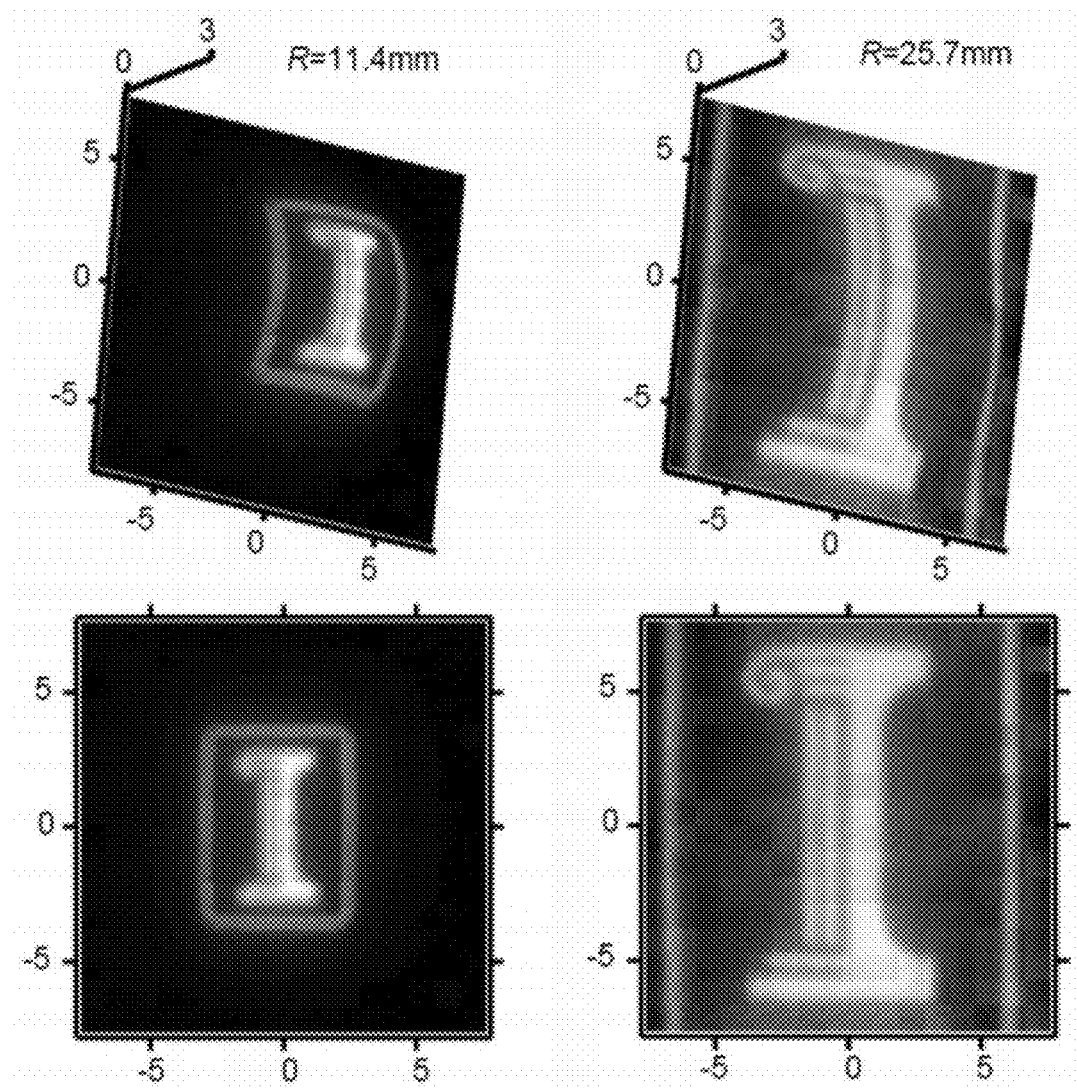
FIG. 25 Images of the University of Illinois 'I' logo acquired by the tunable detector and the tunable lens at different imaging conditions. The left- and right-hand images are taken at distances from the lens z=16 mm, 48 mm and radius of curvatures of lens surfaces $R_L$=4.9 mm, 9.7 mm and radius of curvatures of the detector surfaces $R_D$=11.4 mm, 25.7 mm (from left to right). Projected views of the each image are shown below. The distance between the lens and source image is 67 mm. The axis scales are in millimeters.

Another experiment involves the tunable lens in the imaging. As already known from the preliminary study of the tunable lens, the focal distance and the radius of curvature of the detector surface depend on the geometry of the lens. At each state of lens deformation, the detector surface is deformed to match with the radius of curvature from ray-tracing calculation. As a result, acquired images at this setup show uniform focus and intensity distribution. (FIG. 24A, B, C, D) For comparison, acquired images in the flat state are shown. (FIG. 24E, F, G, H) The clearest differences between the images from curved surface and flat surface can be found at the lowest magnification images. (FIG. 24A, E) This advantage of curved screens over flat screens agrees with the previously reported result(1, 13, 18). FIG. 25 shows I-logo imaged at two different magnification states. The right image shows three times higher optical magnification than the left image.

Figure 28:
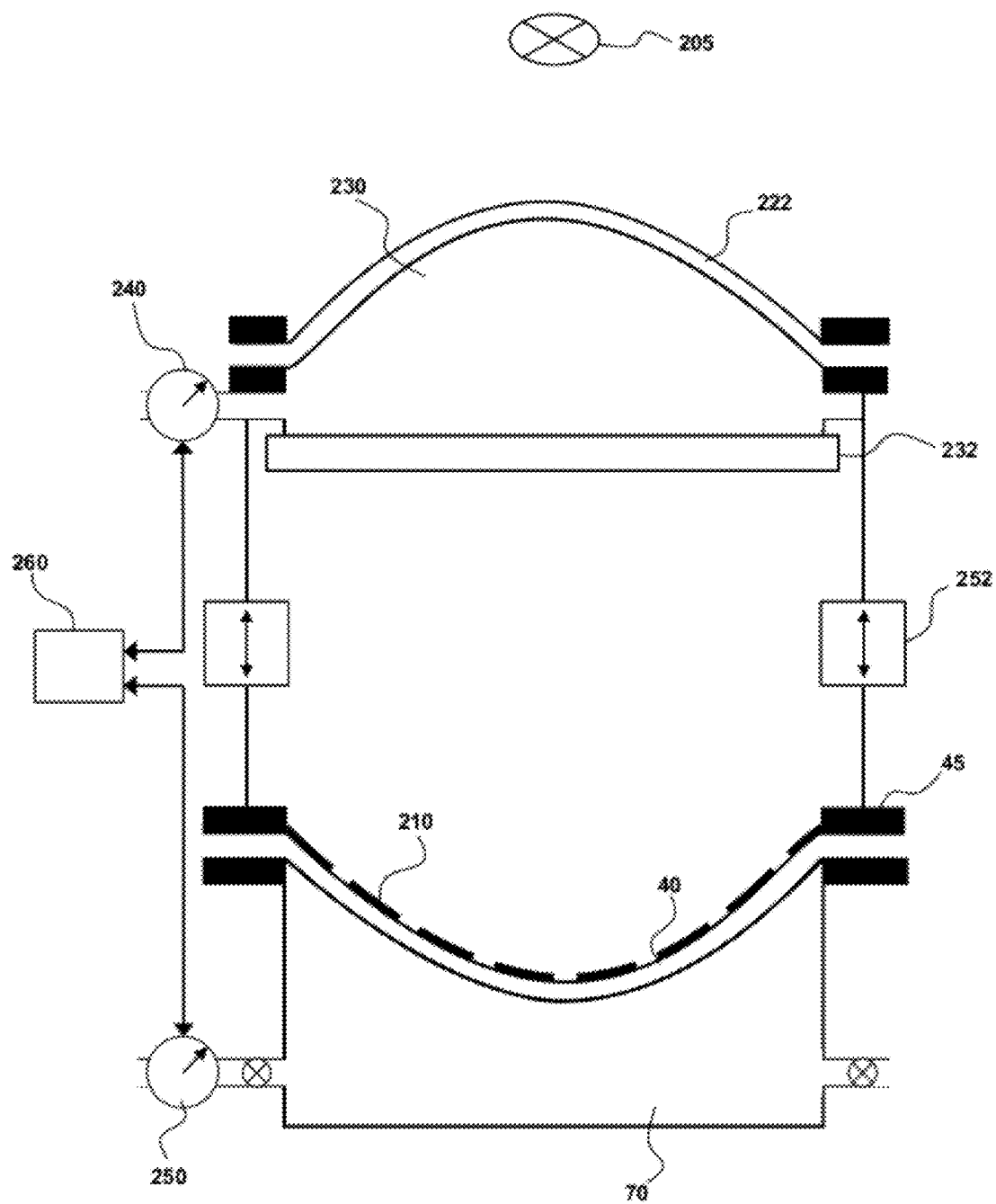
FIG. 28 Schematic illustration of a dynamically tunable imaging system with adjustable zoom.

FIG. 28 is a schematic illustration of one embodiment of a dynamically tunable hemispherical camera with adjustable zoom capability. Elastomeric lens membrane 222 has an adjustable curvature, such as by lens fluid chamber 230 positioned between the lens membrane 222 and optically transparent window 232. Lens fluid chamber actuator 240 controls fluid amount to lens fluid chamber 230, thereby controlling curvature of lens 222. Adjusting the lens curvature provides the ability to adjust zoom of an optical image of the object to be imaged 205. A photodetector array 210 on a deformable membrane 40 has edges fixed in position by holders 45. Optical component fluid chamber 70 provides controlled curvature of the photodetector array 210 by optical component fluid chamber actuator 250. Lens—optical component distance controller 252 provides the capability of independently adjusting separation distance between the lens 222 and the deformable substrate 40 supporting the array 210. Optionally, processor 260 provides the capability of calculating the focal surface based on the object 205 position (relative to the lens 222) and curvature of the lens 222. With the desired in focus surface calculated, the actuator 250 correspondingly adjusts curvature of the array 210. Alternatively, processor 260 may be empirical in nature, where for a given object 205 position and lens curvature of lens 222 (e.g., zoom), the curvature of the array 210 is adjusted until a high quality image is obtained, including an in focus image. In an aspect, the processor 260 may instead correspond to manual control, with user selection of zoom (curvature of the lens 222) and user selection of deformable membrane 40 curvature.

Figure 29:
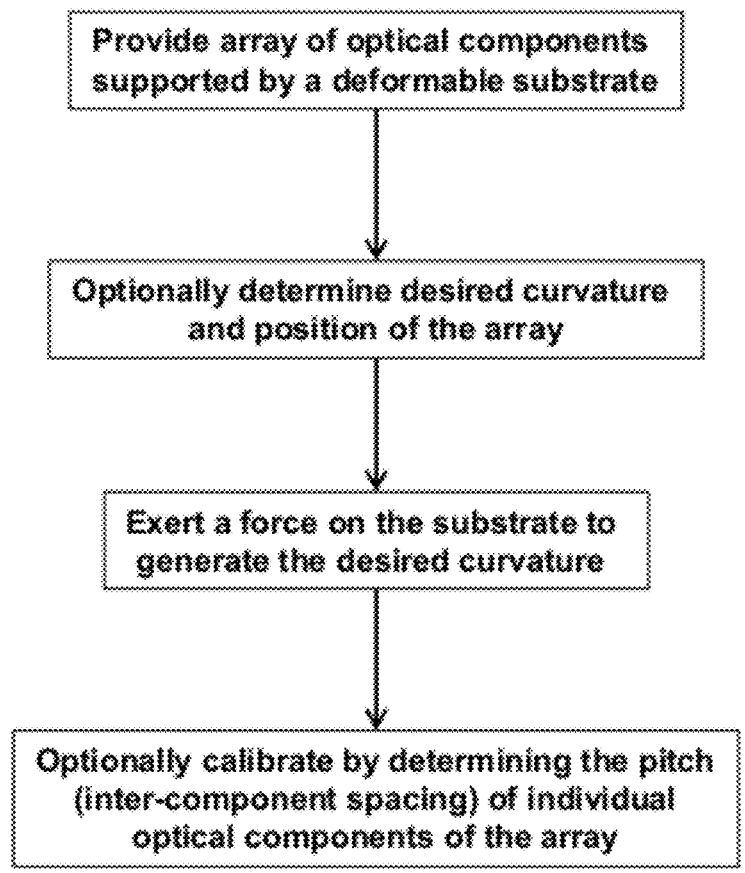
FIG. 29 Process flow diagram of method of controlling an imaging system to provide a dynamically tunable camera with adjustable zoom.

FIG. 29 is a process flow schematic of a method of the present invention. The array of optical components is supported by a deformable substrate, such as optical components on or in a contact surface. A desired or "ideal" curvature of the substrate surface is optionally determined. In an imaging application, variables used to determine ideal curvature (and, therefore, focal surface) include lens curvature and position of the object. For a light emitting application, relevant parameters to determine desired curvature include width of light beam, light intensity, light beam position, focusing lens and directing optic configuration and position. For a photovoltaic, an important parameter is angle of incident light. With the desired curvature determined, such as by computation or empirically, the corresponding force to achieve the desired curvature is exerted on the substrate. As disclosed, the force may be exerted by one or a plurality of actuators, configured to achieve the desired substrate curvature. Optionally, the system may be calibrated by determining the exact positions of optical components within the array. This can be particularly useful in imaging applications, where the detected image is subsequently displayed in a planar configuration.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure. Specific names of compounds are intended to be exemplary, as it is known that one of ordinary skill in the art can name the same compounds differently.

Every formulation or combination of components described or exemplified herein can be used to practice the invention, unless otherwise stated.

Whenever a range is given in the specification, for example, a curvature range, a size range, optical property range, zoom range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when devices are claimed, it should be understood that devices known and available in the art prior to Applicant's invention, including devices for which an enabling disclosure is provided in the references cited herein, are not intended to be included in the device claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that all art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

TABLE 1A

REFERENCES FOR EXAMPLE 1

1. Ko HC, et al. (2008) A hemispherical electronic eye camera based on compressible silicon optoelectronics. Nature 454: 748-753.
2. Grayson, T (2002) Curved focal plane wide field of view telescope design. Proc. SPIE 4849: 269-274.
3. Rim SB, et al. (2008) The optical advantages of curved focal plane arrays. Opt. Express 16: 4965-4971.
4. Dinyari R, et al. (2008) Curving monolithic silicon for nonplanar focal plane array applications. Appl Phys Lett 92: 091114-1-091114-3.
5. Hung PJ, Jeong KH, Liu GL, Lee LP (2004) Microfabricated suspensions for electrical connections on the tunable elastomer membrane. App Phys Lett 85: 6051-6053.
6. Xu X, Davanco M, Qi XF, Forrest SR (2008) Direct transfer patterning on three dimensionally deformed surfaces at micrometer resolutions and its application to hemispherical focal plane detector arrays. Org Electron 9: 1122-1127.
7. Jung I, et al. (2010) Paraboloid electronic eye cameras using deformable arrays of photodetectors in hexagonal mesh layouts. Appl Phys Lett 96: 021110-1-021110-3.
8. Ko HC, et al. (2009) Curvilinear electronics formed using silicon membrane circuits and elastomeric transfer elements. Small 5: 2703-2709.
9. Shin G, et al. (2010) Micromechanics and advanced designs for curved photodetector arrays in hemispherical electronic-eye cameras. Small 6: 851-856.
10. Proctor NS, Lynch PJ (1993) Manual of Ornithology: Avian Structure and Function (Yale University).
11. Hoskins SG (1990) Metamorphosis of the amphibian eye. J Neurobiol 21: 970-989.
12. Khang DY, Jiang HQ, Huang Y, Rogers JA (2006) A stretchable form of single-crystal silicon for high-performance electronics on rubber substrates. Science 311: 208-212.
13. Kim DH, et al. (2009) Ultrathin silicon circuits With strain-isolation layers and mesh layouts for high-performance electronics on fabric, vinyl, leather, and paper. Adv Mater 21: 3703-3707.
14. Kim DH, et al. (2008) Materials and noncoplanar mesh designs for integrated circuits with linear elastic responses to extreme mechanical deformations. Proc Natl Acad Sci USA 105: 18675-18680.
15. Tsai FS, et al. (2008) Miniaturized universal imaging device using fluidic lens. Opt Lett 33: 291-293.
16. Tsai FS, et al. (2010) Fluidic lens laparoscopic zoom camera for minimally invasive surgery. J Biomed Opt 15: 030504-1-030504-3.
17. Yu HB, Zhou GY, Leung HM, Chau FS (2010)Tunable liquid-filled lens integrated with aspherical surface for spherical aberration compensation. Opt Express 18: 9945-9954.
18. Zhang DY, et al. (2003) Fluidic adaptive lens with high focal length tunability. Appl Phys Lett 82: 3171-3172.
19. Wang SD, et al. (2009) Mechanics of hemispherical electronics. Appl Phys Lett 95: 181912-1-181912-3.
20. Song J, et al. (2009) Mechanics of noncoplanar mesh design for stretchable electronic circuits. J Appl Phys 105: 123516-1-123516-6.
21. Born M, Wolf E (1999) Principles of Optics (Cambridge Univ. Press, New York).
22. Walther A (1995) The Ray and Wave Theory of Lenses (Cambridge Univ. Press, Cambridge, UK).

TABLE 1B

REFERENCES FOR EXAMPLE 2

1. Ko, H. C., Stoykovich, M. P., Song, J. Z., Malyarchuk, V., Choi, W. M., Yu, C. J., Geddes, J. B., Xiao, J. L., Wang, S. D., Huang, Y. G. & Rogers, J. A. (2008) Nature 454, 748-753.
2. Meitl, M. A., Zhu, Z. T., Kumar, V., Lee, K. J., Feng, X., Huang, Y. Y., Adesida, I., Nuzzo, R. G. & Rogers, J. A. (2006) Nature Materials 5, 33-38.

TABLE 1B-continued

REFERENCES FOR EXAMPLE 2

3. Kim, D. H., Kim, Y. S., Wu, J., Liu, Z. J., Song, J. Z., Kim, H. S., Huang, Y. G. Y., Hwang, K. C. & Rogers, J. A. (2009) Advanced Materials 21, 3703-+.
4. Tsai, F. S., Cho, S. H., Lo, Y. H., Vasko, B. & Vasko, J. (2008) Optics Letters 33, 291-293.
5. Tsai, F. S., Johnson, D., Francis, C. S., Cho, S. H., Qiao, W., Arianpour, A., Mintz, Y., Horgan, S., Talamini, M. & Lo, Y.-H. J Biomed Opt 15, 030504.
6. Yu, H. B., Zhou, G. Y., Leung, H. M. & Chau, F. S. Optics Express 18, 9945-9954.
7. Zhang, D. Y., Lien, V., Berdichevsky, Y., Choi, J. & Lo, Y. H. (2003) Applied Physics Letters 82, 3171-3172.
8. Dong, L., Agarwal, A. K., Beebe, D. J. & Jiang, H. R. (2006) Nature 442, 551-554.
9. Dong, L., Agarwal, A. K., Beebe, D. J. & Jiang, H. R. (2007) Advanced Materials 19, 401-+.
10. Tang, S. K. Y., Stan, C. A. & Whitesides, G. M. (2008) Lab On A Chip 8, 395-401.
11. Zhu, D. F., Li, C. H., Zeng, X. F. & Jiang, H. R. Applied Physics Letters 96.
12. Shin, G., Jung, I., Malyarchuk, V., Song, J. Z., Wang, S. D., Ko, H. C., Huang, Y. G., Ha, J. S. & Rogers, J. A. (2010) Small 6, 851-856.
13. Jung, I., Shin, G., Malyarchuk, V., Ha, J. S. & Rogers, J. A. (2010) Applied Physics Letters 96: 021110-1-021110-3.
14. Schneider, F., Fellner, T., Wilde, J. & Wallrabe, U. (2008) Journal Of Micromechanics And Microengineering 18.
15. Yeoh, O. H. (1993) Rubber Chemistry And Technology 66, 754-771.
16. Born, M. & Wolf, E. (1999) Principles of Optics (Cambridge Univ. Press, New York, New York).
17. Walther, A. (1995) The Ray and Wave Theory of Lenses (Cambridge Univ. Press, Cambridge, UK, Cambridge, UK).
18. Malyarchuk, V., Jung, I., Rogers, J. A., Shin, G., & Ha, J. S. (December 2010) Optics Express: 27346-27358.

TABLE 2

Fabrication procedure for photodetector array p+ doping

1. Clean 1.25 µm SOI wafer (acetone, IPA, water, drying at 110° C. for 5 min).
2. Clean by HF for 2 s.
3. Deposit PECVD $SiO_2$ 900 nm.
4. Treat with HMDS for 1.5 min.
5. Pattern PR (p+ doping).
6. Anneal at 110° C. for 5 min.
7. Etch oxide in BOE for 2.5 min.
8. Remove PR by acetone and clean by piranha for 3 min.
9. Expose to diffusive boron source at 1000° C. for 30 min.
10. Clean the processed wafer (HF 1 min, piranha 10 min, BOE 1 min)

n+ doping

11. Deposit PECVD SiO2 900 nm.
12. Treat with HMDS for 1.5 min.
13. Pattern PR (n+ doping).
14. Anneal at 110° C. for 5 min.
15. Etch oxide in BOE for 2.5 min.
16. Remove PR by acetone and clean by piranha for 3 min.
17. Expose to diffusive phosphorus source at 1000° C. for 10 min.
18. Clean the processed wafer (HF 1 min, piranha 10 min, BOE 1 min).

Silicon isolation

19. Pattern PR (Si isolation).
20. Etch silicon by RIE (50 mTorr, 40 sccm SF6, 100 W, 3 min).
21. Remove PR by acetone and clean by piranha for 3 min.

Sacrificial oxide layer deposition

22. Etch oxide layer of SOI wafer in HF for 1.5 min.
23. Deposit PECVD SiO2 100 nm.
24. Treat with HMDS for 1.5 min.
25. Pattern PR (sacrificial layer).
26. Anneal at 110° C. for 5 min.
27. Etch PECVD oxide in BOE for 30 s.
28. Remove PR by acetone and clean by piranha for 3 min.

Deposit $1^{st}$ PI

29. Spin coat with PI (4000 rpm, 60 s).
30. Anneal at 110° C. for 3 min at 150° C. for 10 min.
31. Anneal at 250° C. for 2 h in N2 atmosphere.

Pattern via holes

32. Expose to ultraviolet induced ozone (UVO) for 5 min.
33. Deposit PECVD SiO2 150 nm.
34. Treat with HMDS for 1.5 min.
35. Pattern PR (via pattern).
36. Etch PECVD oxide by RIE (50 mTorr, 40:1.2 sccm CF4:O2, 150 W, 8.5 min).
37. Remove PR by acetone.
38. Etch PI by RIE (150 mTorr, 20 sccm O2, 150 W, 20 min).

Metallization

39. Etch PECVD oxide in BOE for 35 s.
40. Sputter 5/150 nm of Cr/Au by sputter coater (AJA international).
41. Pattern PR (metal pattern).
42. Anneal at 110° C. for 5 min.
43. Etch Au/Cr by wet etchants for 40/20 s.
44. Remove PR by acetone (carefully).

Deposit $2^{nd}$ PI

45. Spin coat with PI (4000 rpm, 60 s).
46. Anneal at 110° C. for 3 min at 150° C. for 10 min.
47. Anneal at 250° C. for 2 h in N2 atmosphere.

Pattern etch holes

48. Expose to ultraviolet induced ozone (UVO) for 5 min.
49. Deposit PECVD SiO2 150 nm.
50. Treat with HMDS for 1.5 min.
51. Pattern PR (hole pattern).
52. Etch PECVD oxide by RIE (50 mTorr, 40:1.2 sccm CF4:O2, 150 W, 8.5 min).
53. Remove PR by acetone.
54. Etch PI by RIE (150 mTorr, 20 sccm O2, 150 W, 12 min).
55. Etch Au/Cr by wet etchants for 20/5 s.
56. Etch PI by RIE (150 mTorr, 20 sccm O2, 150 W, 15 min).
57. Etch silicon by RIE (50 mTorr, 40 sccm SF6, 100 W, 3 min).

PI isolation

58. Etch PECVD oxide in BOE for 35 s.
59. Expose to ultraviolet induced ozone (UVO) for 5 min.
60. Deposit PECVD SiO2 150 nm.
61. Treat with HMDS for 1.5 min.
62. Pattern PR (PI isolation).

TABLE 2-continued

Fabrication procedure for photodetector array

63. Etch PECVD oxide by RIE (50 mTorr, 40:1.2 sccm CF4:O2, 150 W, 8.5 min).
64. Remove PR by acetone.
65. Etch PI by RIE (150 mTorr, 20 sccm O2, 150 W, 40 min).

TABLE 3

Transfer scheme for silicon photodetector array

1  Etch oxide layer of SOI wafer in HF for 30 min.
2  Rinse the processed wafer with DI water for 10 min (carefully).
3  Clean device perimeter using scotch tapes.
4  Pick up photodetector array using a flat PDMS (Sylgard 184, Dow Corning) stamp.
5  Expose ultraviolet induced ozone (UVO) to a target substrate (thin PDMS) for 2.5 min.
6  Stamp to a target substrate (don't release PDMS stamp).
7  Post-bake at 70° C. for 10 min.
8  Release PDMS stamp (slowly ~10 sec).

TABLE 4

Procedures for completing the tunable detector

1  Open electrodes covering with PDMS by RIE (150 mTorr, 20 sccm O2, 150 W, 1 h).
2  Cut PDMS membrane with device through a cutting pad.
3  Install PDMS membrane to the fluidic deformation system.
4  Assemble and align the metal electrodes pin array and install onto the plastic board.
5  Assemble fluidic chamber and connect in/outlet tubes with a stop cock.
6  Insert distilled water into the system using a syringe.
7  Remove bubbles from the system and close the stop cock.

I claim:

1. An imaging system comprising:
a deformable substrate having a contact surface, wherein said deformable substrate is an elastomeric membrane;
an array of mechanically interconnected optical components supported by said contact surface, wherein said optical components comprise photodiodes that form a photodetector array;
an encapsulating layer supported by said deformable substrate, wherein the encapsulating layer at least partially encapsulates said array of mechanically interconnected optical components;
an actuator operably connected to said contact surface, wherein said actuator is configured to continuously adjust a curvature of said contact surface, wherein change of curvature by the actuator is reversible;
a dynamically tunable and adjustable curvature lens in optical communication with said photodetector array; and
a processor for calculating a Petzval surface of an object imaged by said dynamically tunable and adjustable curvature lens, wherein said actuator is configured to generate curvature of said photodetector that substantially matches the calculated Petzval surface,
thereby providing a dynamically tunable imaging system having a continuously adjustable zoom and correspondingly continuously adjustable photodetector array surface curvature configured to match the Petzval surface formed by a change in curvature of said dynamically tunable and adjustable curvature lens.

2. The array of optical components of claim 1, wherein said deformable substrate has a thickness that is less than 1 mm.

3. The array of optical components of claim 1, wherein said optical component is selected from the group consisting of:
optical detectors;
optical emitters;
optical reflectors;
photovoltaics;
lenses;
filters; and
polarizers.

4. The array of optical components of claim 3, wherein said array of mechanically interconnected optical components comprise photodiodes.

5. The array of optical components of claim 1, wherein said actuator selected from the group consisting of:
a piezoelectric actuator;
an electrostatic actuator; and
a magnetic actuator.

6. The array of optical components of claim 1, wherein said actuator is selected from the group consisting of:
a hydraulic system;
a pneumatic system;
a mechanical actuator; and
a force generator that is integrated with said deformable substrate.

7. The array of optical components of claim 6, wherein said integrated force generator is a shape memory polymer or metal.

8. The array of optical components of claim 6, wherein said mechanical actuator comprises an array of mechanical actuators positioned on a back surface that is opposed to said contact surface.

9. The array of optical components of claim 6, wherein said hydraulic or pneumatic system comprises:
an optical component fluid chamber, wherein said deformable substrate forms a surface of said optical component fluid chamber; and
a pressure controller for controlling a pressure of said optical component fluid chamber.

10. The array of optical components of claim 9, wherein said fluid chamber pressure is controlled by introducing or removing a fluid to said fluid chamber by said actuator.

11. The array of optical components of claim 9, wherein said fluid chamber is positioned adjacent to a back surface of said deformable substrate, wherein said back surface is opposed and separated from said contact surface by said deformable membrane.

12. The array of optical components of claim 1, wherein said array of optical components comprises a plurality of islands, wherein each island is mechanically or electrically connected to an adjacent island by an interconnect, wherein said interconnect is in a buckled or a serpentine configuration.

13. The array of optical components of claim 1, wherein said curvature can range from a concave to a convex configuration, wherein said array of optical components remain functional over the concave to convex configuration.

14. The array of optical components of claim 13, wherein curvature is defined by a radius of curvature, and said radius of curvature can vary from 0.1 mm to flat in the concave or the convex configuration.

15. The array of optical components of claim 1, wherein said actuator provides a curvature that is within 5% of a desired curvature.

16. The array of optical components of claim 1, said deformable substrate having a spatially-varying material property that influences the curvature of the contact surface.

17. The imaging system of claim 1, wherein said dynamically tunable and adjustable curvature lens comprises an elastomeric lens membrane.

18. The imaging system of claim 17, wherein said dynamically tunable and adjustable curvature lens is a tunable fluidic lens further comprising:
   a lens fluid chamber having one surface formed by said elastomeric lens membrane; and
   an optical component fluid chamber having one surface formed by said deformable substrate;
wherein the actuator controls:
   a pressure in said lens fluid chamber to tune said elastomeric lens membrane; and
   a pressure in said optical component fluid chamber to tune said photodetector array.

19. The imaging system of claim 18, wherein said actuator comprises:
   a lens fluid chamber actuator for controlling said pressure in said lens fluid chamber; and
   an optical component fluid chamber actuator for controlling said pressure in said optical component fluid chamber.

20. The imaging system of claim 18, wherein said actuator comprises one or more actuators to independently vary a radius of curvature of said elastomeric lens membrane and said deformable substrate.

21. The imaging system of claim 20, wherein said actuator is a single actuator that adjusts curvature of both said elastomeric lens and said photodetector array.

22. The imaging system of claim 1 having a continuously adjustable zoom, wherein said zoom is greater than or equal to a factor of 1 and less than or equal to a factor of 50.

23. The array of optical components of claim 1, wherein adjacent mechanically interconnected optical components are interconnected by a serpentine or buckled interconnect.

24. The array of optical components of claim 23, wherein the encapsulating layer comprises a top and bottom film of polyimide and the interconnects are metal lines encapsulated with the top and bottom film of polyimide, wherein the top film, bottom film, or both films of polyimide have a thickness less than or equal to 1 μm.

25. The imaging system of claim 1, wherein the encapsulating layer provides a neutral mechanical plane to isolate a rigid material of the array from bending-induced strain.

26. The imaging system of claim 25, wherein the rigid material of the array is a metal or semiconductor element.

27. The imaging system of claim 1, wherein each photodetector of the photodetector array has an area that is less than 0.25 mm$^2$.

28. The imaging system of claim 1, wherein the photodetector array surface curvature is within 5% of the Petzval surface averaged over the entire photodetector array surface.

29. A method of controlling curvature of an array of optical components comprising:
   providing an array of mechanically interconnected optical components on a contact surface of a deformable substrate, wherein said deformable substrate is an elastomeric membrane and said optical components comprise photodiodes that form a photodetector array;
   providing an encapsulating layer supported by said deformable substrate, wherein the encapsulating layer at least partially encapsulates said array of mechanically interconnected optical components;
   providing a tunable lens comprising a dynamically tunable and adjustable curvature lens in optical communication with said photodetector array; and
   exerting a force on said dynamically tunable and adjustable curvature lens to provide a continuously adjustable zoom lens forming an image at said photodetector array;
   determining a Petzval surface of said image formed at said photodetector array; and
   exerting a force on the deformable substrate to continuously adjust the curvature of the photodetector array to match the Petzval surface formed by said dynamically tunable and adjustable curvature lens, wherein the deformation is reversible,
   thereby providing a dynamically tunable imaging system having a continuously adjustable zoom lens having an image at said photodetector array that is in focus by adjusting said photodetector array curvature to match the Petzval surface formed by said dynamically tunable and adjustable curvature lens.

30. The method of claim 29, wherein said force is exerted by: activating an actuator that is operably connected to said deformable substrate.

31. The method of claim 29, wherein said force is exerted by the deformable substrate or an actuator positioned in or on the deformable substrate.

32. The method of claim 29 wherein said photodetector array comprises a plurality of mechanically interconnected photodiodes.

33. The method of claim 32, further comprising the steps of:
   adjusting a curvature of said dynamically tunable and adjustable curvature lens to obtain a desired optical zoom of an object positioned in said lens field of view;
   determining an ideal curvature of said photodetector array to provide a focused image of light from the object transmitted through said dynamically tunable and adjustable curvature lens; and
   adjusting said exerted force on said deformable substrate to substantially match the photodetector array curvature to said ideal curvature; thereby obtaining an in focus image of said object for any optical zoom value.

34. The method of claim 33, further comprising:
   determining an ideal separation distance between said photodetector and said dynamically tunable and adjustable curvature lens for capturing said focused image by said photodetector; and
   adjusting a separation distance between said dynamically tunable and adjustable curvature lens and said photodetector to substantially match said separation distance to said ideal separation distance.

35. The method of claim 33, wherein the desired optical zoom corresponds to a zoom factor that is greater than or equal to 1 and less than or equal to 100 and the optical image at the photodetector is in focus for all zoom factor values without additional lenses between the dynamically tunable and adjustable curvature lens and the photodetector.

36. The method of claim 33, wherein the ideal curvature is determined computationally or empirically.

37. The method of claim 29, wherein at least a central portion of the deformable substrate has a curvature that is hemispherical or paraboloid.

38. The method of claim 29, wherein said array of optical components maintain functionality over a range of membrane curvatures, corresponding to concave, convex, or planar configurations, or a radius of curvature range that is between flat and 0.1 mm.

39. The method of claim 29, further comprising the step of calibrating the optical components to address the position of individual optical components of the array over a range of membrane curvatures.

40. The method of claim 39, wherein the calibrating is by determining the pitch or inter-component spacing for a plurality of membrane curvatures computationally or empirically using a known image provided at a defined distance.

41. The method of claim 33, wherein the ideal curvature corresponds to a Petzval surface formed by transmission of electromagnetic radiation through the dynamically tunable and adjustable curvature lens.

42. The method of claim 29, wherein adjacent mechanically interconnected optical components are interconnected by a serpentine or buckled interconnect.

43. The method of claim 42, wherein the encapsulating layer comprises a top and bottom film of polyimide and the interconnects are metal lines encapsulated within the top and bottom film of polyimide, wherein the top film, bottom film, or both films of polyimide have a thickness less than or equal to 1 µm.

44. The method of claim 29, wherein the encapsulating layer provides a neutral mechanical plane to isolate a rigid material of the array from bending-induced strain.

45. The method of claim 44, wherein the rigid material of the array is a metal or semiconductor element.

46. The method of claim 29, wherein the each photodetector of the photodetector array has an area that is less than 0.25 mm$^2$.

47. The method of claim 29, wherein the photodetector array surface curvature is within 5% of the Petzval surface averaged over the entire photodetector array surface.

* * * * *